United States Patent [19]
Saito et al.

[11] Patent Number: 5,731,829
[45] Date of Patent: Mar. 24, 1998

[54] INFORMATION PROCESSING AND RECORDING APPARATUS WITH TWO RECORDING MEDIUM CONVEYANCE ROUTES

[75] Inventors: Takashi Saito, Yokohama; Toshiaki Ozawa, Urayasu; Hiroatsu Kondo, Zushi; Koh Hasegawa, Yokohama; Junichi Asano, Kawasaki; Toshihide Wada, Yokohama; Hiroyuki Inoue, Chiba; Takuma Kanno, Hachioji; Hirofumi Hirano, Yokohama; Toshihiko Bekki, Kawasaki; Hiroyuki Hagiwara, Tokyo, all of Japan

[73] Assignee: Canon Kabushiki Kaisha, Tokyo, Japan

[21] Appl. No.: 589,310

[22] Filed: Jan. 22, 1996

Related U.S. Application Data

[63] Continuation of Ser. No. 480,928, Jun. 27, 1995, abandoned, which is a continuation of Ser. No. 82,426, Jun. 28, 1993, abandoned, which is a continuation of Ser. No. 841,324, Feb. 25, 1992, abandoned.

[30] Foreign Application Priority Data

| Feb. 2, 1991 | [JP] | Japan | 3-034702 |
| Feb. 28, 1991 | [JP] | Japan | 3-034703 |
| Mar. 11, 1991 | [JP] | Japan | 3-045155 |
| Mar. 11, 1991 | [JP] | Japan | 3-045157 |
| Mar. 11, 1991 | [JP] | Japan | 3-123068 |
| Apr. 26, 1991 | [JP] | Japan | 3-123069 |
| Jun. 27, 1991 | [JP] | Japan | 3-181689 |
| Jul. 30, 1991 | [JP] | Japan | 3-190237 |

[51] Int. Cl.$^6$ ............... B41J 13/00; B41J 2/01
[52] U.S. Cl. ............... 347/104; 347/108; 400/605
[58] Field of Search ............... 347/104, 108, 347/215, 218, 262, 264, 153, 197; 346/134; 400/605, 634, 635

[56] References Cited

U.S. PATENT DOCUMENTS

| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/140 R |
| 4,558,333 | 12/1985 | Sugitani et al. | 346/140 R |
| 4,723,129 | 2/1988 | Endo et al. | 346/140 R |
| 4,725,157 | 2/1988 | Nakai et al. | 430/680 |
| 4,740,796 | 4/1988 | Endo et al. | 346/140 R |
| 4,757,329 | 7/1988 | Sato et al. | 347/218 |
| 4,823,195 | 4/1989 | Ito | 346/140 R |
| 4,837,590 | 6/1989 | Sprague | 346/145 |
| 4,851,812 | 7/1989 | Holmberg | 340/407 |
| 4,857,941 | 8/1989 | Kaida | 347/175 |
| 4,946,300 | 8/1990 | Makita | 400/682 |
| 4,948,283 | 8/1990 | Imaizumi et al. | 400/347.1 |
| 5,105,210 | 4/1992 | Hirano et al. | 346/140 R |

FOREIGN PATENT DOCUMENTS

| 0411698 | 2/1991 | European Pat. Off. . | |
| 3509738 | 9/1985 | Germany | 400/605 |
| 3833854 | 4/1990 | Germany . | |
| 54-056847 | 5/1979 | Japan . | |
| 0190687 | 8/1980 | Japan | 400/27 |
| 0038822 | 3/1984 | Japan . | |
| 59-123670 | 7/1984 | Japan . | |
| 59-138461 | 8/1984 | Japan . | |
| 60-071260 | 4/1985 | Japan . | |
| 3104677 | 5/1991 | Japan . | |
| 2221898 | 2/1990 | United Kingdom | 400/605 |

*Primary Examiner*—N. Le
*Attorney, Agent, or Firm*—Fitzpatrick, Cella, Harper & Scinto

[57] ABSTRACT

An information processing apparatus includes an input portion for inputting information, a recording portion capable of recording information input by the input portion onto a recording medium and a moving mechanism capable of vertically moving the recording portion and holding the recording portion at a predetermined position.

29 Claims, 56 Drawing Sheets

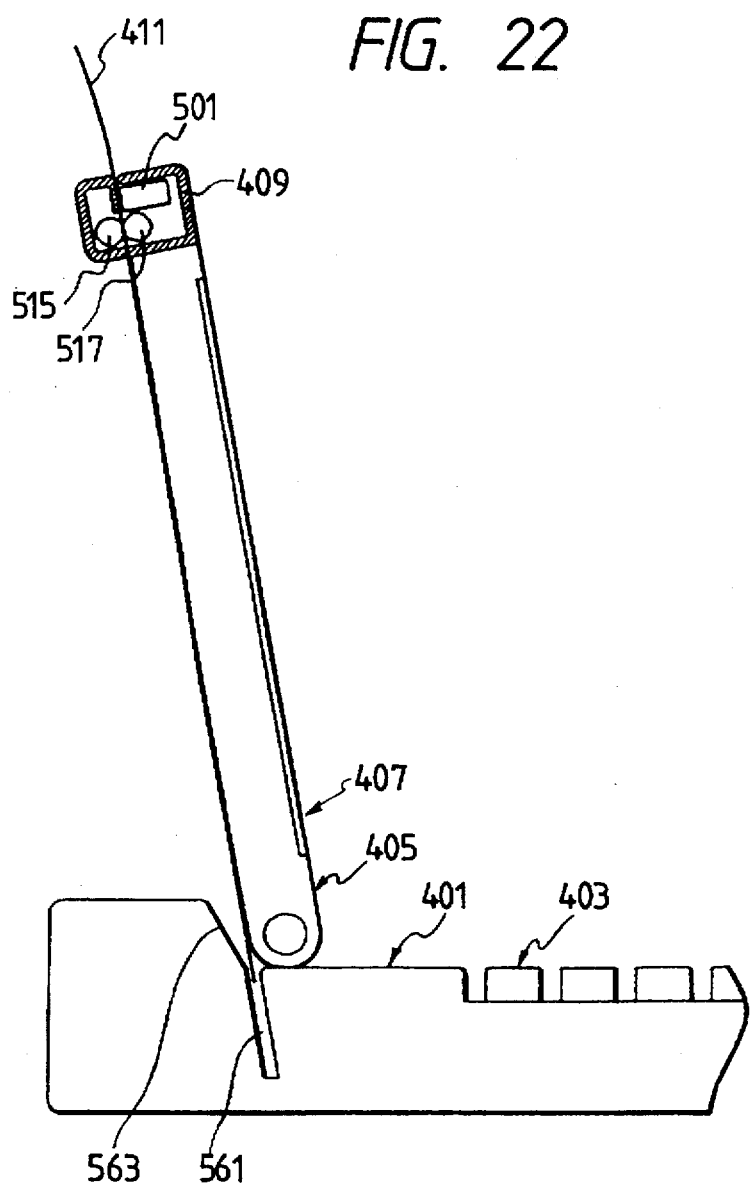

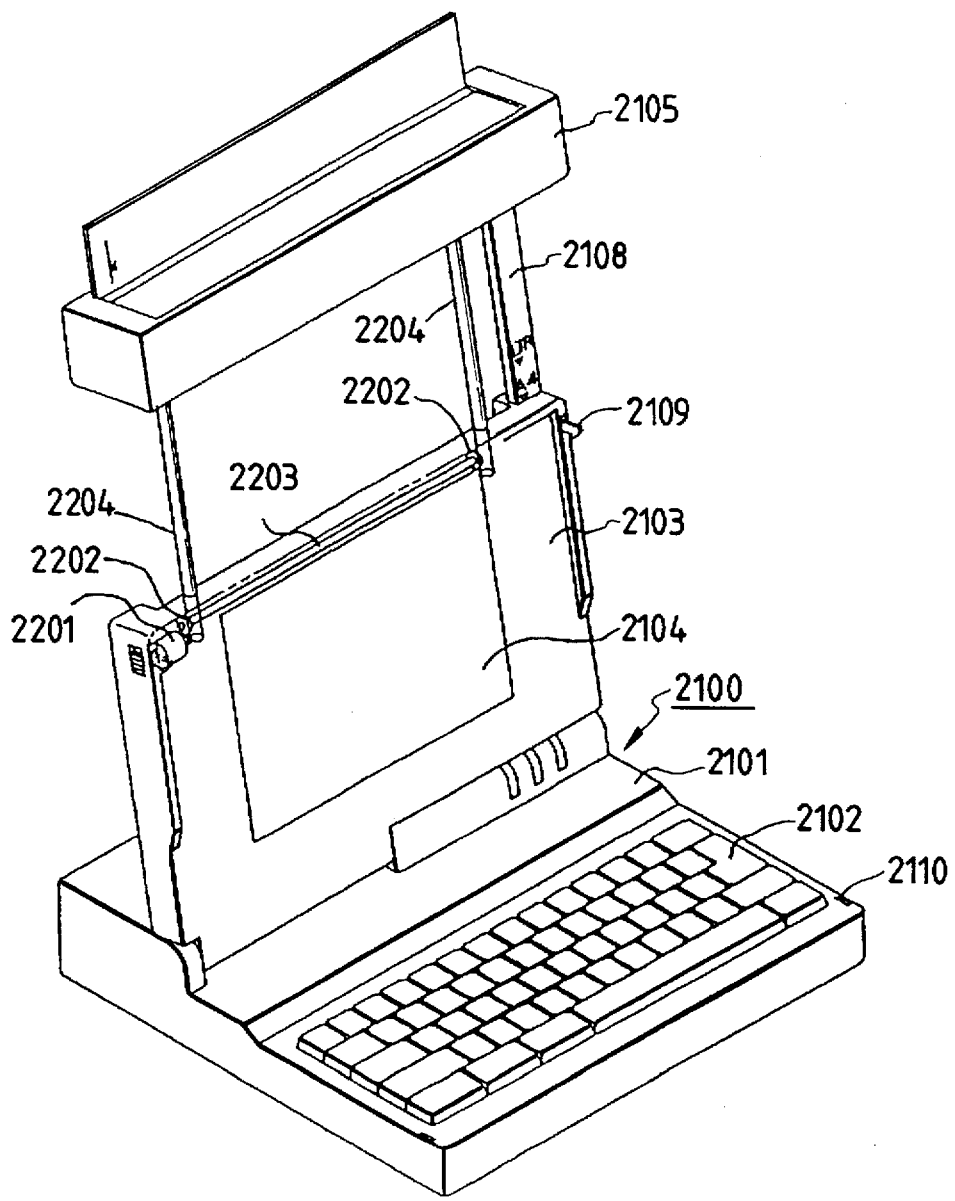

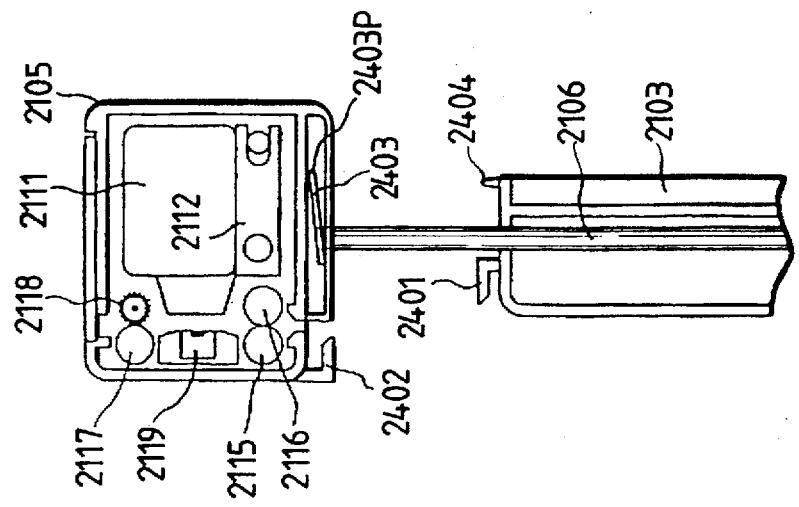
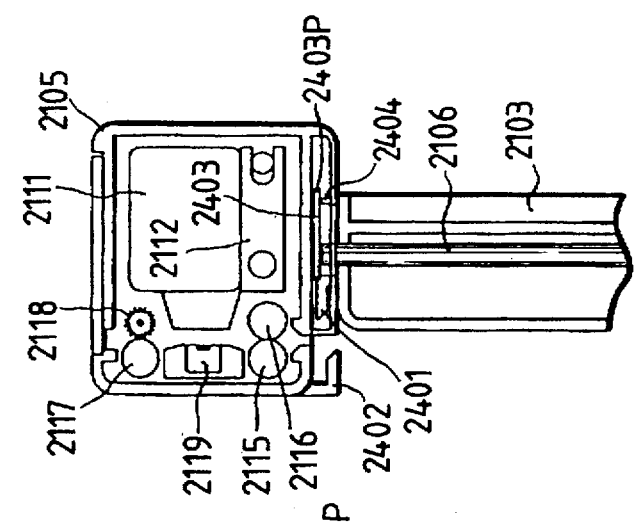
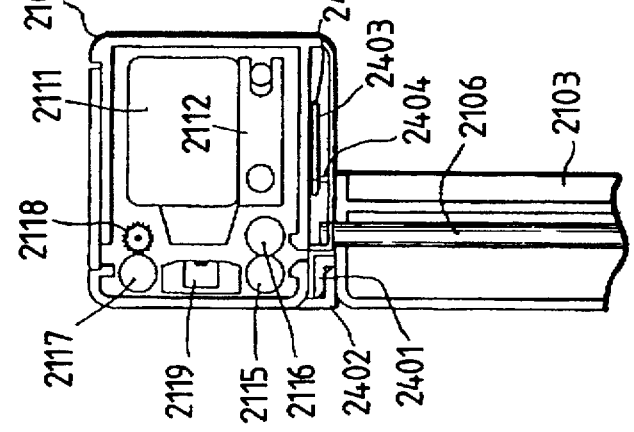

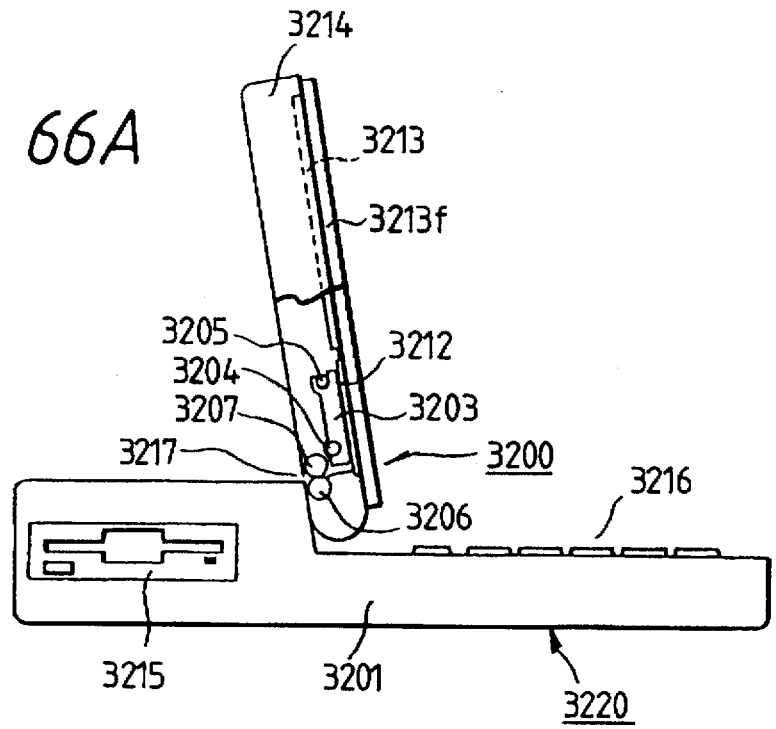
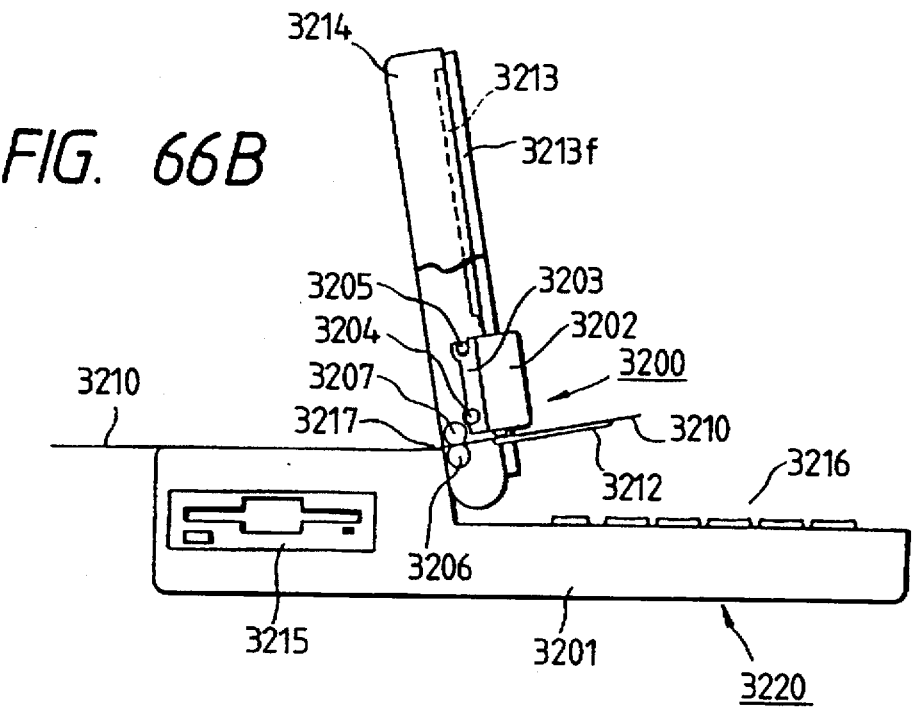

INFORMATION PROCESSING AND RECORDING APPARATUS WITH TWO RECORDING MEDIUM CONVEYANCE ROUTES

This application is a continuation of application Ser. No. 08/480,928 filed Jun. 7, 1995, now abandoned, which in turn is a continuation of application Ser. No. 08/082,426 filed Jun. 28, 1993, abandoned, which in turn is a continuation of application Ser. No. 07/841,324 filed Feb. 25, 1992, abandoned.

BACKGROUND OF THE INVENTION

1. Field of the Invention

The present invention relates to an information processing apparatus, and, more particularly to an information processing apparatus such as a personal computer, a word processor and an electronic typewriter each having a display unit and a recording unit.

2. Related Background Art

Hitherto, there has been an information processing apparatus such as a personal computer, a word processor, and an electronic typewriter and the like of a type having a manipulation input portion such as a keyboard and a display unit formed integrally. Recently, various apparatuses of so-called "laptop" type apparatuses each exhibiting excellent carrying and folding facilities have been widely used because of their structures each arranged in such a manner that its display unit is rotatively supported by the main body having the manipulation input portion, the display unit is superposed on the manipulation input portion when the apparatus is carried/stowed and the display unit is stood or positioned erect when the commencement of the operation of the apparatus is desired. A many portion of the apparatuses of the aforementioned type usually have a printer unit mounted on the rear portion (reverse side of the display) of the main body of the apparatus.

Furthermore, a so-called "note type" or a "book type" small and thin information processing apparatuses each exhibiting further improved carrying and folding facilities have been disclosed. With this tendency, a small and low-priced printer which can therefore be easily used by an operator has been suggested. Also the apparatus of this type has the printer disposed in the rear portion of the main body thereof.

There has been another structure arranged in such a manner that the manipulation input portion is arranged to be foldable onto the main body of the apparatus which has the display unit, the printer is positioned in the main body of the apparatus in the backside of the display and recording medium is inserted/discharged to and from an upper portion of the main body of the apparatus. Furthermore, there are a multiplicity of so-called desk top apparatuses each having a display formed by a CRT. Some of the apparatuses of the aforesaid type have printers each of which is disposed in the upper portion of the display.

The inventors of the present invention studied the aforesaid various information processing apparatuses, resulting in the following requirements for the location of the printer to be mounted on the information processing apparatus to be found:

(1) The limitation on the thickness of the recording medium must be suspended. That is, even if a thick recording medium (hereinafter called a "thick paper sheet") such as a postcard or an envelope is used in the recording operation as an alternative to the ordinary recording medium, the recording operation must be performed satisfactorily while preventing a problem to take place in the paper feeding operation.

(2) The manipulation required at the time of the recording operation must be performed easily and simply.

(3) An excellent visibility of the subject to which data is recorded must be obtained during the recording operation. That is, the recording medium transmitted as a result of the recording operation must easily be seen while being contrasted with the displayed image.

(4) The size of the information processing apparatus must be reduced while satisfying the aforesaid requirements.

However, the conventional information apparatus cannot satisfactorily meet the aforesaid requirements.

The aforesaid information processing apparatus usually has the printer in which the recording medium is wound around a platen roller to be fed and subjected to the recording process. Therefore there arises a common problem in that a limitation is present in reducing the diameter of the paper feeding roller because it is necessary for the roller to also feed thick paper sheets such as postcards and envelopes. In order to protect the thick paper sheet from being undesirably folded, a considerably large space is required, and thereby the size of the printer unit cannot be reduced satisfactorily.

Some of the aforesaid note type and the book type apparatuses have the printers each of which can be detached from the main body apparatus or stood erect by turning it to feed the recording medium in a horizontal plane in the state where the printer is removed from the main body or in the state where the printer is stood erect. As a result, the size of the recording medium feeding rollers (paper feeding rollers) of the aforesaid apparatuses can be reduced and thereby the overall size of the printer unit can be reduced. Furthermore, the thick paper sheet can be fed as desired. However, a complicated operation such as separating the printer unit from the main body of the apparatus or turning the printer unit to be stood erect must be performed at the time of the recording operation. What is even worse, the apparatus of a type having the printer which is turned at the time of the recording operation must have a mechanism therefor, causing a problem to arise in that the size of the printer unit cannot be reduced.

In an information processing apparatus of the type having the printer unit disposed in the rear portion of the display unit, an operation of folding the display unit must be performed in order to set the recording medium to the printer unit. Furthermore, another problem in terms of the manipulating facility arises in that the subject to which data is recorded and the displayed image cannot be contrasted with each other.

SUMMARY OF THE INVENTION

Accordingly, an object of the present invention is to provide an information processing apparatus capable-of completely or substantially overcoming the aforesaid problems.

Another object of the present invention is to provide an information processing apparatus in which any kinds of recording medium can be fed to the recording position located in the recording portion provided integrally, the overall size of which can be reduced and which exhibits excellent manipulating facility.

Another object of the present invention is to provide an information processing apparatus having a recording unit (printer) including a recording head cartridge of a type in which the recording head and the ink tank are formed integrally, the information processing apparatus having an ink jet recording apparatus or information output means capable of eliminating a necessity of reducing the size of the ink tank and as well as capable of reducing the overall size and the thickness of the apparatus.

According to one aspect of the present invention, there is provided an information processing apparatus comprising: an input portion for inputting information; a recording portion capable of recording information input by the input portion to a recording medium; and a moving mechanism capable of vertically moving the recording portion and holding the recording portion at a predetermined position.

According to another aspect of the present invention, there is provided an information processing apparatus comprising: an input portion for inputting information; a display portion capable of displaying information input by the input portion; and a recording portion disposed between the display portion and the input portion and capable of recording information input by the input portion to a recording medium.

According to the aforesaid aspects, the recording portion integrally possessed by the information processing apparatus is vertically moved, so that the recording portion can be disposed in the upper portion of the apparatus at the time of, for example, the recording operation and the same can be accommodated in the apparatus at the non-operation case. Furthermore, the direction in which recording is performed by the recording portion cannot be changed due to the aforesaid vertical movement. In a case where the recording operation is performed in such a manner that the recording portion is disposed in the upper portion of the apparatus, the feeding passage for the recording medium can be made horizontal along, for example, the top surface of the apparatus. Furthermore, since the recording portion is disposed between a space from the display portion, operation of, for example, inserting the recording medium relating to the recording portion is not obstructed by the display portion or the like.

As a result, the information processing apparatus integrally including the recording portion can be formed compact and the facility in feeding the recording medium in the recording portion and the handling facility of the apparatus can be improved.

According to another aspect of the present invention, there is provided an information processing apparatus comprising: an input portion for inputting information; a display portion rotatively provided for a body of the apparatus; and a recording portion disposed on the display portion, wherein a recording medium is fed to the recording portion along a backside of the display portion.

According to another aspect of the present invention, there is provided an information processing apparatus comprising: a manipulation input means which receives manipulation input; a display portion stood erect from the body of the apparatus having the manipulation input portion and a recording portion the overall body or a portion of which is integrally formed in the lower portion of the display portion.

According to another aspect of the present invention, there is provided an information processing apparatus comprising: a manipulation input means which receives manipulation input; a display portion stood erect from the body of the apparatus having the manipulation input portion and a thermosensitive recording device formed integrally with a lower portion of the display portion, wherein a roll-form thermosensitive recording paper sheet is accommodated in the aforesaid lower portion.

In the aforementioned aspects, the recording portion is integrally formed with the upper portion or the lower portion of the display portion and the recording medium is fed on the backside of the display portion or the top surface of the rear portion of the apparatus body, so that recording can be satisfactorily performed even if the recording medium is a thick paper sheet while reducing the size of the apparatus.

Furthermore, the recording medium can be set easily at the time of performing the recording operation and the handling facility can be improved. In addition, the record can be easily confirmed during the recording process and after the recording operation has been completed, resulting an effect to be obtained in that, for example, the recording medium, which is the output of the recording operation, can easily be seen while being contrasted with the displayed image.

According to another aspect of the present invention, there is provided an information processing apparatus having a cover which can be opened/closed with respect to an apparatus body comprising: an input portion for inputting information; a display portion for displaying information; and a recording portion for recording information, wherein the display portion and the recording portion are provided in the cover and the thickness of the overall body of the apparatus is made uniform when the cover is closed.

According to the aforementioned aspect, the thickness of the apparatus body can be reduced in accordance with the thickness of the recording portion, so that the thickness of the overall body of the apparatus can be made uniform when the cover is closed and the size of the apparatus can thereby be reduced.

In addition, when recording is performed in a state where the apparatus can be operated, the necessity of separating the recording operation can be eliminated in the recording operation.

According to another aspect of the present invention, there is provided an information processing apparatus comprising: an input portion for inputting information; a display portion for displaying information; and a recording portion for recording information, wherein at least two feeding ports for supplying a recording medium to the recording portion are formed in such a manner that a first feeding port is formed in the front portion of the apparatus body and a second feeding port is formed in the vicinity of the recording portion under the lower surface of the apparatus body.

According to the aspect of the invention, a plurality of feeding passages for supplying the recording medium to the recording portion are provided, so that the most suitable feeding passage for the type of subject recording medium can be selected. The first feeding port is formed for a common recording medium which is most ordinary recording medium and it is formed in the front portion of the information processing apparatus adjacent to the operator. Therefore, the recording medium can be supplied to the recording portion during the operation in the sequential operations and a necessity of folding the display portion can be eliminated.

The second feeding port is formed for the purpose of feeding a small recording medium except for the regular size medium or a thick recording medium such as a postcard and an envelope. The recording medium can be fed by a simple operation of holding the lower portion of the information processing apparatus adjacent to the recording portion and raising the front portion of the information processing apparatus at the time of feeding the postcard or the envelope. The second feeding port is formed adjacent to the recording portion, so that a small size recording medium can be fed and a thick recording medium can be fed smoothly.

Furthermore, the recording medium is output adjacent to the operator than the display portion and the same is fed to the backside of the display portion via the lower portion of the display portion, so that the result of the recording operation and the displayed image can easily be contrasted with each other. In addition, a problem taken place in that the recording medium covers the display portion and the operation of the operator is obstructed can be prevented.

According to another aspect of the present invention, there is provided an information processing apparatus comprising: input means for inputting information; display means for displaying information; recording means disposed above the display means and recording information; and position changing means for changing the relative position between the recording means and the display means. Furthermore, the display means is foldable on the apparatus body to be superposed on the input means.

In this aspect, the recording means is disposed on the display means and their relative position can be changed, so that the recording means can be extended/contracted with respect to the display means to suit the subject recording means. Therefore, the recording operation can be performed satisfactorily regardless of the length or the thickness of the recording medium.

Furthermore, the recording medium for use in the recording operation can be simply set and thereby the handling facility can be improved in addition, the recording medium can be easily confirmed during the recording operation or after the recording operation has been completed, resulting an effect to be obtained in that, for example, the recording medium discharged as the result of the recording operation can easily be confirmed while being contrasted with the displayed image.

According to another aspect of the present invention, the print paper sheet is caused to pass along the top surface of the keyboard and a paper end clip for fastening the rear end of the paper sheet after the paper sheet has been set is disposed at a predetermined position in the information processing apparatus. As a result, the paper sheet is held while being formed into a loop, so that the keyboard can be operated smoothly, the display can easily be seen and the result of printing can be confirmed.

That is, since the means for holding the rear end of the paper sheet is provided, a relatively long paper sheet can be formed into a loop and thereby printing can be performed while preventing the undesirable covering of the keyboard and the display. Furthermore, a thick and small size paper sheet such as a postcard or an envelope is not formed into the loop when it is fed and the paper sheet can easily be set. Therefore, a portable information processing apparatus including a recording apparatus and exhibiting a small size, low price and excellent handling facility can be provided.

According to another aspect of the present invention, there is provided an ink jet recording apparatus for performing recording by discharging ink to a recording medium comprising: a recording head cartridge integrally including a recording head for discharging ink and an ink reserving or storing member for reserving ink to be supplied to the recording head; and a case member having an opening through which at least a portion of the recording head cartridge can be projected outwards and forming an outer case of the apparatus.

It is preferable that the ink jet recording apparatus further comprises fastening means for detachably fastening the recording head cartridge to the apparatus or further comprises an accommodating means for accommodating the recording head cartridge in the case member.

According to another aspect of the present invention, there is provided an information processing apparatus capable of recording information to a recording medium, comprising: input means for inputting information; display means for displaying information; information output means having a recording head for performing recording and an ink reservoir member; and a case member having an opening through which at least a portion of the information output means can be projected outwards and forming an outer case of the apparatus.

According to the aspects of the invention, the recording head cartridge integrally including the recording head and the ink reserving member is provided while being projected over the case member of the apparatus, so that in the ink reserving member, the quantity of ink can freely be determined regardless of the size of the apparatus.

Furthermore, the recording head cartridge can be attached/detached to and from the apparatus or accommodated in the apparatus, so that the apparatus having the recording head cartridge can be reduced in size and thickness. In addition, the size of an information processing apparatus such as a printer, a personal computer and a word processor can be reduced and an information output means which is not limited by the thus reduced size can be provided for the information processing apparatus.

According to another aspect of the present invention, there is provided an ink jet recording apparatus for performing recording by discharging ink to a recording medium, comprising: a recording head for discharging ink to the recording medium for the purpose of recording information to the recording medium; an ink tank for accommodating ink to be supplied to the recording head; and drive means capable of causing the recording head and the ink tank to perform scanning in a predetermined direction while relatively displacing the recording head and the ink tank for the purpose of recording information to the recording medium.

According to another aspect of the present invention, there is provided an ink jet recording apparatus for performing recording by causing a recording head for performing recording by discharging ink to a recording medium and an ink tank which accommodates ink to be supplied to the recording head to perform scanning across the recording medium, the ink jet recording apparatus comprising: support means for supporting the recording head and the ink tank in such a manner that they can be relatively displaced; and drive means for causing the recording head and the ink tank to perform the relative scanning operation in such a manner that the ink tank is positioned in the region to be scanned when the recording head is positioned at an end portion of a region to be scanned.

According to the aforesaid aspects, the ink jet recording head and the ink tank can be displaced relatively, so that a satisfactorily large recording range can be realized and the size of the ink tank can be enlarged while preventing deterioration of the handling facility or enlargement of the ink jet recording apparatus and the information processing apparatus having the same.

Other and further objects, features and advantages of the invention will be appear more fully from the following description.

BRIEF DESCRIPTION OF THE DRAWINGS

FIG. 22 is a schematic side cross sectional view which illustrates a structural example of a guide portion of a recording medium according to the aforesaid embodiment;

FIG. 49 is a schematic perspective view which illustrates another embodiment of the information processing apparatus according to the present invention;

FIGS. 53A to 53C are partial cross sectional views which illustrate the structure and the operation of the junction between the printer unit and the display unit of the information processing apparatus according to another embodiment of the present invention;

FIGS. 66A and 66B are side elevational views which illustrate a personal computer according to another embodiment of the present invention;

DETAILED DESCRIPTION OF THE PREFERRED EMBODIMENTS

Preferred embodiments of the present invention will now be described with reference to the drawings.

Figure 1:
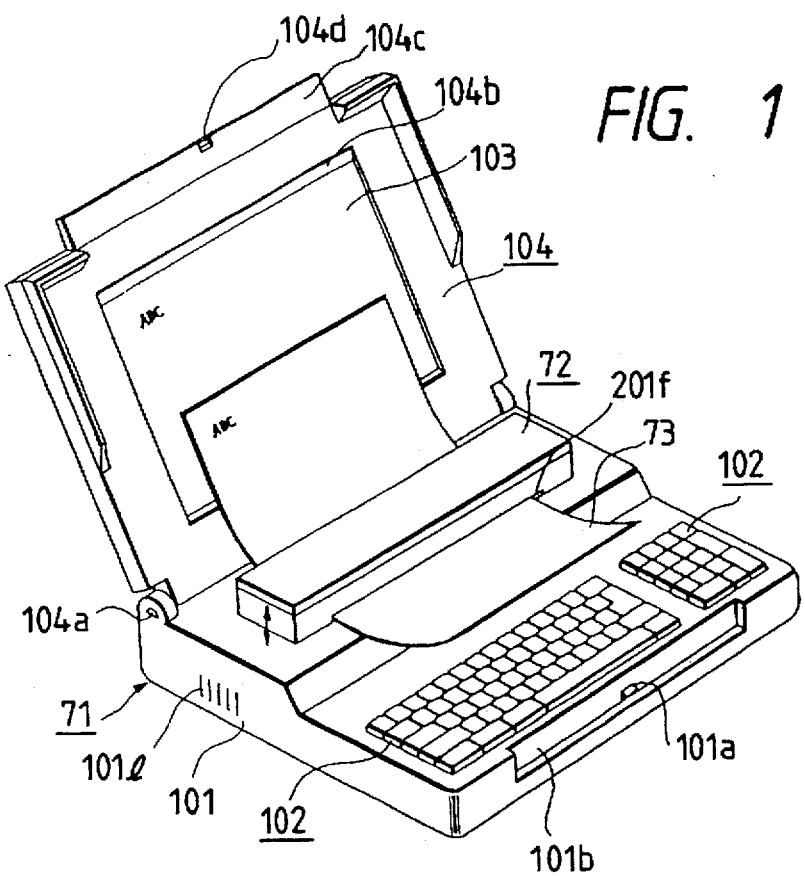
FIG. 1 is a perspective view which illustrates a word processor according to an embodiment of the present invention.

FIG. 1 is a perspective view which illustrates a personal computer embodying an information processing apparatus according to the present invention. A personal computer 71 comprises an apparatus body 101, a keyboard 102, an upper cover 104 having a display unit 103 and a printer 72. The upper cover 104 is rotatively fastened to the apparatus body 101 by hinges 104a disposed at the two side ends of the rear end portion of the apparatus body 101. Thus, the upper cover 104 is turned to be opened to a position at which its display unit 103 can easily been seen when the apparatus is used, and is closed to act as a cover when the apparatus is not used. The display unit 103 has a liquid crystal device as the display device because the thickness of the display unit can be reduced.

The upper cover 104 and the display unit 103 to be included in the upper cover 104 do not have the same level planes. That is, since the structure is arranged in such a manner that the electrical connecting portion (omitted from illustration) of the display unit 103 is covered with the upper cover 104, a predetermined step is generated between their surfaces. A slanted surface 104h is formed to make a predetermined angle with which the aforesaid step between the upper cover 104, and the display unit 103 can be joined by a smooth gradation. As a result, when a recording paper sheet is fed on the display unit 103 in a manner to be described later, a problem can take place in that the leading portion of a recording paper sheet 73 is caught by the aforesaid step. A latch plate 104c is fastened to the top end portion of the cover 104 by hinges (omitted from illustration) in such a manner that the latch plate 104c is able to turn by an angular degree of 90°, the latch plate 104c being opened to form the same plane in cooperation with the upper cover 104 as shown in FIG. 1 when the apparatus is used. A latch groove 104d is formed at the central portion of the latch plate 104c. The upper cover 104 is structured in such a manner that, when the upper cover 104 is closed, the latch plate 104c is turned so as to be fitted within a recessed portion 101b formed in the body 101. Furthermore, the latch groove 104d is fastened to a projection 101a formed on the recessed portion 101b. As a result, the upper cover 104 can reliably secured to the body 101.

The printer unit 72 having an ink jet recording head is disposed in front of the display unit 103. When the printer unit 72 is used, that is when the recording operation is performed, the printer unit 72 is upwards slid on the apparatus body 101. On the other hand, the printer unit 72 is accommodated in the body 101. The vertical movement of the printer unit 72 may be performed by the operation of a lever or a dial or the like by a user after a change generated due to this operation is converted into the vertical movement by a known means. As an alternative to this, the vertical movement may be automatically performed as a portion of the recording operation by a structure having a motor or the like. A plurality of structural examples to achieve the aforesaid vertical movement will be described later.

The recording paper sheet 73 is fed from this side of the apparatus through a paper feeding portion 201f formed in the printer unit 72, and is discharged along the surface of the upper cover 104 and the display unit 103 after data has been recorded by the printer unit 72. It is preferable that the surface of the display unit 103 has a low friction coefficient and excellent wear resistance because the recording paper sheet 73 slides on it at the time of the discharge operation. Hence, it is preferable that the surface of the display unit 103 be coated with fluororesin or the like.

A conventional structure of the keyboard 102 may be employed. Furthermore, a control circuit and the like each in the form of substrates are disposed in the apparatus body 101. In addition, a waste-ink absorber for accumulating waste ink discharged from the printer unit 72 is disposed in the body 101 as described later. In order to smoothly evaporate ink from the waste ink absorber, louvers 101l are formed in the cover members disposed on the two sides of the body 101. As described above, according to this embodiment, the passage through which the recording paper sheet is fed can be made substantially horizontal, so that thick paper sheets can be smoothly fed. Furthermore, since the movement of the printer unit 72 is allowed to be in only the vertical direction, the direction in which the recording operation is performed by the recording head can be always constant. In addition, the printer unit 72 is disposed in this side as compared with the position of the display unit 103, so that various manipulations of the printer can easily be performed while eliminating a necessity of a complicated action of closing the upper cover 104.

Figure 2:
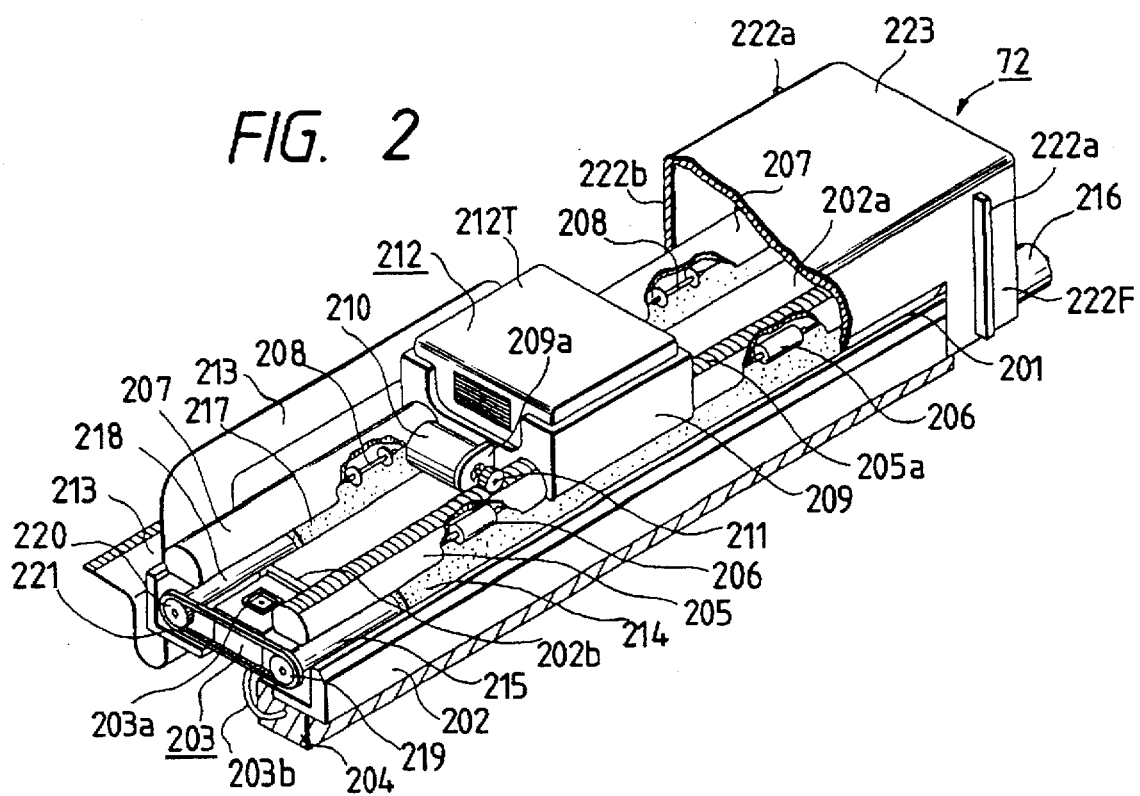
FIG. 2 is a perspective view which illustrates a printer unit according to an embodiment of the present invention.
Figure 3:
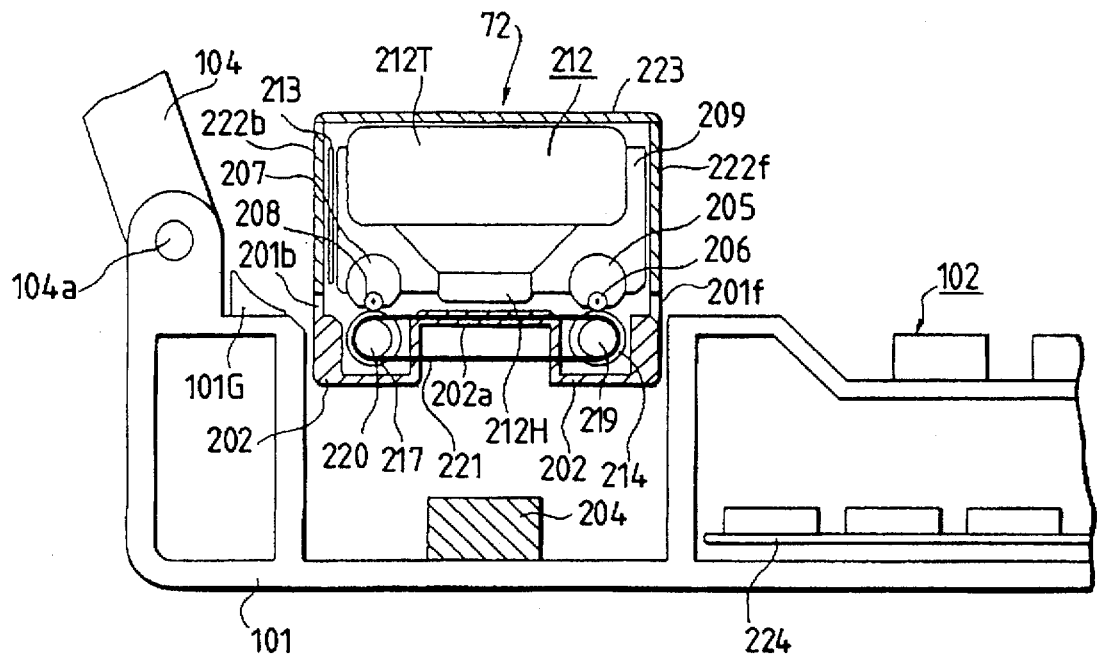
FIG. 3 is a cross sectional view which illustrates a state in which the printer unit of the apparatus shown in FIG. 1 has been moved to the upper position.

FIG. 2 is a perspective view which illustrates the detailed structure of the printer unit 72 shown in FIG. 1 while omitting the cover. FIG. 3 is a cross sectional view which illustrates a state where the printer unit 72 has been moved to the upper position on the apparatus body.

The mechanism of the printer unit 72 will now be described with reference to FIGS. 2 and 3.

The printer unit 72 has its case member comprising a front cover 222f, a rear cover 222b, a cover 223 and a base 202. The base 202, which is a structural member of the printer unit, has a W-shape like cross sectional shape extending, together with other case members, to cover a range in which the recording head to be described later moves. Reference numeral 202a represents a platen which forms a portion of the base 202 in such a manner that it extends in the range in which the recording head moves so as to confront a discharge port of the recording head while maintaining a predetermined interval from it. As a result, in the recording operation, the surface of the recording paper sheet 73 to which ink is discharged is restricted as desired during feeding of the recording paper sheet 73, so that the recording paper sheet can be maintained flat and as well as its position can be maintained as desired.

A cut portion 202b is formed in a portion of the side end portion of the home position of the base 202, the cut portion 202b acting to accommodate a recovery unit 203. The recovery unit 203 has a cap 203a, a drive motor (omitted from illustration), a suction pump (omitted from illustration) and an exhaust ink tube 203b and the like.

As a result, clogging which will take place in the discharge port or the like of the recording head due to ink, the viscosity of which has been increased, can be prevented, ink in the recording head cannot be dried and operations for maintaining the discharging performance of the recording head can be performed.

The waste ink absorber 204 is fastened to the bottom surface in the apparatus body 101 in such a manner that it extends in parallel to the platen 202a in substantially the same range of the platen 202a. The absorber 204 is made of a laminated paper sheet or porous material such as polyester fabric sponge and arranged to absorb, via a tube 203b, waste ink discharged from the recording head by the recovery unit 203 so as to accumulate it. Since ink is evaporated to atmospheric air during the time in which ink is held, the ink holding performance of the absorber 204 cannot substantially be deteriorated and thereby the absorber 204 can be used semipermanently.

The printer unit 72 has a pair of guide shafts 205 and 207 for guiding the movement of a recording head cartridge 212 to be described later. The guide shaft 205 is fastened to either of corresponding side plates (omitted from illustration) vertically disposed at the two end portions of the base 202. The guide shaft 205 has, on the upper surface thereof, a rack 205a having a length which is the same as the distance through which the aforesaid recording head cartridge 212 moves. The rack 205a and a pinion of a carrier motor to be described later are engaged to each other. A plurality of recessed portions are formed at predetermined positions in the lower surface of the guide shaft 205 so as to rotatively receive a pinch roller 206. The pinch roller 206 is urged downwards by a spring (omitted from illustration). The other guide shaft 207 disposed at the rear of the guide shaft 205 and running parallel to the guide shaft 205 is, similarly to the guide shaft 205, secured to the aforesaid side plates stood erect at the two end portions of the base 202. A plurality of recessed portions are formed at predetermined positions in the lower surface of the guide shaft 207 similarly to those formed in the guide shaft 205. The aforesaid recessed portions rotatively receive sheet retaining rollers 208. Each of the sheet retaining rollers 208 is formed into a spur-like shape or a disc-like shape and as well as the circumferential end surfaces of it is coated with water-repellent material such as a fluororesin. Thus, unfixed ink cannot easily adhere to the roller 208 immediate after the recording operation has been completed.

A carrier 209 is slidably fastened to the guide shafts 205 and 207. A bearing portion of the carrier 209 which engages to the guide shafts 205 and 207 is formed into a shape from which a lower portion is cut. As a result, the area of the carrier 209, which engages to the guide shafts 205 and 207, can be reduced and thereby the contact between the carrier 209 and the recording paper sheet which is being fed can be prevented. The carrier 209 integrally has, on either side surface thereof, a motor fastening plate 209a. Furthermore, a carrier motor 210 is secured to the fastening plate 209a. A pinion gear 211 fastened to the rotational shaft of the carrier motor 210 is engaged to the rack 205a of the guide shaft 205. As a result of the structure thus arranged, when the motor 210 is rotated in the forward or rearward direction, the carrier 209 is able reciprocate along the guide shafts 205 and 207.

The recording head cartridge 212 is constituted by integrally forming a recording head 212H and an ink tank 212T so as to be detachably fastened to the carrier 209. As a result, when ink has been exhausted in the ink tank, a novel head cartridge can be loaded while interchanging the recording head. The recording head according to this embodiment is arranged to form bubbles by utilizing thermal energy so as to discharge ink by the generated bubbles. The discharge port is formed in the recording head 212H in such a manner that it downwards discharge ink and is formed to confront the platen 202a at a predetermined interval.

A flexible cable 213 is secured to the carrier 209 at an end portion thereof so as to be electrically connected to the recording head 212 at a contact (omitted from illustration) thereof. The flexible cable 213 has loops formed at predetermined positions so as to follow the movement of the carrier 209 and the vertical movement of the overall body of the printer unit 72. Another end portion of the flexible cable 213 is connected to a control substrate (see FIG. 3) disposed in the apparatus body.

A paper feeding roller 214 is disposed to maintain a predetermined interval from the guide shaft 205 and running parallel to the same. The paper feeding roller 214 is formed by winding material such as rubber having a large friction coefficient around the roller shaft 215 to form a cylindrical shape. As an alternative to winding the rubber or the like, material such as urethane having a large friction coefficient may be uniformly applied to the same to form a thin layer. Similarly to the guide shafts 205 and 207, the roller shaft 215 is rotatively supported by the side plates disposed at the two side end portions of the base 202. The paper discharge roller 217 is disposed in parallel to the guide shaft 207 while maintaining a predetermined interval from the same. The structure of the paper discharge roller 217 is arranged to be the same as that of the aforesaid paper feeding roller 214. A roller shaft 218 of the paper discharge roller 217 is rotatively supported by the side plates of the base 202 similarly to the roller shaft 215. A paper feeding pulley 219 is secured to an end portion of the roller shaft 215, while a paper discharge pulley 220 is secured to an end portion of the roller shaft 218. The pulleys 218 and 220 have a timing belt 221 arranged therebetween. Furthermore, a paper feeding motor 216 is fastened to an end portion of the base 202, so that its rotational force is transmitted to the paper feeding roller shaft 215 via a transmission mechanism (omitted from illustration).

In the thus arranged structure, the rotation of the paper feeding roller 214 generated by the rotation of the paper feeding motor 216 is transmitted to the paper discharge roller 217 via the pulleys 219, 211 and the belt 221. The paper discharge roller 217 has a diameter which is slightly larger than that of the paper feeding roller 214 so as to be capable of feeding the paper sheet by a larger quantity than that of the paper feeding roller 214. As a result, the recording paper sheet is always pulled from a rear stream or downstream position during feeding of the recording paper sheet, causing the feeding operation to be performed stably. As an alternative to making the diameters of the rollers different from each other, the pulley has a slightly larger diameter in its rear stream portion. The aforesaid rollers have relatively weak feeding force in their rear stream portion so as to eliminate the looseness of the paper sheet and to discharge the rear end portion of the paper sheet.

The aforesaid front case 222f has the paper feeding port 201f through which the recording paper sheet 73 is inserted for the purpose of supplying the recording paper sheet 73 to the apparatus, a portion of the front case 222f being fastened to the base 202.

The front case 222f and the rear case 222b respectively have vertical guide rails 222a in their two end portions for the purpose of elevating the overall body of the printer unit. The printer cover 223 is fastened to the front case 222f via hinges so that it can be opened/closed. As a result, the recording head cartridge can be interchanged after the cover 223 has been opened.

Referring to FIG. 3, a circuit board 224 having a CPU for executing the operation of controlling the apparatus or the like, peripheral ICs, a memory device, a driver IC, and the like mounted on the surface thereof is accommodated in the apparatus body 101. The apparatus body 101 has, in a portion thereof, a guide plate 101G formed into a thin-plate shape and having a spherical surface to guide the recording paper sheet 73 discharged after the recording operation to the portion on the display unit. In order to prevent an interference between the guide plate 101G and the upper cover 104, the upper cover 104 has a slit at its position which confronts the guide plate 101G. The structure of the guide plate 101G may be arranged in such a manner that it is pushed down when the upper cover 104 is moved or is pushed down in synchronization with the downward movement of the printer unit 72.

Figure 4:
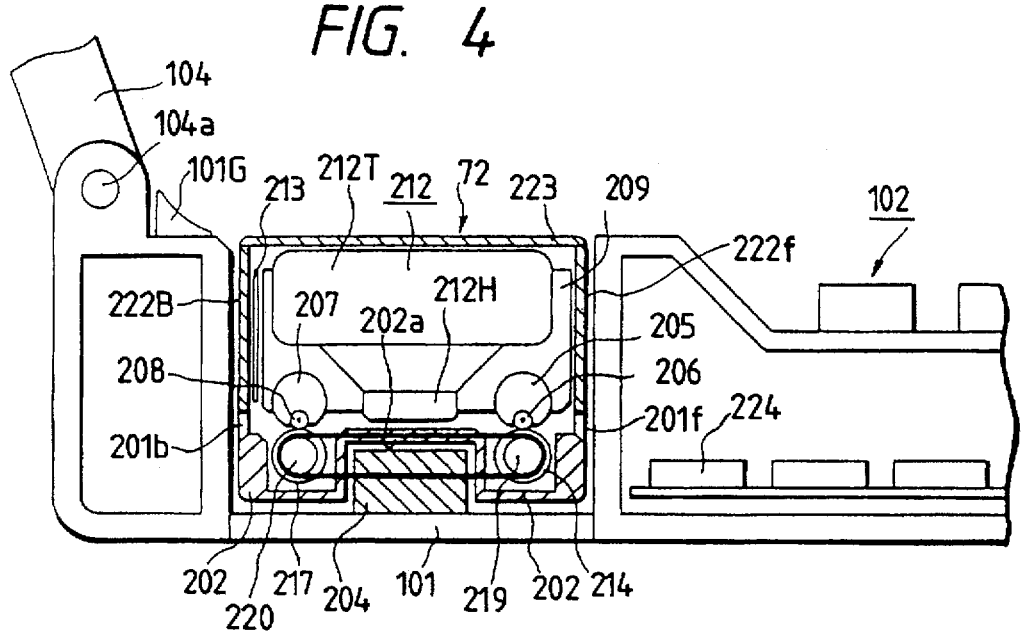
FIG. 4 is a cross sectional view which illustrates a state where the printer unit of the apparatus shown in FIG.1 has been accommodated in the body of the apparatus.

FIG. 4 illustrates a state where the printer unit 72 is accommodated in the apparatus body 101. In this state, the ink absorber 204 is accommodated in the recessed portion of the base 202. As described above, the vertical movement of the printer unit 72 is realized by the lever or the transmitting mechanism (omitted from illustration) disposed at the end portion of the printer unit 72.

Figure 5A:
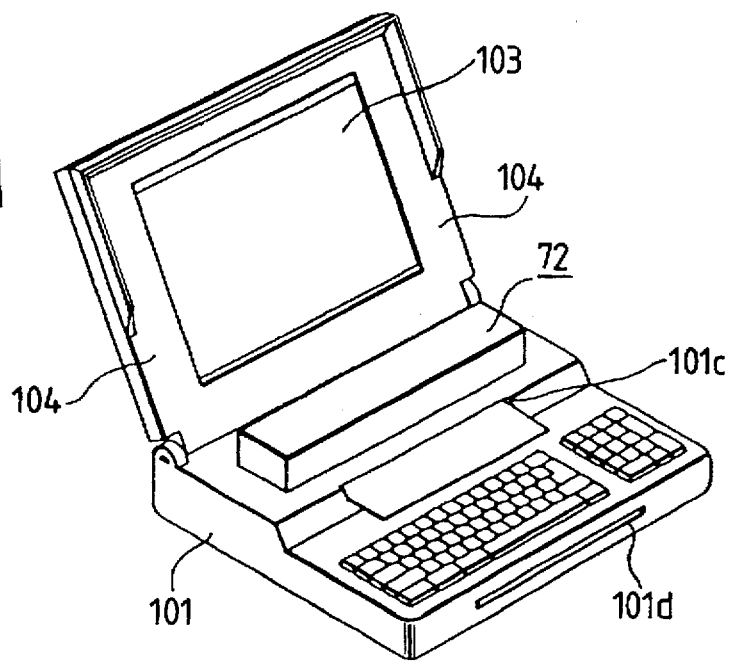
FIGS. 5A and 5B are perspective views which illustrate two states in the apparatus according to another embodiment of the present invention.
Figure 5B:
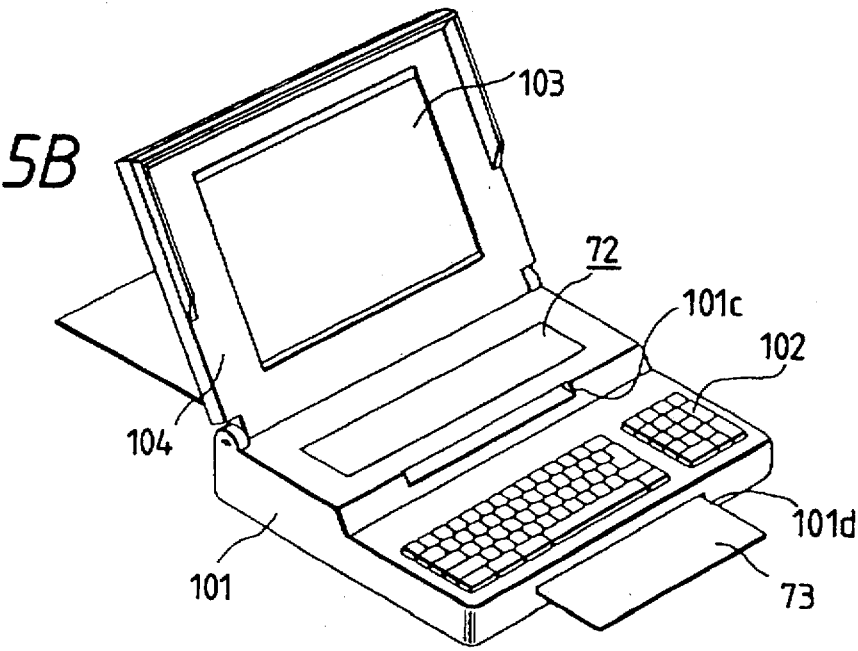

FIGS. 5A and 5B respectively are perspective views which illustrate a personal computer according to another embodiment of the present invention. Hereinafter the same reference numerals as those according to the aforesaid embodiment are given the same reference numerals and their descriptions are omitted.

FIG. 5A illustrates a case in which a recording paper sheet is a thick and relatively short medium such as an envelope and a postcard. In this case, the printer unit 72 is positioned on the apparatus body 101 and the recording paper sheet is inserted through a paper feeding port 101c formed in the body 101 before it is discharged through a first paper discharge port 101e formed in the rear portion of the apparatus. At this time, the first paper supply port 101c is able to also serve as a guide for restricting the horizontal position of the recording paper sheet so as to smoothly make the recording paper sheet to be set smoothly.

In the aforementioned case in which the recording paper sheet is a postcard or the like having a relatively short length in the direction in which it is fed, the keyboard is not covered by the recording paper sheet set as described. Therefore, the manipulation by using the keys can be performed even if the recording operation is being performed. Furthermore, the passage through which the recording paper sheet is fed can be made to be straight, so that feeding of a thick paper sheet can be fed smoothly.

FIG. 5B illustrates a case in which a thin and long recording paper sheet such as an ordinary A4 sheet or a letter is used. In this case, the recording paper sheet 73 is inserted through a second paper supply port 101d formed below the keyboard 102. Then, the recording paper sheet 73 passes a portion above a substrate 224 in the apparatus to be moved in the feeding passage which penetrates the body of the apparatus before it is discharged through the second discharge port 101f formed in the rear portion of the apparatus. Also in this case, the recording paper sheet is not present on the keyboard 102 and the display unit 103, so that a variety of manipulations can be performed by using the keyboard and the display unit even if the recording operation is being performed.

Figure 6:
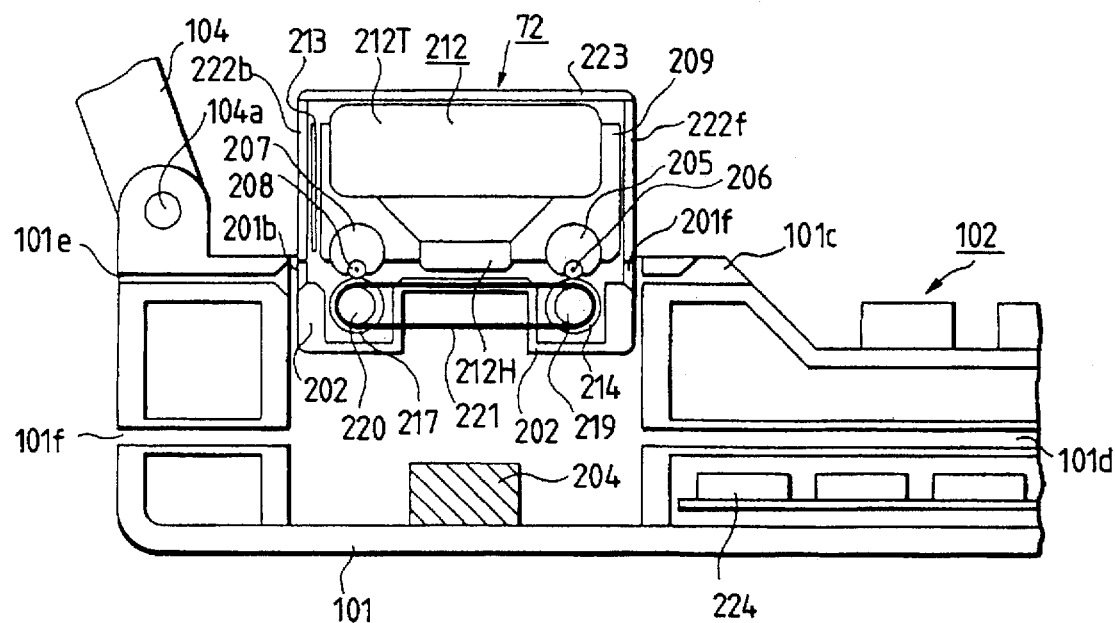
FIG. 6 is a cross sectional view which illustrates the state shown FIG. 5A.
Figure 7:
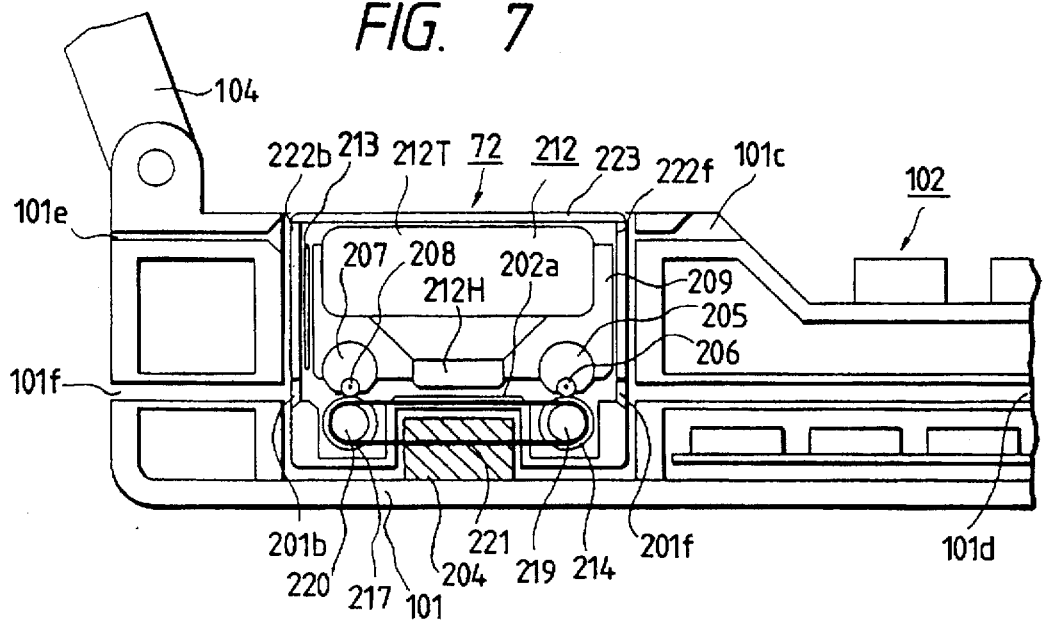
FIG. 7 is a cross sectional view which illustrates the state shown in FIG. 5B.

FIGS. 6 and 7 respectively are cross sectional views which illustrate the same states shown in FIGS. 5A and 5B.

In the case shown in FIG. 5A where the printer unit 72 is positioned on the apparatus body 101, the feeding passage for the recording paper sheet is, as shown in FIG. 6, formed by the paper feeding port 101c, the paper feeding port 201f, the paper discharge port 201b and the paper discharge port 201b of the printer unit 72, and the paper discharge port 101e formed in the rear portion of the apparatus. In a case where the printer unit 72 is used in such a manner that it is accommodated in the apparatus body 101, the passage through which the recording paper sheet is fed is, as shown in FIG. 7, formed by the paper feeding port 101d, the paper feeding port 201f and the paper discharge port 201b of the printer unit 72 of the printer unit 72 and the paper discharge port 101f disposed in the rear portion of the apparatus.

Figure 8:
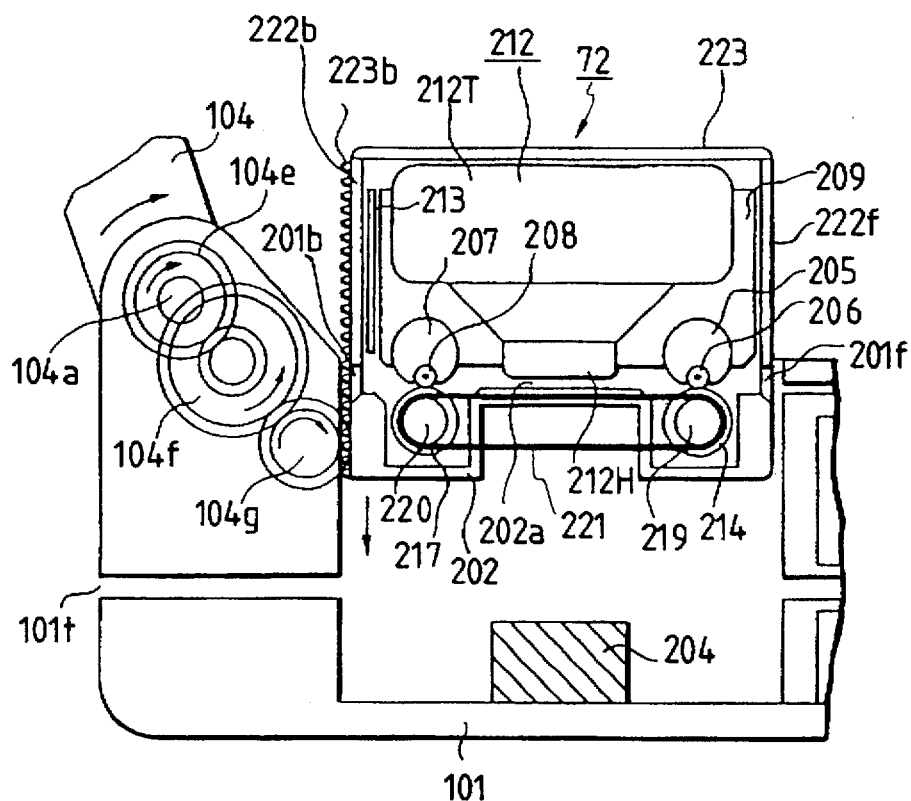
FIG. 8 is a cross sectional view which illustrates an embodiment of an elevating mechanism of the printer unit.
Figure 9:
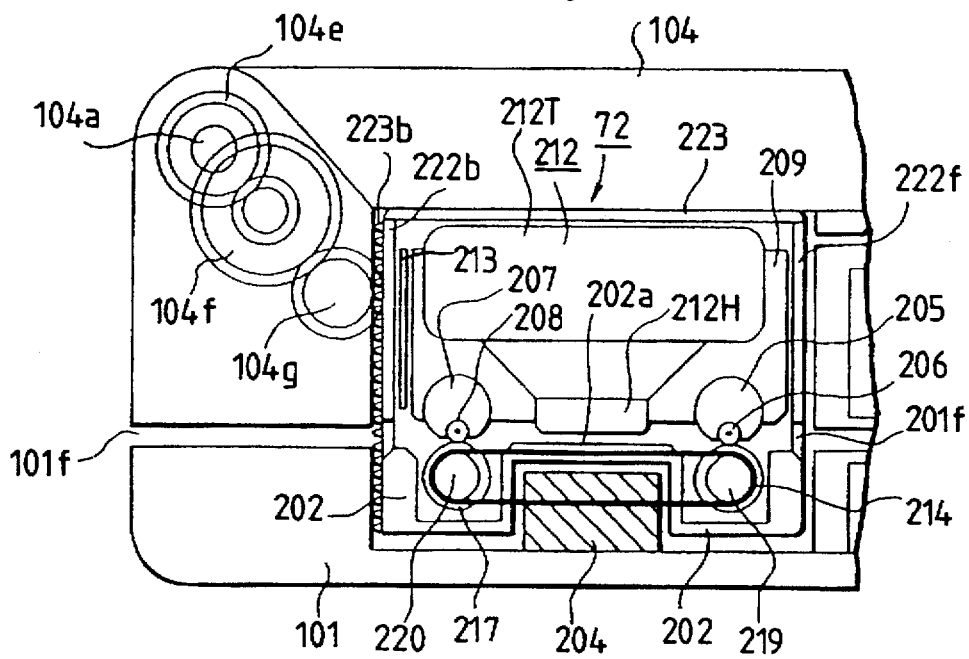
FIG. 9 is a cross sectional view which illustrates a state where the printer unit according to the embodiment shown in FIG. 8 has been accommodated.

FIGS. 8 and 9 illustrate another mechanical example of the printer unit elevating mechanism. That is, this example is arranged in such a manner that the printer unit 72 is vertically moved in synchronization with the opening/closing operation of the upper cover 104. Therefore, a drive gear 104e having the same axle with the shaft of the hinge 104a of the upper cover 104 is secured to the upper cover 104. Furthermore, in order to transmit the rotation of the drive gear 104e, an idle gear 104f and a pinion gear 104g are provided for the apparatus, the pinion gear 104g and a rack 223b provided for the printer unit 72 are engaged to each other. Thus, the printer unit 72 can be vertically moved in synchronization with the opening/closing operation of the upper cover 104.

Figure 10:
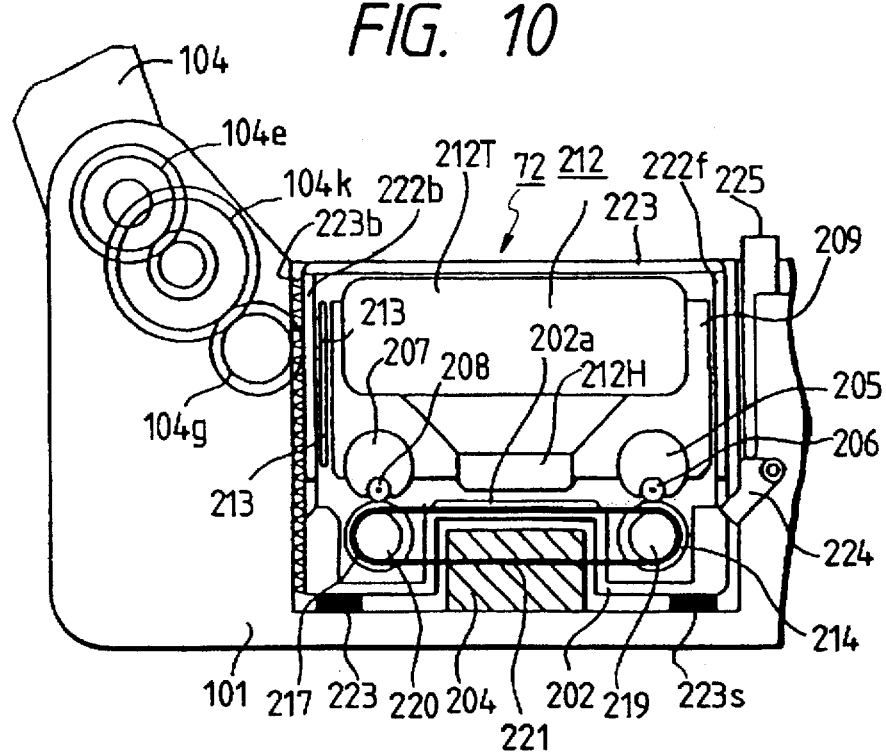
FIG. 10 is a cross sectional view which illustrates another embodiment of the elevating mechanism of the printer unit.
Figure 11:
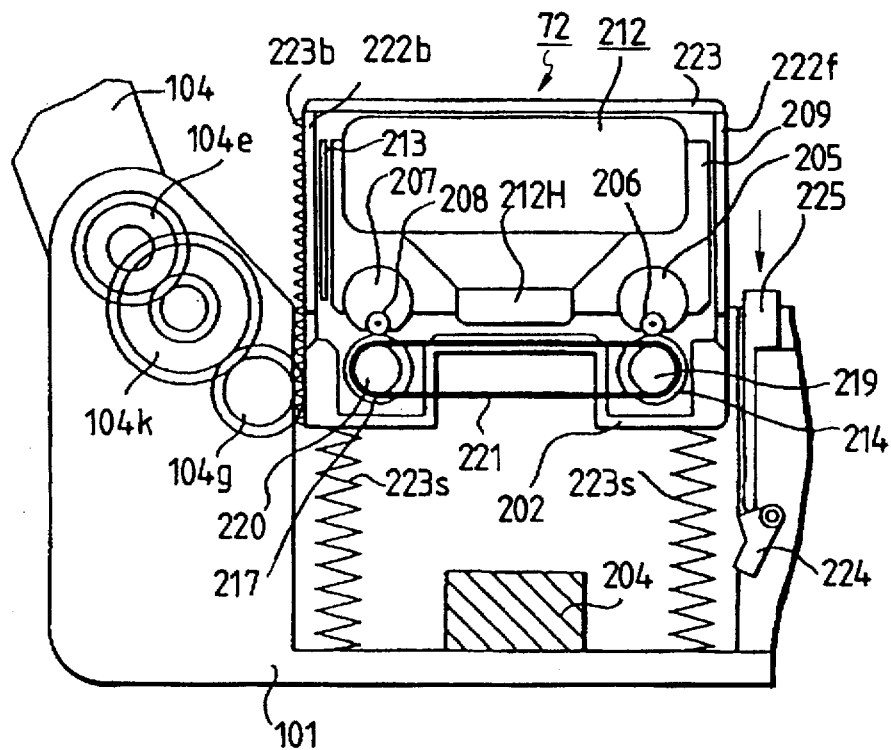
FIG. 11 is a cross sectional view which illustrates another state of the printer unit according to the embodiment shown in FIG. 10.

FIGS. 10 and 11 illustrate another example of the printer unit elevating mechanism.

In this example, the printer unit 72 is upwards urged by a spring 223s. When the printer unit 72 is accommodated in the body 101, the printer unit 72 locked by a lock lever 224, which is allowed to turn in only one direction, so that its upward movement is inhibited. In a case where the printer unit 72 is upwards moved, a button 225 is depressed to turn the lock lever 224, so that locking of the printer unit 72 is suspended. As a result, the printer unit 72 is upwards moved by the urging force of the spring 223s. Since an idle gear 104k is sectioned into two portions by a one-way clutch at this time, the drive gear 104e is not rotated. When the upper cover 104 is closed, the rotation of the drive gear 104e is transmitted to a rack 223b via the idle gear 104k and the pinion gear 104g, so that the printer unit 72 is moved downwards.

Figure 12:
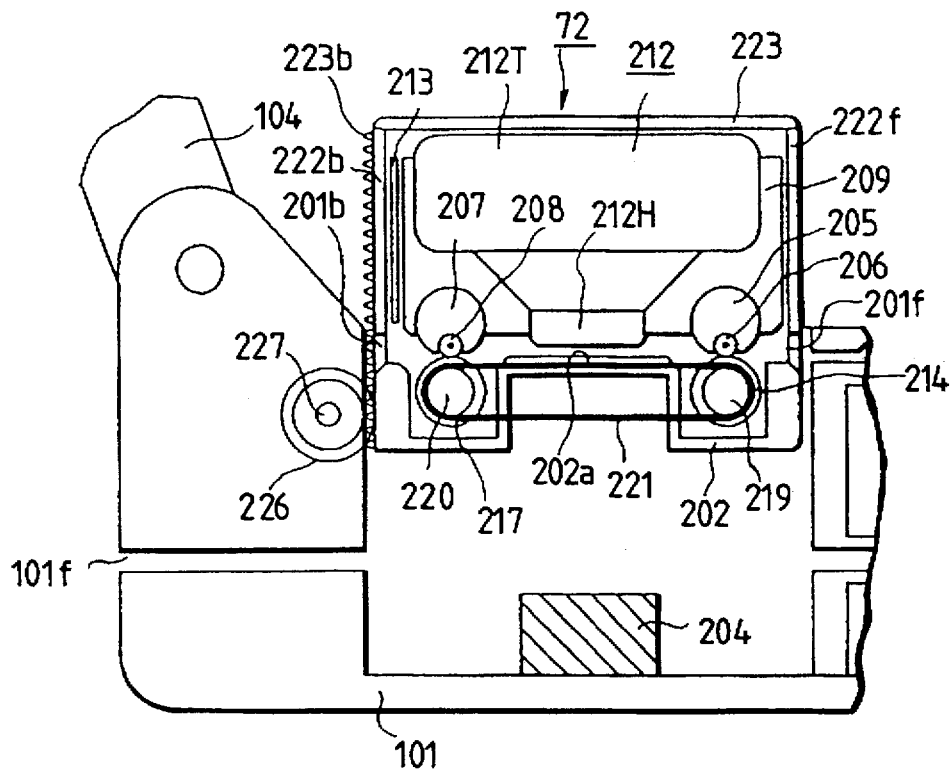
FIG. 12 is a cross sectional view which illustrates another embodiment of the elevating mechanism of the printer unit.
Figure 13:
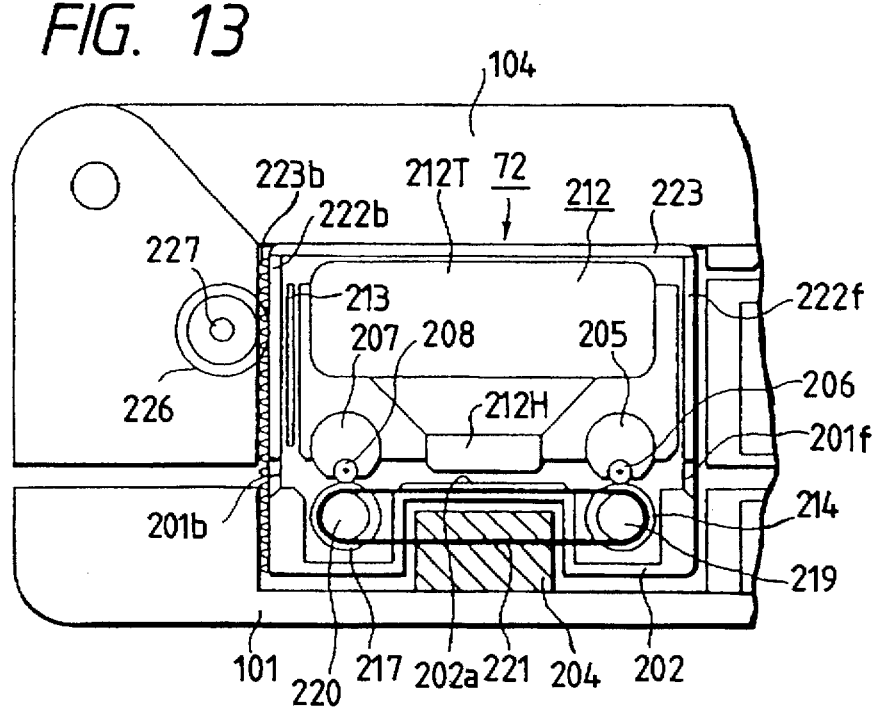
FIG. 13 is a cross sectional view which illustrates another state of the printer unit according to the embodiment shown in FIG. 12.

FIGS. 12 and 13 depict another example of the printer unit moving mechanism. In this example, a motor 227 and a pinion gear 226 are provided additionally so as to vertical move the printer unit by electric power.

Figure 14:
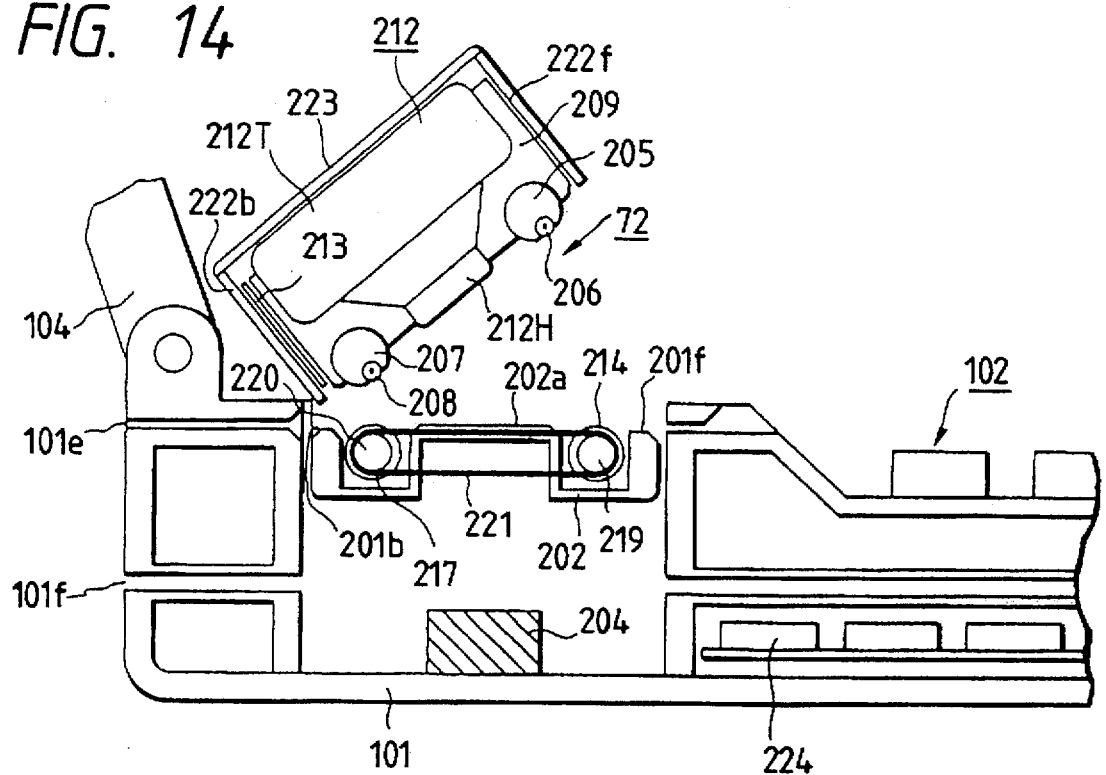
FIG. 14 is a cross sectional view which illustrates another embodiment of the printer unit.

FIG. 14 illustrates another example of the structure of the printer unit. The printer unit according to this example is arranged in such a manner that the upper half portion of the unit can be opened/closed by dividing the unit at a paper feeding port 201f and a paper discharge port 201b. Thanks to the structure thus arranged, eliminating the paper jamming and cleaning of the surface of the platen can easily be performed.

Figure 15:
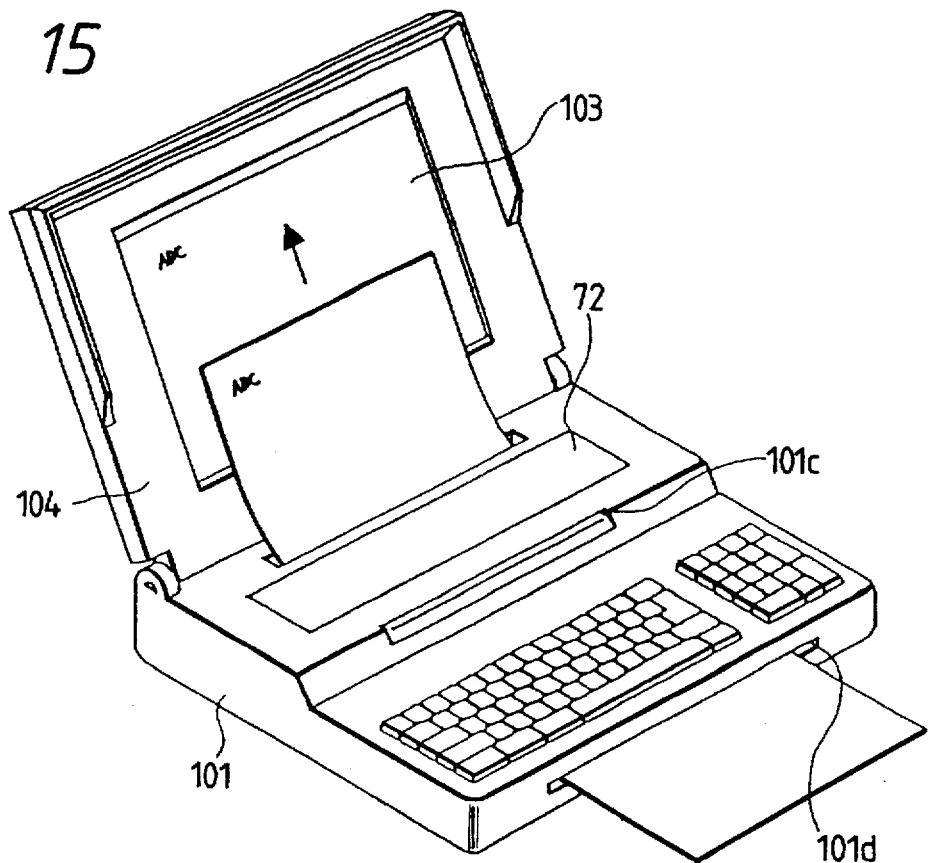
FIG. 15 is a perspective view which illustrates another modification to the word processor shown in FIG. 5.
Figure 16:
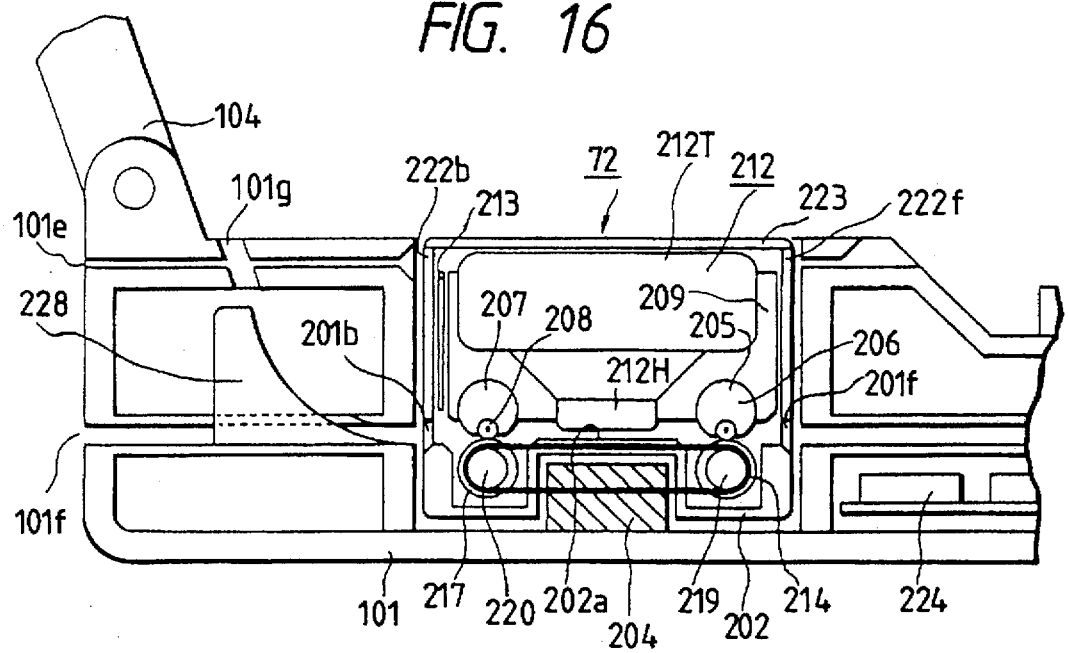
FIG. 16 is a cross sectional view which illustrates the word processor shown in FIG. 15.

A modification to the embodiment is shown in FIGS. 15 and 16.

In this embodiment, a switch-over plate 228 is disposed in the recording paper sheet feeding passage which reaches the paper supply port 101d. When the switch-over plate 228 is stood or pushed down, the direction in which the recording paper sheet is discharged can be arbitrarily selected. Thus, the recording paper sheet is discharged through the paper discharge port 101g to the portion adjacent to the display unit in a case where an operator does not see the display unit 103 at the time of the operation of the apparatus. Therefore, the space required to discharge the recording paper sheet can be eliminated and as well as the result of the recording operation can easily be confirmed.

Although the aforesaid embodiments are described about the information processing apparatus arranged to have the components formed integrally, the present invention is not limited to this. For example, another structure may be employed in which the detachable components can be integrally mounted on the information processing apparatus in such a manner that they hold one another so that the integrated apparatus can be carried.

Figure 17:
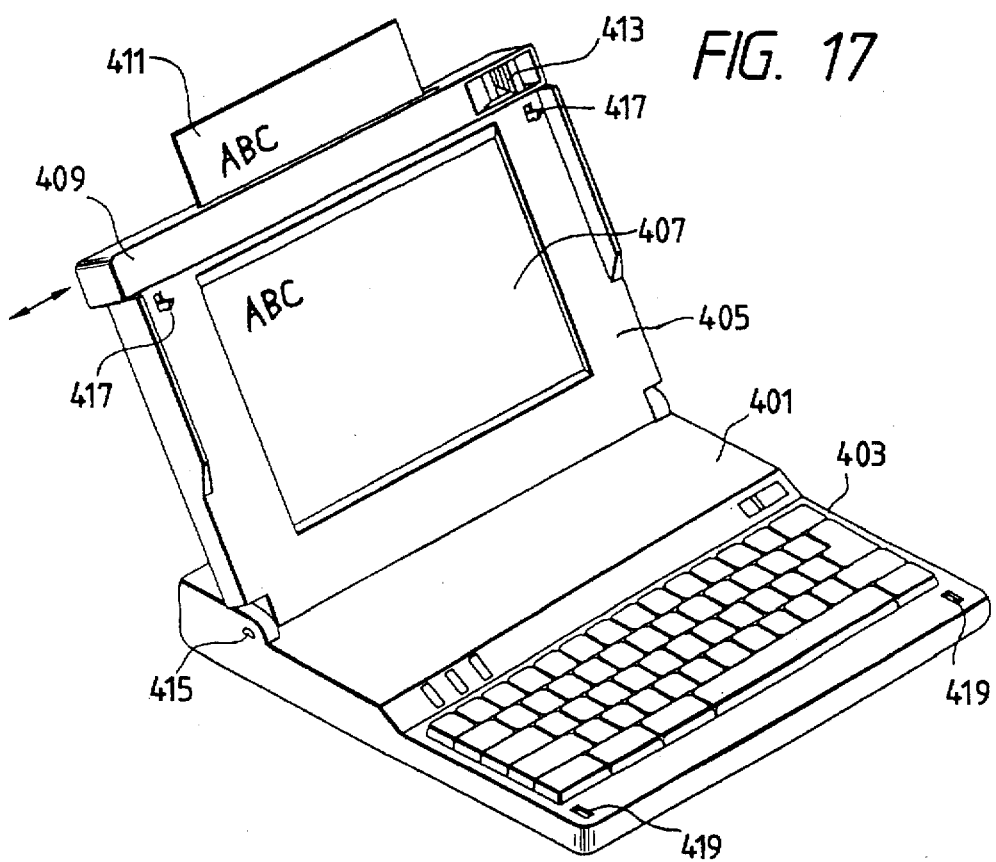
FIG. 17 is a schematic perspective view which illustrates another embodiment of the information processing apparatus according to the present invention.
Figure 18:
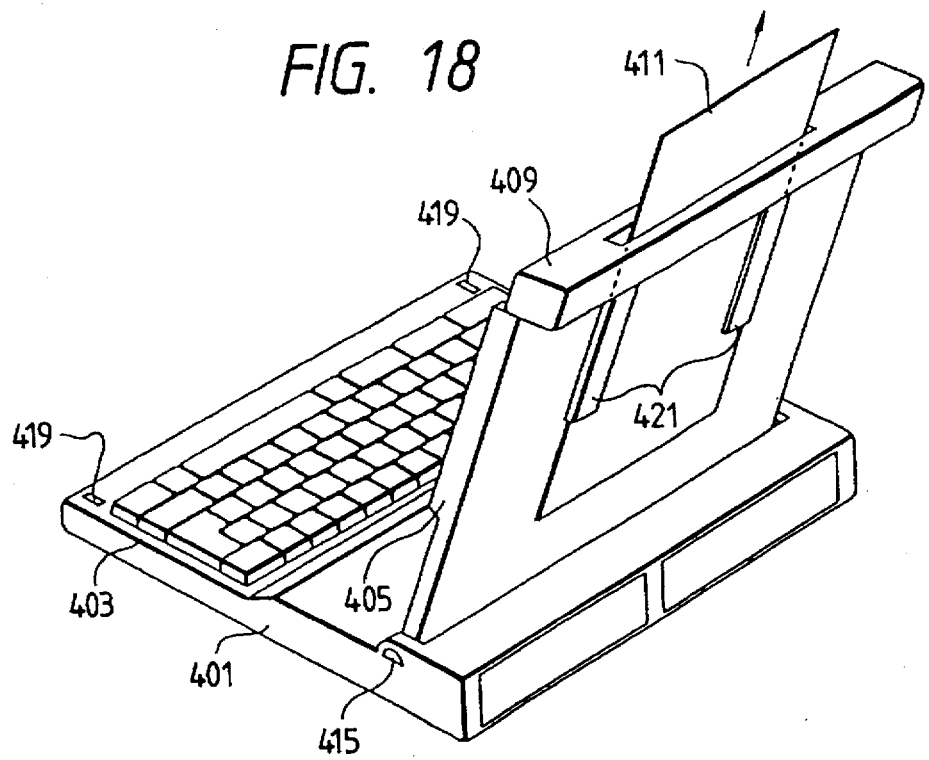
FIG. 18 is a schematic perspective view which illustrates the apparatus shown in FIG. 17 when viewed from the reverse side.

FIGS. 17 and 18 respectively are a front elevational perspective view and a back perspective view which illustrate another embodiment of the information processing apparatus according to the present invention. Referring to FIG. 17, reference numeral 401 represents an apparatus body comprising a keyboard 403 serving as a manipulation input portion having keys to input characters, figures and the like and keys to issue various commands. Reference numeral 405 represents a display unit having a display scope 407 for displaying information supplied with the keyboard 403 and information processed in the apparatus. The display 407 may be a liquid crystal display or a plasma display or the like with which the thickness of the display unit 405 can be reduced and as well as the rear portion of the same can be made flat. If a light source can be provided for the purpose of making the display be seen clearly, a backlight structure may be employed. A sidelight display may be employed for the purpose of reducing the thickness of the display unit 405.

Reference numeral 409 represents a printer unit integrally formed with the display unit 405 and arranged to be positioned above the display unit 405 in the state shown in FIGS. 17 and 18 (a state in which the apparatus is used). The printer unit 409 records, to a recording medium 411, information supplied with the keyboard 403 or information processed in the apparatus. Reference numeral 413 represents a release lever provided for the printer unit 409 for separating a pair of rollers for holding/feeding the recording medium 411. The detailed structure of the printer 409 will be described later with reference to FIGS. 19 and 20.

The display unit 405 having the printer unit 409 integrally formed on the upper portion thereof can be turned while making a hinge shaft 415 disposed in the body 401 to be the rotational center. When the apparatus is used, the display portion is opened as shown in FIG. 17, while the same is folded on the keyboard 403. Reference numeral 417 represents a latch hook disposed on the surface of the display unit 405. Reference numeral 419 represents a latch hole formed in the body 401 and receiving the latch hook 417 when the display unit 405 is folded in such a manner that the hook 419 is fastened to a fastening portion formed in the latch hole 419 so as to prevent undesired opening of the display unit 405.

In this embodiment, the printer portion 409 can be slid on the top surface of the display unit 405 in directions designated by arrows of FIG. 17 between this side and the rear portion of the display unit 405. When the printer unit 409 is positioned nearest the operator, the printer unit 409 is placed at an accommodation position (a non-operation position) at which the printer unit 409 does not project over the back surface of the display unit 405. When the printer unit 409 is positioned at the rearmost position, the printer unit 409 is placed at a recording position (an operation position) which at least a portion of the lower surface of the printer 409 is shifted and projected over the top surface of the display unit 405. When the printer unit 409 is positioned at the aforesaid recording position, the feeding passage for the recording medium 411 can be secured as shown in FIG. 18. This embodiment is arranged in such a manner that the position of the printer unit 409 realized by the sliding action and the position of the latch hook 417 are made to be related to each other in such a manner that, when the printer unit 409 is positioned in the position adjacent to an operator, the latch hook 417 is fastened to the fastening portion in the latch hole 419 and they are separated from each other when the printer unit 409 is positioned in the rear position. The mechanism capable of realizing this will be described later with reference to FIG. 21.

Referring to FIG. 18, reference numeral 421 represents a pair of guide members provided for the purpose of smoothly feeding and setting the recording medium 411 while preventing diagonal and meandering movements. That is, in this embodiment, the recording medium 411 can be fed in one plane along the rear surface of the display portion 405 while preventing a bend. The guide members 421 may be arranged in such a manner that either or both of them can be moved in a direction in which the interval between the guide members 421 can be changed in order to guide plural size recording mediums.

Figure 19:
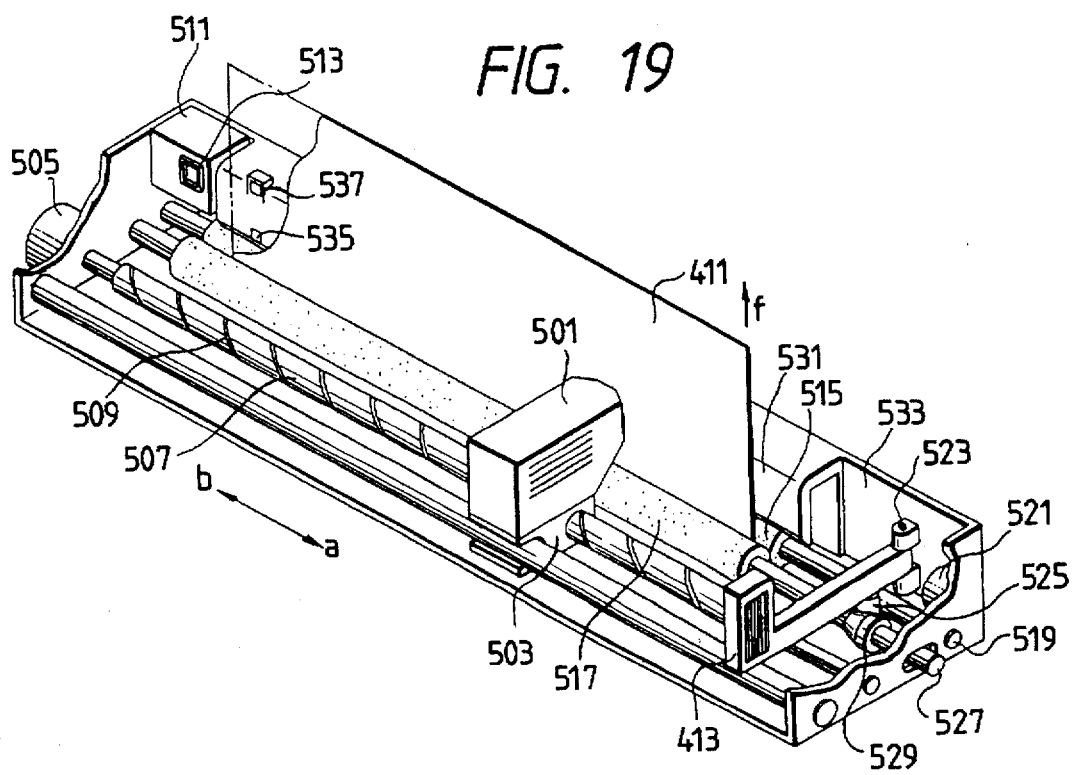
FIG. 19 is a schematic perspective view which illustrates a structural example of the printer unit of the apparatus shown in FIG. 17.

FIG. 19 is a schematic perspective view which illustrates an example of the structure of a printer unit of an ink jet recording type embodying the printer unit 40.

Referring to FIG. 19, reference numeral 501 represents a head cartridge comprising an ink jet recording head and an ink tank which are integrally formed. The head cartridge 501 is detachably fastened to the ink jet recording apparatus shown in FIG. 19 and the same can be interchanged with a novel head cartridge when the ink in the ink tank is consumed.

The recording head is constituted by a plurality of electrothermal conversion devices for generating thermal energy utilized to discharge the ink, a substrate on which a drive circuit for driving the electrothermal conversion devices is formed, discharge ports corresponding to a plurality of the electrothermal conversion devices and liquid passages formed in the substrate and a ceiling plate placed for the purpose of forming a common liquid chamber which communicates with each liquid passage. The recording head thus constituted is mounted on the apparatus in such a manner that a surface in which the discharge ports are formed confronts the recording medium 411.

The ink tank has a volume which is the major portion of that of the head cartridge 501 and includes an ink accumulating chamber for accumulating ink. If a proper ink supply passage can be formed in, for example, the reverse side of the display 407 in the display unit 405, another structure may be employed in which only the recording head is mounted on the apparatus as an alternative to the structure according to this embodiment in which the head cartridge has the ink tank formed integrally.

A carriage 503, on which the head cartridge 501 is mounted, has a pin (omitted from illustration) which is fastened to a spiral groove 509 of a lead screw 507 which is rotated in synchronization with the forward/rearward rotation of the drive motor 505 via a transmitting mechanism (omitted from illustration). Thus, the carriage 503 is reciprocated in directions designated by arrows a and b when the lead screw 507 is rotated. Reference numeral 508 represents a carriage guide shaft for restricting the rotation of the carrier. The structure for establishing an electrical connection between this apparatus and the recording head is omitted from FIG. 19 but the same may be a structure disclosed in, for example, Japanese Patent Laid-Open No. 3-104677 (U.S. Ser. No. 583,587).

Reference numeral 511 represents a recovery unit comprising a cap 503 which confronts the surface of the head cartridge 501 having discharge ports at a predetermined position (for example, the home position) outside the recording region of the head cartridge 501. The recovery unit 511 further comprises a cap movement drive portion (omitted from illustration) for bringing the cap 503 into contact with the surface having the discharge ports so as to protect the cap 503 at the time of the non-recording operation. In addition, the structure may include a pump for satisfactorily maintaining the ink discharge state by discharging ink, the viscosity of which has been undesirably raised, dust and bubbles by absorbing ink through the discharge ports at the moment of the aforesaid contact and a member for accumulating waste ink thus absorbed.

Reference numeral 515 represents a feeding roller for feeding the recording medium 411 in a direction designated by arrow f of FIG. 19. Reference numeral 517 represents a pinch roller for pressing the recording medium 411 against the feeding roller 515. Thus, the recording medium 411 is held between the aforesaid pair of rollers so as to be intermittently fed in the direction f of FIG. 19 at the time of the recording process. The feeding roller 515 has its shaft 519 which is engaged to a motor 521 via an employed transmitting mechanism so that the rotational force of the motor 521 is transmitted to the feeding roller 515. The pinch roller 517 can be brought into contact/separated from the feeding roller 515 by the operation of the release lever 413.

Reference numeral 523 represents a rotational shaft of the release lever 413, 525 represents a roller provided for the lever 413 and 527 represents a pinch roller shaft. Reference numeral 529 represents a cam provided for the pinch roller shaft 527 and acting to be engaged to the roller 525 when the lever 413 is turned and to receive the force for separating the pinch roller 517 from the feeding roller 515. Reference numeral 531 represents a platen for making the recording side of the recording medium 411 to be flat. In this embodiment, the platen 531 is integrally formed with a printer base 533. The structure may be arranged to have a member for bringing the recording medium 411 into contact with the platen 531 so as to prevent floating of the recording medium 411. Reference numerals 535 and 537 represent a pair of sensors disposed in front and rear of the recording position in the recording medium feeding direction f for the purpose of detecting the presence of the recording medium 411.

Figure 20A:
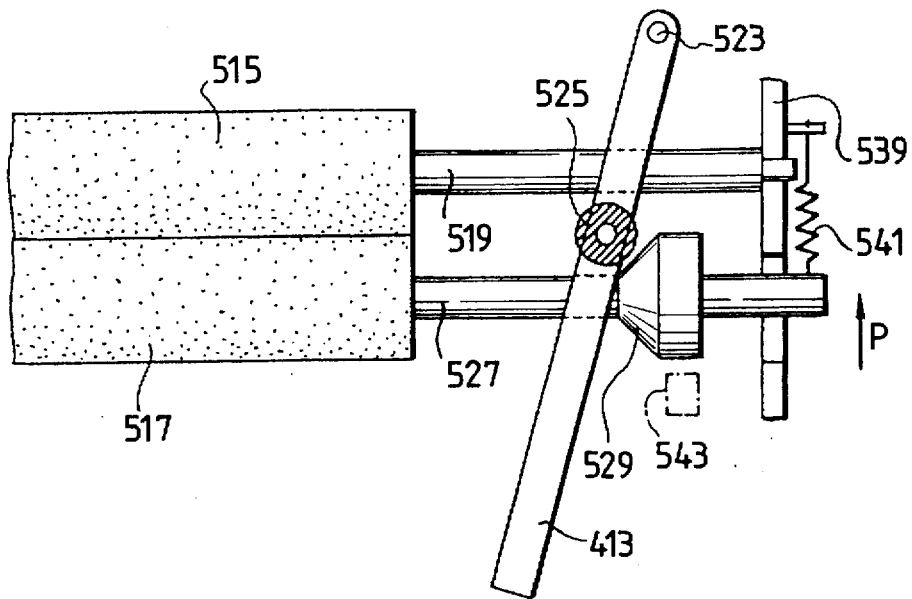
FIGS. 20A and 20B are schematic plan views which illustrate a structural example and the operation of a pinch roller release mechanism of the printer unit.
Figure 20B:
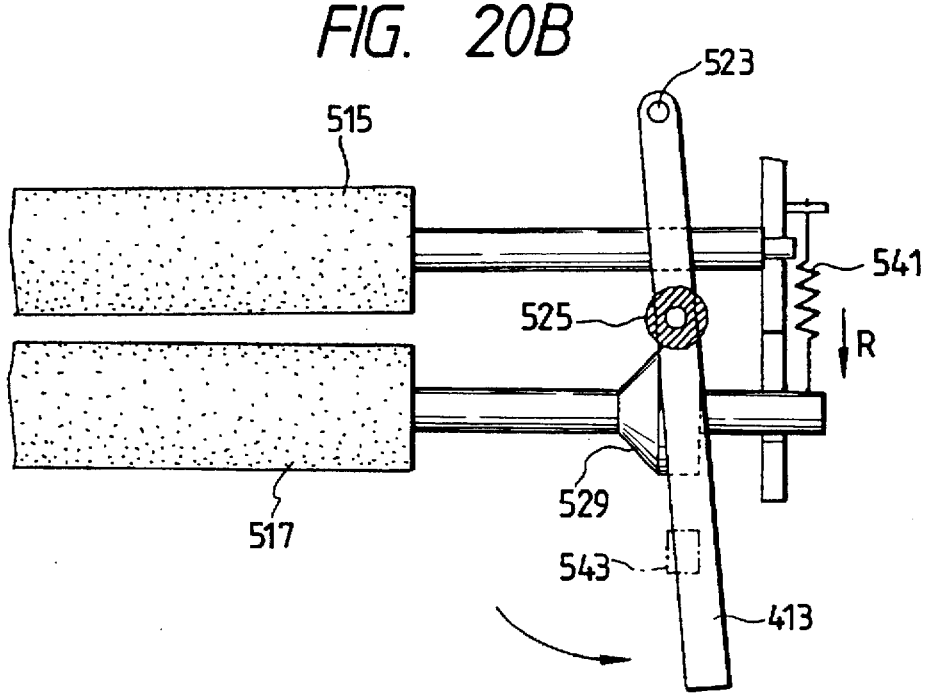

FIGS. 20A and 20B respectively illustrate a state in which the pinch roller 517 is pushed against the feeding roller 515 and a state in which the same is separated from the feeding roller 515.

In the pressurization state shown in FIG. 20A in which the recording medium 411 is held and fed by the pair of the rollers, the release lever 413 is positioned at which its roller 525 is not engaged to the cam 529. Therefore, the pinch roller 517 is urged in direction P toward the feeding roller 515 by, for example, a spring 541 provided for a base side plate 539. When the lever 413 is, in this state, turned counterclockwise while making the rotational shaft 523 be the rotational center, the roller 525 is engaged to the cam 529. As a result, the roller 525 is moved to a position on the tapered surface of the cam 529 as shown in FIG. 20B. Hence, the pinch roller 517 is moved in direction R against the urging force of the spring 541, causing a gap to be generated from the feeding roller 515.

Although the recording medium 411 may be set to the printer unit 409 from a position lower than the printer portion 409, this embodiment is arranged in such a manner that it is set to the same from an upper position when viewed in FIG. 17 and 18 because the recording medium can be set easily. When the rollers 515 and 517 are separated from each other in this state, the recording medium 411 can easily and quickly be inserted between the two rollers 515 and 517. When the release lever 413 is returned to the state shown in FIG. 20A at a proper insertion position, the recording medium 411 can be held between the rollers. After the aforesaid holding state has been realized or after the lower edge of the recording medium has been brought into contact with the portion between the contact rollers, the feeding roller 515 is rotated reversely so as to (reversely) feed the recording medium 411 in a direction opposing the feeding direction f at the time of the recording mode. As a result, the recording medium is set (setting of the leading portion) to a predetermined recording start position in response to the output from the sensor 537.

The states respectively shown in FIGS. 20A and 20B can be detected by, for example, a photosensor 543 disposed in the range in which the release lever is turned. The method in which the detection signal is employed by the sensor 543 will be described later.

Figure 21A:
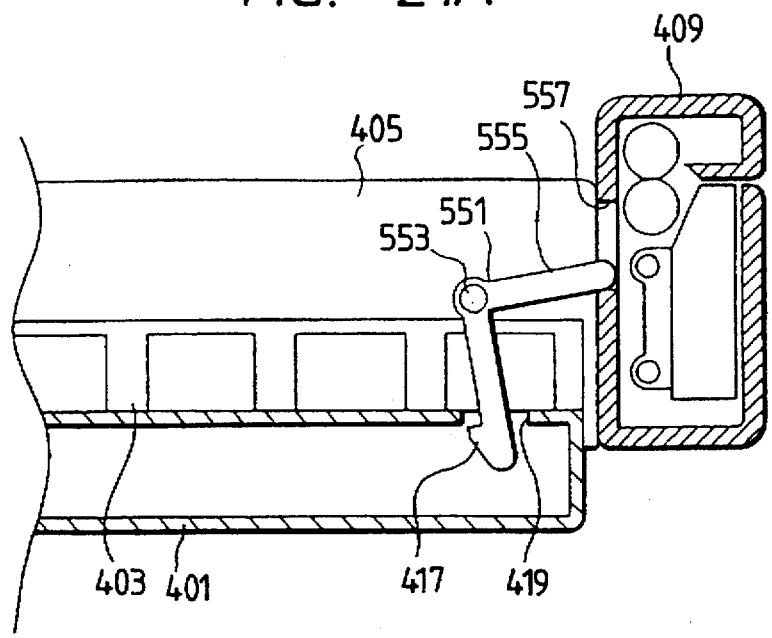
FIGS. 21A and 21B are schematic plan views which illustrate a structural example and the operation of a lock mechanism in a case where the display unit is folded.
Figure 21B:
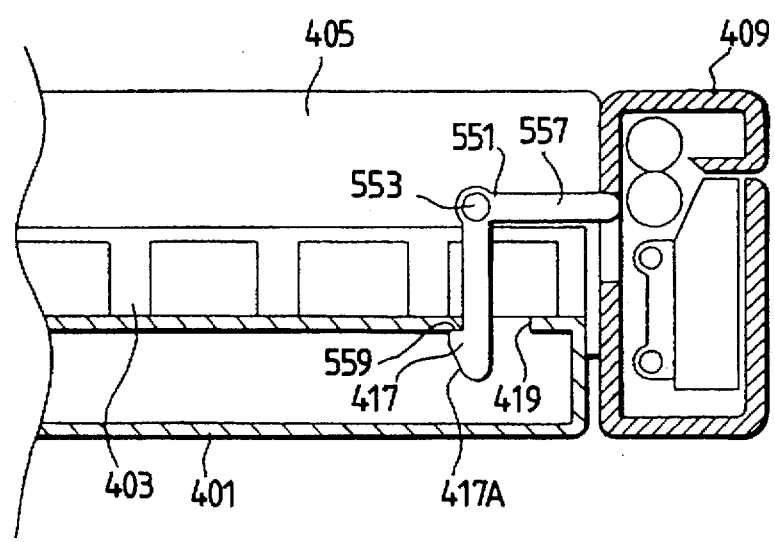

FIGS. 21A and 21B illustrate the operation to be performed when the printer unit 409 is accommodated (folded). Referring to FIGS. 21A and 21B, reference numeral 551 represents a member having two arm portions and formed into L-like shape. The member 551 is supported at the fastening portions of the two arm portions in such a manner that it can be rotated around a shaft 553 provided for the display portion 405. Either of the two arm portions has the aforesaid latch hook 417, while the leading portion of the other arm portion 555 is inserted into an elongated hole 557 formed in the printer unit 409.

In the state shown in FIG. 21A, the printer unit 409 is at the operational position at which the leading portion of the arm portion 555 is fastened to an end portion of the elongated hole 557 and as well as the L-shape member 551 is held at a position at which the latch hook 417 does not interfere with the latch hole 419.

When the printer unit 409 is moved downwards from the state shown in FIG. 21A, the leading portion of the arm portion 555 is fastened to the other end portion of the elongated hole 557 before the member 551 is rotated around the shaft 553 in synchronization with the downward movement of the printer unit 409. In the state shown in FIG. 21B, the latch hook is received by a fastening portion 559 formed on the inside of the latch hole 419. Thus, undesirable opening of the display unit 405 can be prevented. When the apparatus according to this embodiment is used, the printer unit 409 is upwards moved from the state shown in FIG. 21B to realize the state shown in FIG. 21A before the display unit 405 is opened.

When the information processing apparatus is desired to be brought into the folded state, the printer portion 409 can be previously placed at a position shown in FIG. 21B with respect to the position of the display portion 405 before the display portion 405 is folded. Also in this case, the operation of folding the display portion 405 is not inhibited by a tapered surface 417A of the latch hook 417.

FIGS. 21A and 21B illustrate the accommodating structure arranged simply to describe it. Members for maintaining the rotation of the member 551 and the sliding movement of the printer unit 409 may, of course, be used. For example, a spring may be provided for the member 551 for the purpose of giving urging force for clockwise rotating the member 551. The printer unit 409 may have a spring for urging the same in either direction and a guide member for making the sliding operation to be performed smoothly. Furthermore, the display unit 405 may be provided with a click or the like so as to be positioned as shown in FIGS. 21A and 21B.

As shown in FIGS. 21A and 21B, this embodiment is arranged in such a manner that the top surface of the display unit 405 provided with the printer unit 409 and the end surface of the apparatus body which confronts the aforesaid top surface form substantially the same plane when the display unit is folded (actually, the end surface of the apparatus body is retracted slightly). As a result, the printer unit 409 is able to slide on the surface of the region formed by the aforesaid end surfaces. The dimensions are determined so as to make the lower end surface of the printer portion 409 to be substantially superposed on the aforesaid region at the non-use position. As a result, the outer surface of the apparatus can be freed from roughness in the folded state (see FIG. 21B).

FIG. 22 schematically illustrates an example of a structure for guiding the relatively long recording medium 411 for preventing generation of bending of the lower end portion of the recording medium 411. Reference numeral 501 represents a recessed portion for receiving the lower end portion of the recording medium 411 is formed in the body 401 on an extension of the recording unit 405 stood as shown in FIGS. 21A and 21B. Reference numeral 563 represents a guide surface for guiding the lower end portion of the recording medium into the recessed portion.

In this embodiment, the recording medium 411 is set to the printer unit 409 in such a manner that the recording medium 411 is inserted to a portion between the pair of the rollers 515 and 517 or the recording medium 411 is fed in a direction opposing the feeding direction in the recording process. In either case, even if the recording medium is relatively long, the lower edge is guided by the recessed portion 561 by the guide surface 563, so that a problem of the bend or the like can be prevented.

Figure 23A:
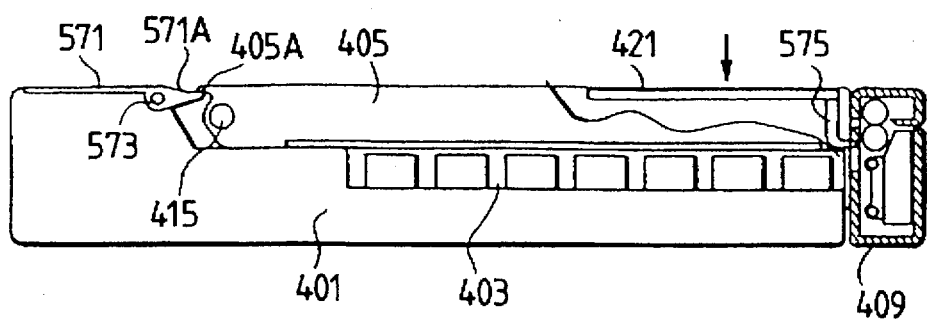
FIGS. 23A and 23B are schematic side cross sectional views which illustrate a structural example and the operation of the guide portion.
Figure 23B:
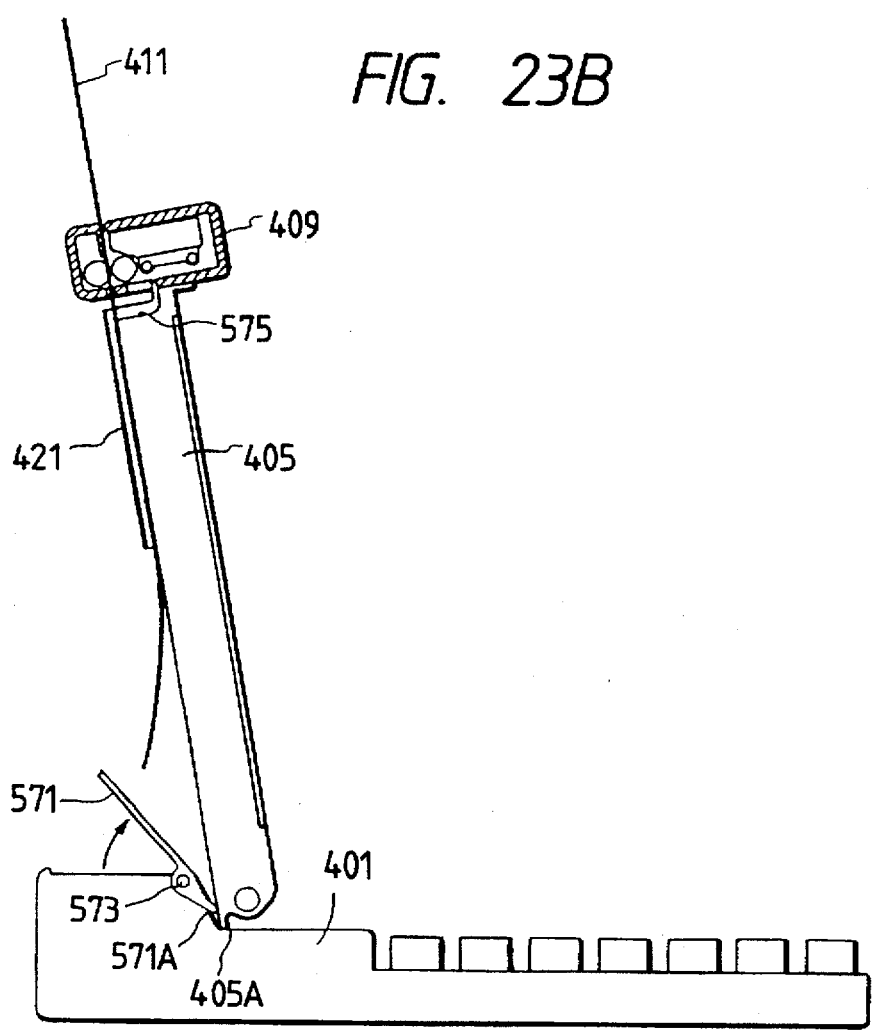

FIGS. 23A and 23B illustrate another example of the member for guiding the recording medium 411. Referring to FIG. 23A, reference numeral 571 represents a guide plate which is supported in such a manner that it is able to turn around a shaft 573. When the apparatus is operated, the guide plate 571 is stood erect as shown in FIG. 23B to guide the lower end portion of the recording medium 411. The guide plate 571 has a cam arm 571A formed integrally and engaged to the cam portion 405 of the display unit 405. In synchronization with an operation of opening the display unit 405 from the accommodation state shown in FIG. 23A, the guide plate 517 is turned clockwise around the shaft 573 when viewed in FIG. 23A. In the state shown in FIG. 23B, the cam arm 571A comes in contact with the backside of the display portion 405, so that the undesirable folding operation of the display portion 405 is prevented.

According to this example, the guide plate 571 is opened in synchronization with the operation of opening the display unit 405, so that it can be shifted to a position at which it is able to guide the recording medium 411. When the display unit 405 is folded, the undesirable contact between the cam arm 517A and the cam portion 405A which inhibits the turning operation of the display unit 405 may be prevented by the following method: the guide plate 571 is temporarily further clockwise turned from the state shown in FIG. 23B to prevent the interference before the display unit 405 is folded (by preventing the aforesaid interference is prevented, the guide plate 517 can be returned to the state shown in FIG. 23A). The undesirable interference may be prevented by forming the two cams into proper shapes.

This embodiment is arranged in such a manner that also the guide 421 is accommodated in the display 405 and allowed to project over the same to reduce the overall size of the apparatus in the accommodated state and to improve the handling facility. Furthermore, the fastening arm 575 is used for the purpose of making the aforesaid accommodation and projection operations to be synchronized with the sliding operation of the printer unit 409. That is, although the guide 421 is accommodated in the display unit 405 in the state shown in FIG. 23A, the guide 421 is allowed to project when the printer unit 409 is moved upwards when viewed in FIG. 23A so as to open the display unit 405. As a result, a state in which the recording medium 411 can be guided by the guide 421 is shown in FIG. 23B. That is, this embodiment is arranged in such a manner that, when the display unit 405 is folded and the printer unit 409, the guide 421 and the guide plate 517 are accommodated, the information processing apparatus can be formed into a thin box-like shape having no projections and recesses. Therefore, the handling and accommodating facilities can be improved.

Figure 24A:
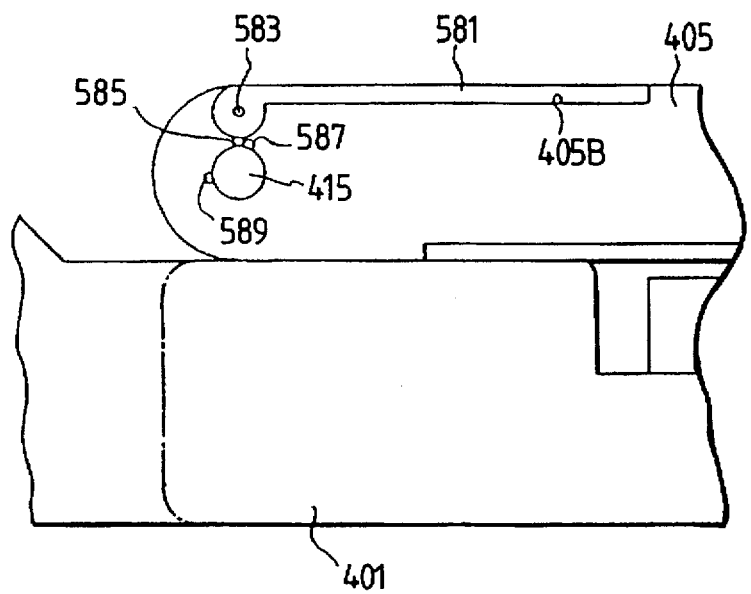
FIGS. 24A and 24B are schematic side cross sectional views which illustrate another structural example and the operation of the guide portion.
Figure 24B:
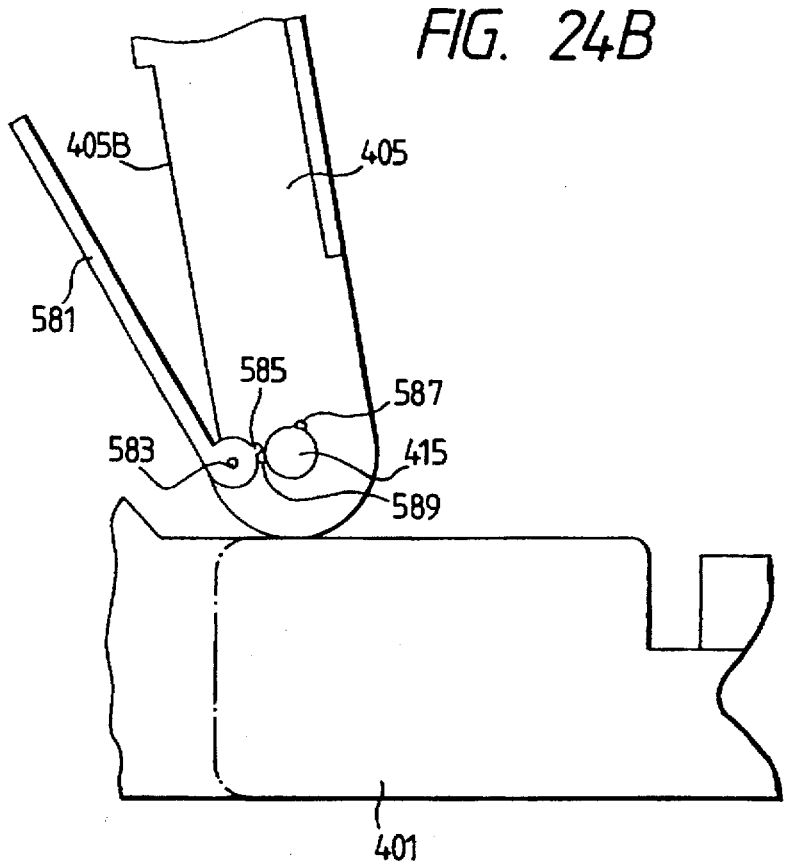

FIGS. 24A and 24B illustrate another example of the structure for guiding the lower end portion of the recording medium. In this example, a guide plate 518 is able to turn around a shaft 583 provided for the display unit 405. The guide plate 581 is accommodated in a recessed portion 405B formed in the rear side of the display unit in the state shown in FIG. 24A.

The guide plate 581 has, in its portion supported by a shaft 583, a projection 585 which can be engaged to two projections 587 and 589 formed on the hinge shaft 415. In the state shown in FIG. 24A, the projection 585 is engaged to the projection 587 so as to prevent the counterclockwise turning of the guide plate 581 when viewed in FIG. 24A which causes the undesirable opening. When the display unit 405 is turned clockwise around the hinge shaft 415, the engagement with the projection 587 is released. As a result, also the guide plate 581 is stood erect together with the display unit 405 while being accommodated in the recessed portion 405B. When the display unit 405 or the guide plate 581 makes an angle larger than 90° from the horizontal plane, the guide plate 581 is turned around the shaft 583 in a direction in which the guide plate 581 is separated from the recessed portion 405B until the projection 585 is engaged to the projection 589. As a result, the further turning operation of the guide plate 581 is prevented. In a case where the apparatus is operated, the state shown in FIG. 24B is realized in which the lower end portion of the recording medium can be guided.

According to this structure, an advantage can be obtained in that the guide plate 581 can be accommodated even if the hinge shaft 415 is positioned at the rear end portion of the apparatus (no rearward projection is present in the apparatus body) as shown by an alternate long and short dash line. Furthermore, another advantage can be obtained in a case where the guide plate 581 is desired to be elongated.

Figure 25:
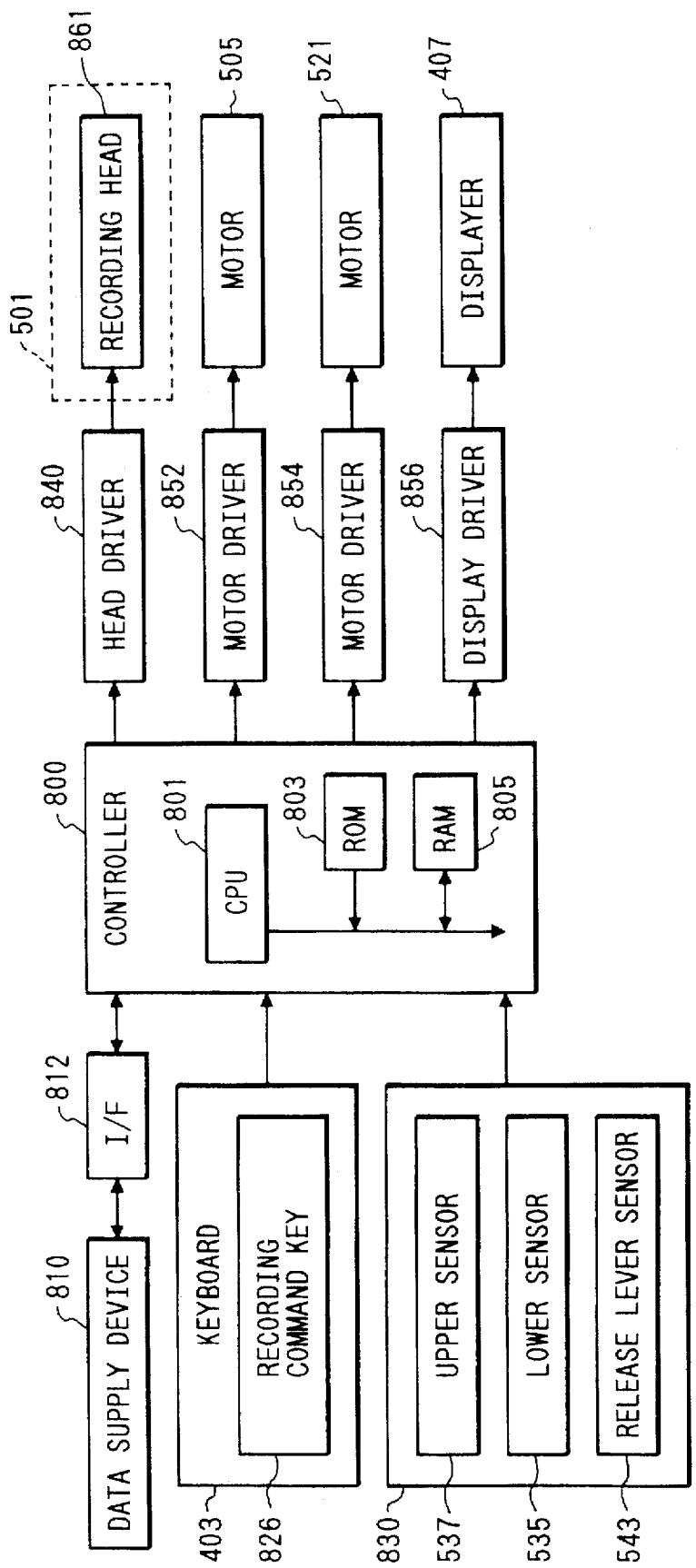
FIG. 25 is a block diagram which illustrates a structural example of a control system according to the aforesaid embodiment.

FIG. 25 illustrates a structural example of a control system for use in the information processing apparatus according to this embodiment.

Figure 26:
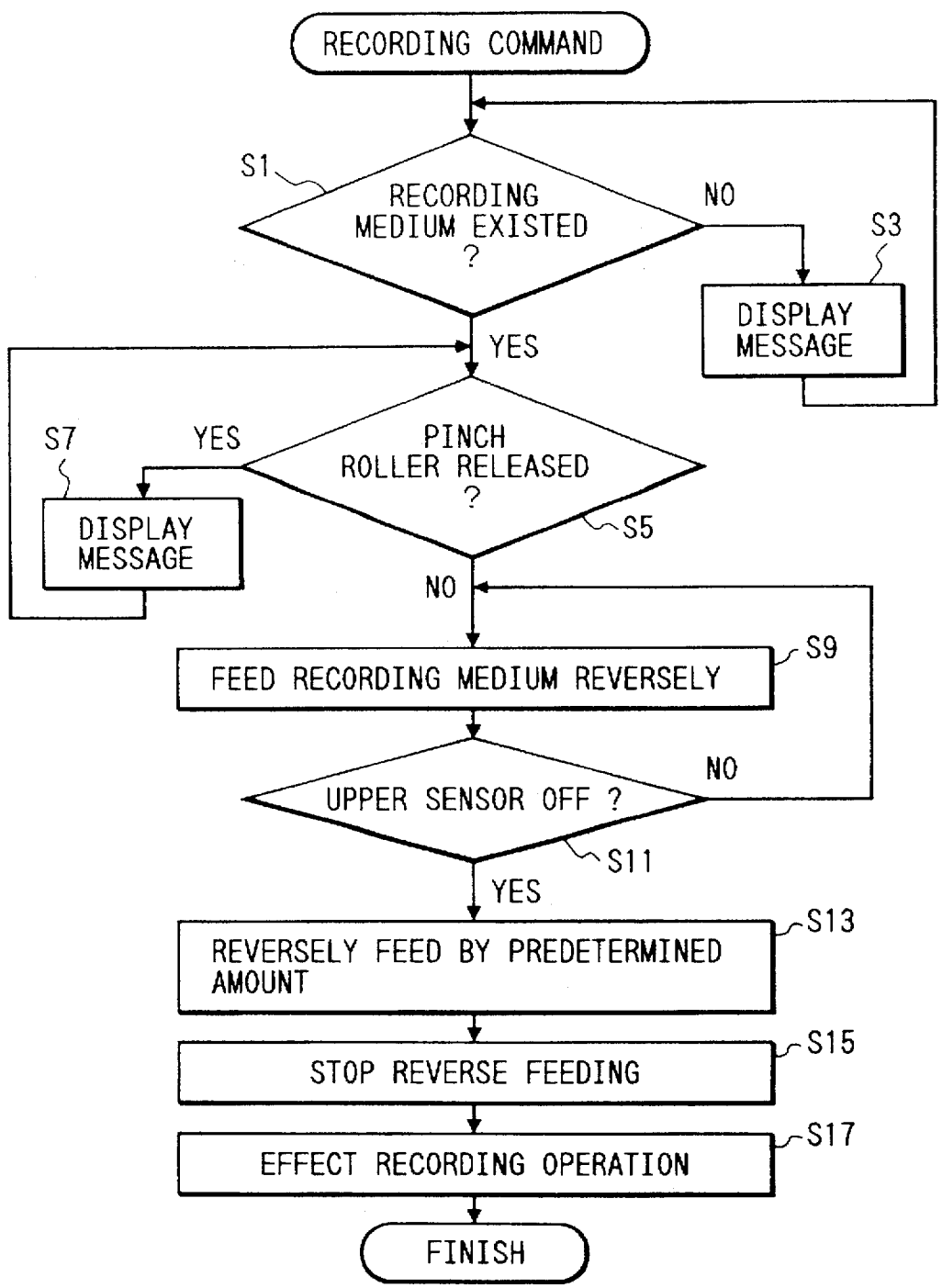
FIG. 26 is a flow chart which illustrates an example of a recording processing means.

Referring to FIG. 25, reference numeral 800 represents a controller which is the main control portion comprising a CPU 801 comprising, for example, a microcomputer for executing the sequence shown in FIG. 26, a ROM 803 which stores a program which corresponds to the sequence and another solid data and a RAM 805 having a region in which image data is developed and working regions and the like. Reference numeral 810 represents an image data supply apparatus (which may be a disk apparatus integrally formed with the body of the apparatus or an external host apparatus or the like) for transmitting/receiving image data, command signals, and status signals and the like to and from the controller 800 via an interface (I/F) 812.

Reference numeral 826 represents a record command key provided on the keyboard 403 and 830 represents a sensor group including various sensors such as recording medium detection sensor 537 disposed in the upper portion of FIG. 19 and a detection sensor 535 disposed in the lower portion of the same. Reference numeral 840 represents a head driver for operating a device (an electrothermal conversion device is used in this embodiment) for generating energy utilized to discharge ink from a recording head 861 provided in the head cartridge 501 in accordance with data to be recorded. Reference numeral 852 represents a driver for rotating the main scanning motor 505 for moving the carriage 503 in the main scanning direction (in direction a and b of FIG. 19). Reference numeral 862 represents a driver for rotating a sub-scanning motor 521 for feeding (sub-scanning) the recording medium. Reference numeral 856 represents a display driver for operating the display 407.

FIG. 26 is a flow chart which schematically illustrates the recording process. When a record command is supplied, whether or not the recording medium 411 is present in the printer unit 409 is discriminated in step 1 in accordance with, for example, the output from the upper sensor 537. If it is not present, the flow proceeds to step S3 in which a message for causing the recording medium 411 to be set to be displayed on the display 407.

If the recording medium is present, the flow proceeds to step S5 in which a discrimination is made whether or not the pinch roller 517 is released in accordance with an output from the sensor 543. If a negative discrimination is made, a message is displayed on the display 407 to cause the release lever 413 to be operated in order to realize a state in which the pinch roller 517 presses the feeding roller 515. As a result, even if an operator does not return the lever 413 erroneously after the pinch roller 517 has been released and the recording medium has been inserted in order to quickly set the recording medium, the undesirable state can be overcome. For example, a structure may be employed in which an operation of automatically returning the release lever 413 by using the sub-scanning motor 521 is performed. In this case, the operations in step S7 and step S5 can be omitted.

In step S9, a process is commenced in which the recording medium 411 held between the rollers 515 and 517 or brought into contact with the portion between the same is fed. This operation is continued until the upper sensor 537 detects the top edge (the leading edge at the time of the recording process) of the recording medium (step S11). If the top edge has been detected, reverse feeding by a quantity which corresponds to the distance between the upper sensor 537 and the recording portion is performed before the reverse feeding is stopped (steps S13 and S15). If the aforesaid distance is a proper distance, the process in step S13 can be omitted.

Thus, the setting of the leading portion of the recording medium is completed. In step S17, the intermittent feeding of the recording medium 411 and a known recording operation, in which scanning by the head cartridge 501 is performed, are carried out. If all of data to be recorded have been recorded or the lower end portion (the rear end portion at the time of the recording process) of the recording medium has been detected by the lower sensor 535, the recording operation is stopped immediately after a predetermined number of lines have been recorded. Then, the recording medium 411 is discharged and the recording process is completed.

According to this embodiment, a variety of the aforesaid effects and as well as all of the technical problems can be completely overcome. That is, since the recording medium is fed in a plane along the backside of the display 405, feeding can satisfactorily be performed even if the recording medium is a thick paper sheet or a thin paper sheet. Therefore, recording can be performed satisfactorily.

Furthermore, the printer unit 409 is disposed above the display unit 405, so that the recording medium can be inserted simply and a conventional necessity of performing a complicated operation such as folding the display unit at the time of setting the recording medium, medium is eliminated. In addition, the result of the recording operation and the display scope can easily be contrasted as shown in FIG. 17. Another effect can be obtained in that the size of the information processing apparatus can be reduced because the passage through which the recording medium is fed is formed along the backside of the display unit.

Although this embodiment is arranged in such a manner that the serial printer type ink jet recording apparatus is used as the printer unit, a full line type ink jet recording apparatus may be used in which discharge ports are aligned in a range which corresponds to the width of the recording medium. Furthermore, a thermal transfer type or thermal sensitive type recording apparatus to be described later may be used. Furthermore, the present invention can be embodied regardless of the type of the recording apparatus in embodiments to be described hereinafter. That is, the following embodiments are respectively able to employ another type printer as well as the printer to be described in each embodiment.

Although the above-described embodiment has the foldable display unit, a display unit which is not folded may be employed. This fact is similarly applied to the embodiment to be described hereinafter.

Another embodiment in which the printer unit is disposed below the display unit will now be described.

Figure 27A:
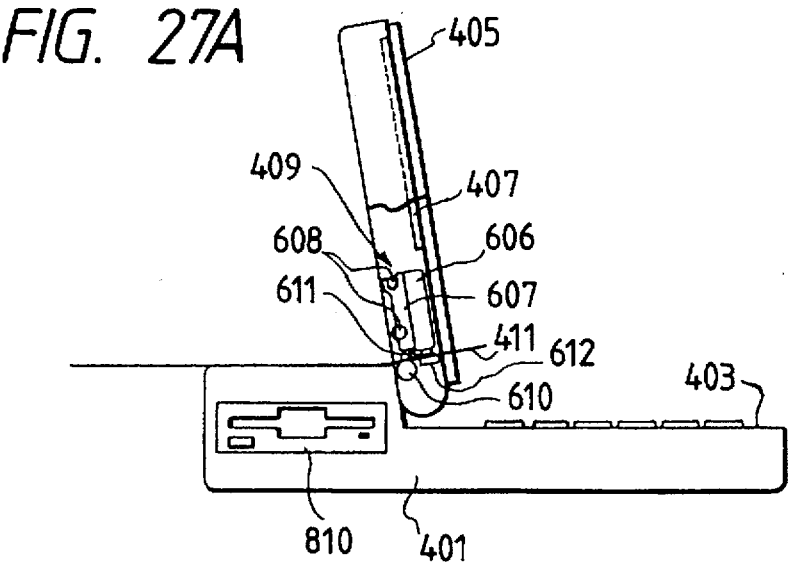
FIGS. 27A and 27B are schematic side cross sectional views which illustrate another embodiment of the information processing apparatus according to the present invention.
Figure 27B:
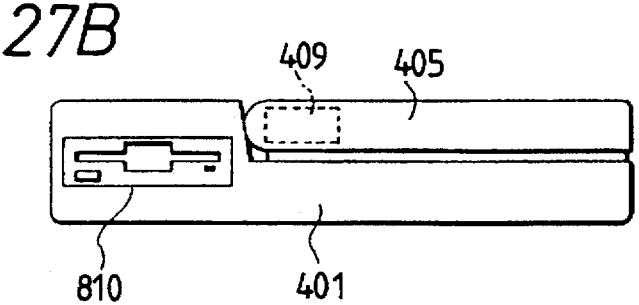

FIG. 27A is a schematic view which illustrates a state in which the apparatus according to this embodiment is used. FIG. 27B is a schematic view which illustrates the apparatus being accommodated. The elements having the same functions as those according to the aforesaid embodiments are given the same reference numerals.

Referring to FIG. 27A, the printer unit 409 is a thermal transfer recording apparatus comprising an ink ribbon cassette 606 having an ink ribbon applied with ink which is a recording agent, a carriage 607 on which the thermal head and the ink ribbon cassette 606 are mounted for performing the scanning operation, a guide shaft 608 for the carriage 607, a motor (omitted from illustration) for reciprocating the carriage 607 along the guide shaft 608, a feeding roller 610 for holding and feeding the recording medium 411, a pinch roller 611 positioned in contact with the feeding roller 610 via the recording medium 411 and a platen 612 which is positioned to confront the thermal head and receives pressure of the thermal head via the ink ribbon positioned on the surface of the recording medium at the time of the recording operation.

The positions of the feeding roller 610 and the pinch roller 611 are determined to correspond to the paper supply port formed in the upper surface of the rear portion of the body 401 and as well as in the lower portion of the backside of the display unit 405. The structure thus arranged will enable the following operation to be performed.

For example, feeding of the recording medium 411 is performed in such a manner that the recording medium 411 is inserted from the reverse side of the display unit while being guided by the top surface of the rear portion of the apparatus body. As a result, a substantially plain feeding passage can be secured. In a case where a postcard or an envelope is used in the recording operation, the display unit 405 may be stood by a small angle to separate the top surface in the rear portion of the apparatus body from the paper feeding port, causing the insertion to be performed easily. Although the guiding effect in this portion cannot be obtained, the feeding passage can be made to be a further flat shape. In this example of the .operation, the recording medium 411 is fed from a rear portion and the same is discharged from this side (to the front surface of the apparatus) as a result of the recording operation. Therefore, although an operation of touching the rear portion of the display unit 405 must be performed, at least the complicated operation of folding the display unit 405 can be eliminated. Furthermore, although the characters or the like are seen reversed from a viewpoint of the operator, the contrast with the displayed content can be made.

As an alternative to this, the complicated setting work can be simplified satisfactorily by performing the reverse feeding operation by a control similar to the aforesaid embodiment. That is, the operation can be arranged in such a manner that the recording medium inserted into the front portion is automatically temporarily introduced into the position to which the leading portion of the recording medium must be set before the recording operation is performed. Another structure may be employed in which the recording medium is inserted from the front portion and the same is discharged into the rear portion after the recording operation has been completed. As a result, the contrast with the displayed contents cannot be made but the other problems can be overcome and the control system can be simplified.

Another embodiment of the present invention is constituted in such a manner that the main scanning means (the thermal head, the ink ribbon cassette, the carriage and their drive mechanism and the like) of the thermal transfer printer unit is disposed below the display unit 405 and the sub-scanning means (the feeding roller, the pinch roller and their drive mechanism and the like) is disposed in the rear portion of the apparatus body.

Figure 28:
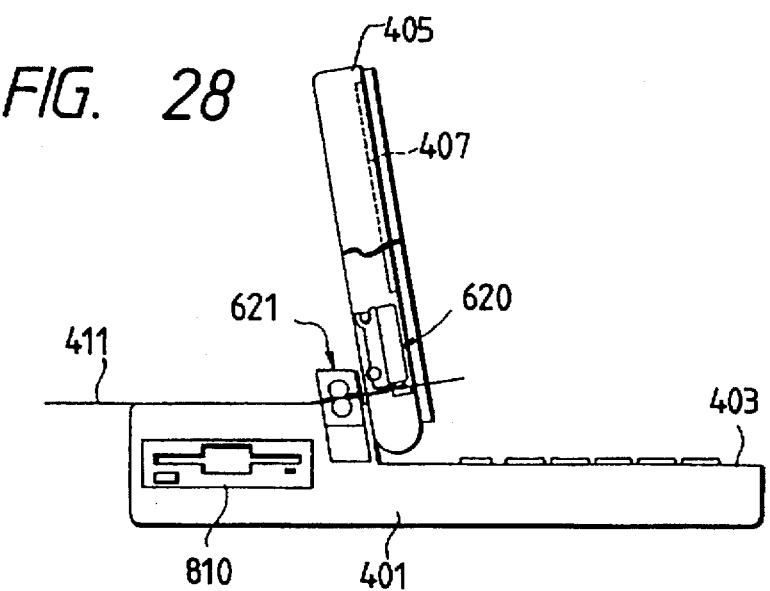
FIG. 28 is a schematic side cross sectional view which illustrates another embodiment of the present invention.
Figure 29:
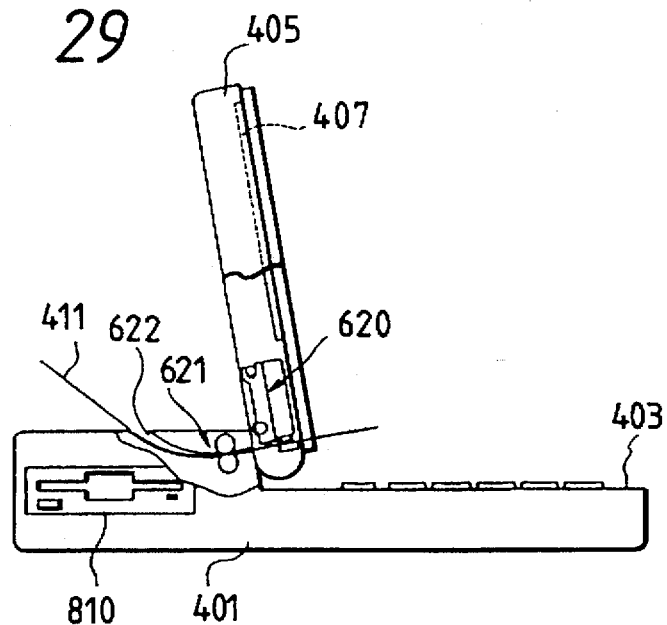
FIG. 29 is a schematic side cross sectional view which illustrates a modification to the embodiment shown in FIG. 28.

FIG. 28 illustrates a state where the information processing apparatus according to this embodiment and having the sub-scanning means capable of vertically moving when viewed in FIG. 28 is used. FIG. 29 is a schematic view which illustrates the information processing apparatus according to a modification to this embodiment in which the sub-scanning means secured to the main body thereof is used. Referring to FIG. 29, reference numerals 620 and 621 respectively represent the main scanning means and the sub-scanning means.

Referring to FIG. 28, the feeding passage similar to the aforesaid embodiment and arranged in such a manner that the top surface of the rear portion of the body of the apparatus is made to be the paper feeding guide is formed. Furthermore, the sub-scanning means 621 is able to vertically move in order to be operated similarly. When the printer is used, the sub-scanning means 621 is moved to a position shown in FIG. 28, while the same is moved downwards to be accommodated in the body of the apparatus when the printer is not used.

Referring to FIG. 29, the sub-scanning means 621 is disposed in the upper portion in the rear portion of the body of the apparatus and a guide portion 622 is formed to the feeding roller disposed in the body of the apparatus for the purpose of guiding the recording medium.

Also according to these embodiments, similar effects to those obtainable from the aforesaid embodiments can be obtained as a result of the operation being performed similarly.

Figure 30:
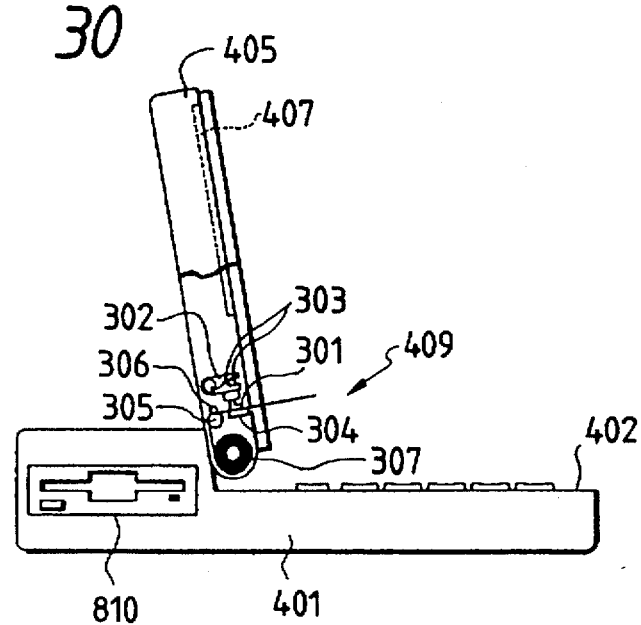
FIG. 30 is a schematic side cross sectional view which illustrates another embodiment of the present invention.

Another embodiment will now be described in which the thermal sensitive printer unit 409 is disposed in the display unit 405. FIG. 30 is a schematic view which illustrates this embodiment. Referring to FIG. 30, reference numeral 301 represents a head, 302 represents a carriage, 303 represents a guide shaft, 304 represents a platen, 305 represents a feeding roller, 306 represents a pinch roller and 307 represents a thermal sensitive recording paper sheet wound into a roll shape.

With the thermal sensitive method, although an exclusive recording medium must be used, the necessity of using the ink ribbon can be eliminated and a head similarly to that for use in the thermal transfer method can be used. Therefore, the structure can be further simplified and reduced in size as compared with the thermal transfer recording method. If the roll paper sheet is loaded in the apparatus as shown in FIG. 30, the necessity of using the recording medium individually from the body of the apparatus can be eliminated. Therefore, the size of the body of the apparatus can be reduced and an actual portability can be improved. If a line head is used in place of the serial head, a necessity of using a mechanism for operating the carriage can be eliminated and thereby the size of the body of the apparatus can further be reduced.

This embodiment is arranged for the purpose of improving the operational facility, the facility in making a contrast between the record and the displayed scope and reducing the overall size in place of using the thick recording medium. Also the structure according to this embodiment may be arranged in such a manner that the recording medium is discharged to the reverse side of the display unit 405 similarly to the aforesaid embodiment. Although the recording medium to which data has been recorded cannot be immediately be seen in this case, an effect can be obtained in that the discharge recording medium 411 does not cover the operation keys.

Figure 31A:
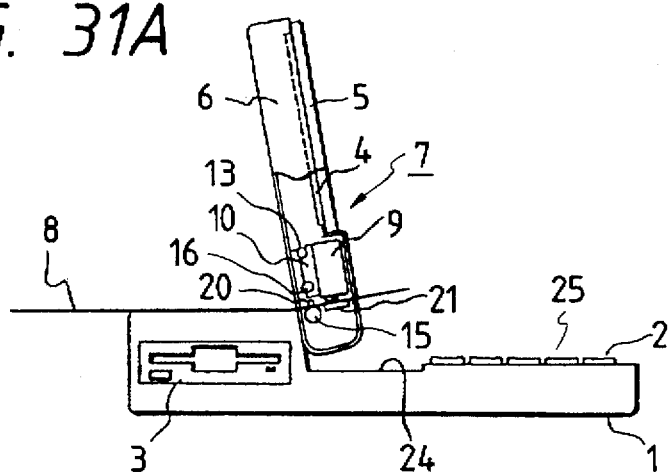
FIG. 31A illustrates a state where the information processing apparatus according to another embodiment of the present invention is used.
Figure 31B:
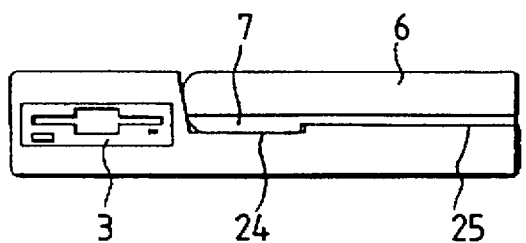
FIG. 31B illustrates a state where the same is accommodated in the main body of the information processing apparatus.

Another embodiment of the present invention will now be described with reference to FIGS. 31A and 31B. FIG. 31A illustrates a state of use and FIG. 31B illustrates the accommodation state.

Referring to FIG. 31, reference numeral 1 represents a body of the apparatus including a keyboard 2 serving as an input portion having keys to input letters, figures and other characters and keys for issuing various commands and a floppy disk drive device 3 serving as a storage device for storing information. Reference numeral 4 represents a display unit having a display 5 for displaying information supplied with the keyboard 2 and information processed in the apparatus and the like. The display 5 may be a liquid crystal display or a plasma display or the like with which the thickness of the display unit 4 can be reduced and the rear portion of the same can be made flat. If a light source can be provided for the purpose of making the display to be seen clearly, a backlight structure may be employed. A sidelight display may be employed for the purpose of reducing the thickness of the display unit 405.

The apparatus body 1 has a cover 6 which can be turned by a hinge (omitted from illustration), so that the cover 6 covers/closes the apparatus body 1. That is, when the apparatus is not operated, the cover 6 is stood erect as shown in FIG. 31A to make the keyboard 2 to appear outside. When the apparatus is accommodated, the cover 6 covers the keyboard 2 by folding the cover 6. Reference numeral 7 represents a printer unit serving as the recording portion for recording information. The printer unit 7 records information supplied with the keyboard 2 or information processed in the apparatus to a plain paper sheet or a recording medium (hereinafter called a "recording paper sheet") 8 such as an OHP sheet. The printer unit 7 is provided in portion including the cover 6.

Figure 32:
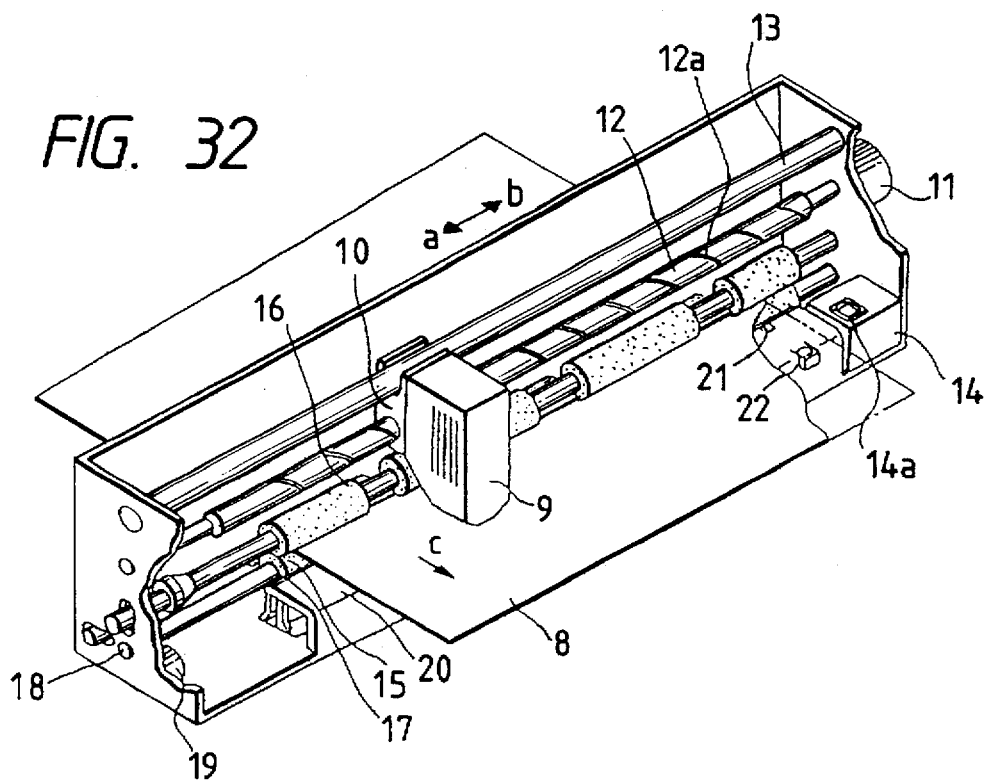
FIG. 32 illustrates the structure of the printer unit.

FIG. 32 is a schematic perspective view which illustrates the structure of an ink jet recording type printer unit serving as an example of the printer unit 7.

Referring to FIG. 32, reference numeral 9 represents a head cartridge comprising an ink jet recording head and an ink tank which are integrally formed. The head cartridge 9 is detachably fastened to, for example, the ink jet recording apparatus shown in FIG. 2. When the ink in the ink tank is exhausted, it is replaced by a novel head cartridge.

The recording head is constituted by a plurality of electrothermal conversion devices for generating thermal energy utilized to discharge the ink, a substrate on which a drive circuit for driving the electrothermal conversion devices is formed, discharge ports corresponding to a plurality of the electrothermal conversion devices and liquid passages formed in the substrate and a ceiling plate placed for the purpose of forming a common liquid chamber which communicates with each liquid passage. The recording head thus constituted is mounted on the apparatus in such a manner that a surface in which the discharge ports are formed confronts the recording paper sheet 8.

The ink tank has a volume which is the major portion of that of the head cartridge 9 and includes an ink accumulating chamber for accumulating ink. If a proper ink supply passage can be formed from the ink tank formed in the apparatus body 1, another structure may be employed in which only the recording head is mounted on the apparatus as an alternative to the structure according to this embodiment in which the head cartridge has the ink tank formed integrally.

A carriage 10, on which the head cartridge 9 is mounted, has a pin (omitted from illustration) which is fastened to a spiral groove 12a of a lead screw 12 which is rotated in synchronization with the forward/rearward rotation of the drive motor 11 via a transmitting mechanism (omitted from illustration). Thus, the carriage 10 is reciprocated in directions designated by arrows a and b when the lead screw 12 is rotated. Reference numeral 13 represents a carriage guide shaft for restricting the rotation of the carriage.

The thus constituted embodiment performs the recording operation by moving the carriage 10 and by supplying electric power to the electrothermal conversion member of the recording head in response to the recording signal to discharge ink to the recording paper sheet 8. The energy supplying means for discharging ink may be a method in which an electromechanical conversion member such as a piezo electric conversion device is used or a method in which heat is generated by electromagnetic wave such as laser applied and the ink is discharged by an action realized by the heat. However, the recording head which uses the electrothermal conversion member as the energy generating means enables size to be reduced. Furthermore, advantages realized due to the improvement in the semiconductor technology and the reliability of the IC technology and microworking technology can be utilized satisfactorily and thereby high density mounting can easily be performed and the manufacturing cost can be reduced.

Reference numeral 14 represents a recovery unit comprising a cap 14a which confronts the surface of the head cartridge 9 having the discharge ports at predetermined position (for example, the home position) outside the recording region of the head cartridge 9. The recovery unit 14 further comprises a cap movement drive portion (omitted from illustration) for bringing the cap 14a into contact with the surface having the discharge ports so as to protect the cap 14a at the time of the non-recording operation. In addition, the structure may include a pump for satisfactorily maintaining the ink discharge state by discharging ink, the viscosity of which having been undesirably raised, dust and bubbles by absorbing ink through the discharge ports at the moment of the aforesaid contact and a member for accumulating waste ink thus absorbed.

Reference numeral 15 represents a feeding roller for feeding the recording paper sheet 8 in a direction designated by arrow c of FIG. 32. Reference numerals 16 and 17 represent pinch rollers for pressing the recording paper sheet 8 against the feeding roller 15. Thus, the recording paper sheet 8 is held between the aforesaid pair of rollers so as to be intermittently fed in the direction c of FIG. 32 while using the top surface of the apparatus body as the guide at the time of the recording process. The feeding roller 15 has its shaft 18 which is engaged to a feeding motor 191 via an employed transmitting mechanism so that the rotational force of the motor 19 is transmitted to the feeding roller 15. In the printer unit 7, the recording paper sheet 8 is fed in substantially linearly. In a case where a postcard or the like is used in the recording operation, the cover 6 is stood erect by a small quantity from the state shown in FIG. 31A to separate the top surface of the apparatus body and a paper sheet feeding port 20 for the recording paper sheet 8 from each other. Therefore, although the guide effect cannot be used, the recording paper sheet feeding passage can be made to be a perfect straight shape, so that a thick recording paper sheet can be used in the recording operation.

Reference numeral 21 represents a platen for making the recording side of the recording paper sheet 8 to be flat, the platen being extended in a range in which the recording head is moved in order to confront the discharge ports formed in the recording head while maintaining a predetermined interval. A member may be provided for the purpose of causing the recording paper sheet 8 to be brought into contact with the platen 21 in order to prevent the floating of the recording paper sheet 8. Reference numerals 22 and 23 represent a pair of sensors for detecting the recording paper sheet 8 and are respectively disposed in front of the recording position in the recording paper sheet feeding direction c and in the rear of the same.

In order to easily feed the recording paper sheet 8, a structure may be employed which is arranged in such a manner that the recording paper sheet 8 is inserted through the front portion (adjacent to the keyboard) of the apparatus before it is automatically introduced into the position at which the recording paper sheet 8 must be set and the recording operation is commenced in this state.

Although the printer unit 7 is small size, it is undesirably thicker than the display unit 4. Therefore, the thickness of the cover 6 is formed into a stepped shape made in such a manner that the portion of the cover for the portion including the printer unit 7 is thicker than that for the portion including the display unit 4. Therefore, the thickness of the apparatus body 1 according to this embodiment has a portion 24 which aligns the printer unit 7 when the cover 6 is closed is made smaller than that of a portion which aligns the display unit 4. That is, the thickness of the apparatus body 1 is made to form a stepped shape which is able to fit the stepped shape of the cover 6. As a result, the thickness of the apparatus body can be made uniform after the cover 6 has been closed as shown in FIG. 31B. Therefore, the size of the apparatus can be reduced.

Figure 33A:
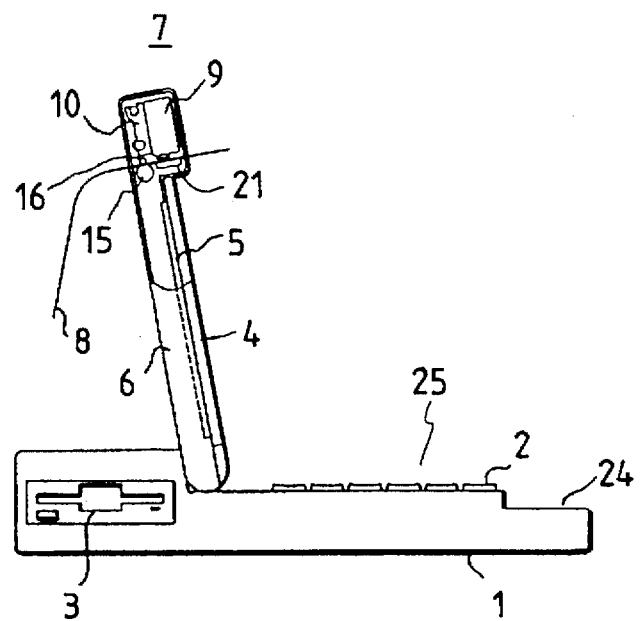
FIG. 33A illustrates a state where the information processing apparatus according to another embodiment of the present invention is used.
Figure 33B:
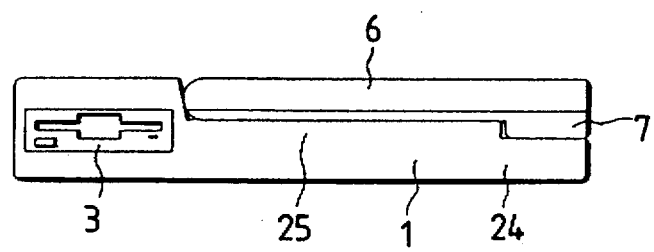
FIG. 33B illustrates a state where the same is accommodated in the main body of the information processing apparatus.

Although this embodiment is arranged in such a manner that the printer unit 7 is disposed in the base portion of turn of the cover 6, it may be disposed in the end portion of the turn of the cover 6 as shown in FIGS. 33A and 33B. FIG. 33A illustrates a state in which the apparatus is operated and FIG. 33B illustrates a state in which the same is folded.

In the structure arranged as shown in FIG. 33, the portion 24, the thickness of which is reduced in inverse proportion to the thickness of the printer unit 7, is positioned at the end portion of the apparatus. Therefore, the mechanical strength can be maintained and the aforesaid portion 24 can be used to rest the hand of the operator when the keyboard 2 is used. In addition, the parts can be disposed easily in the apparatus body.

Figure 34A:
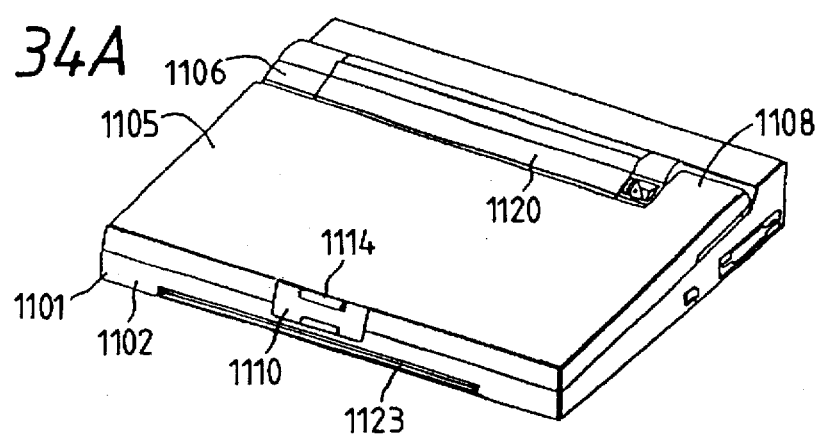
FIGS. 34A and 34B are perspective views which illustrate the information processing apparatus according to another embodiment of the present invention.
Figure 34B:
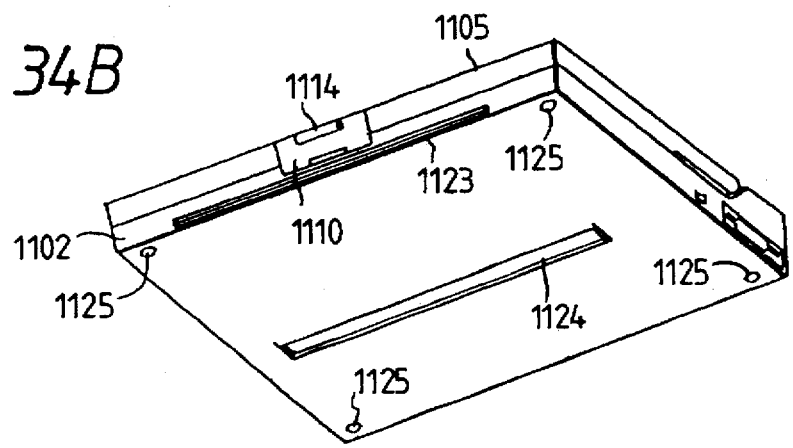
Figure 35:
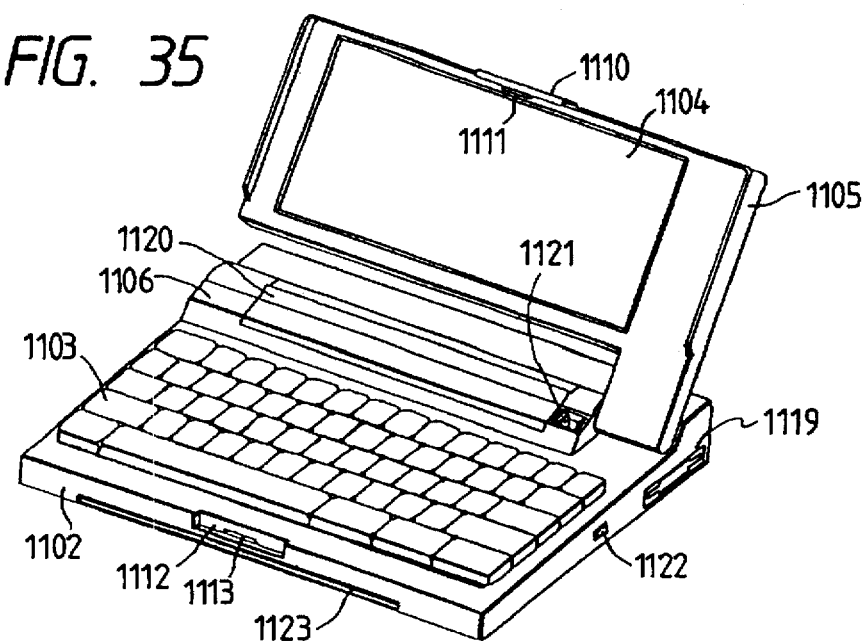
FIG. 35 is a perspective view which illustrates a state of the apparatus according to the aforesaid embodiment.

FIGS. 34A, 34B and 35 are overall perspective views which illustrate a personal computer according to another embodiment of the information processing apparatus of the present invention. A personal computer 101 comprises a body 1102 of the apparatus, a keyboard 1103 serving as the information input portion and an upper cover 1105 having a display unit 1104. The upper cover 1105 is fastened to the apparatus body 1102 in such a manner that it is able to turn around a hinge 1108 disposed at an end portion of the rear portion of the apparatus body 1102. When the apparatus is operated (see FIG. 35), the upper cover 1105 is opened to a position at which the display unit 1104 can easily be seen. When the apparatus is not operated, the upper cover 1105 is closed to serve as a cover. The display unit 1104 may comprise a liquid crystal display device as the display device because the thickness of the display unit 1104 can be reduced.

The upper cover 1105 has, at the front edge thereof, a lock plate 1110 rotatively fastened thereto while being urged by a spring (omitted from illustration). The lock plate 1110 has a lock claw 1111 which is fastened to a fastening portion 1113 formed in a recessed portion 1112 of the apparatus body 1102. As a result, the upper cover 1105 can assuredly be held by the apparatus body 1102. The upper cover 1105 can be opened by raising a projection 114 to release the engagement of the lock claw 1111.

The printer unit 1106 which is the recording portion using an ink jet recording head is disposed in the rear of the keyboard 1103 in the apparatus body 1102. Reference numeral 1120 represents a cover for the printer 1106 and the cover 1120 is fastened to the apparatus body 1102 in such a manner that it can be removed at the time of interchanging a head cartridge 1406 of the printer 1106 to be described later. In order to confirm the result of printing, it is made of transparent or smoked material.

Reference numeral 1121 represents a recording paper sheet release lever, 1123 represents a first feeding port, 1122 represents a power switch and 1119 represents a disk apparatus.

FIG. 34B is a perspective view which illustrates the apparatus body 1102 when viewed from the installation side. Reference numeral 1124 represents a second feeding port for feeding a thick paper sheet or the like and 1125 represents a leg for floating the apparatus body 1102 from the installation side.

The printer 1106 is structured similarly to that according to the embodiment shown in FIGS. 19 and 20.

Figure 36:
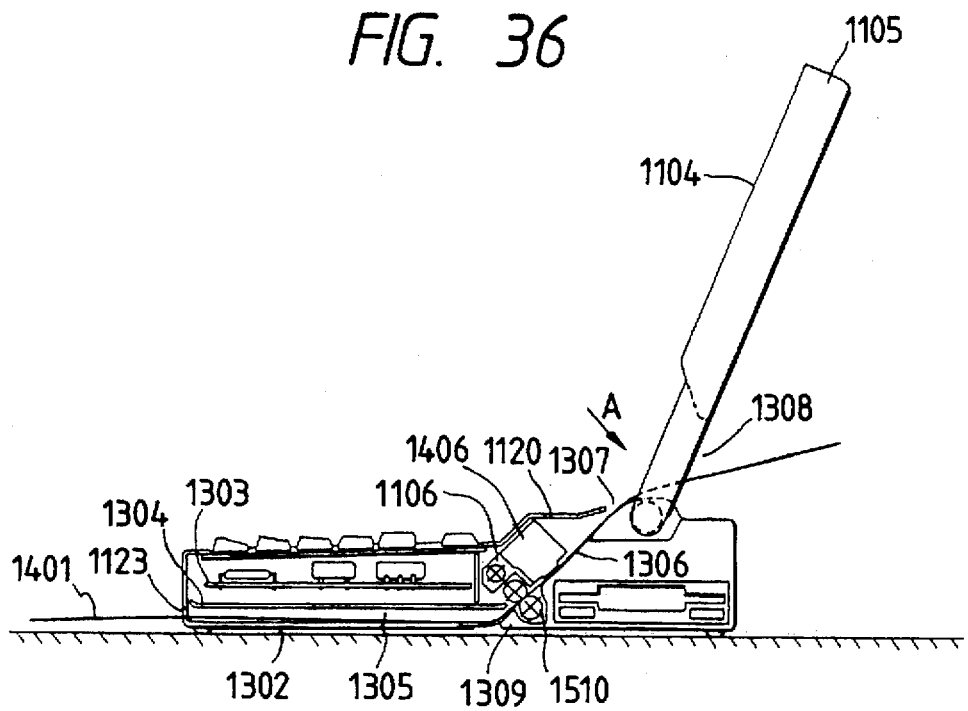
FIG. 36 illustrates a state where recording paper sheets are supplied through a first supply port to record data to it.
Figure 37:
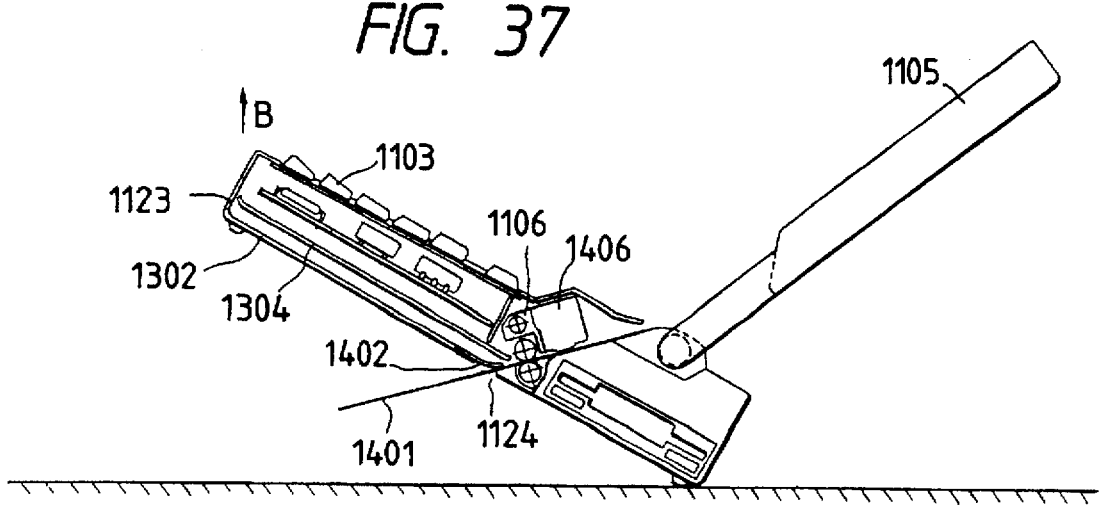
FIG. 37 illustrates a state where the recording paper sheets are supplied through a second supply port to record data to it.

FIGS. 36 and 37 are cross sectional views which illustrate the feeding passage for the recording paper sheet 1401 formed after the printer 1106 has been mounted on the information processing apparatus.

Referring to FIG. 36, the recording paper sheet 1401 is fed from the front surface of the information processing apparatus adjacent to the operator of the apparatus. The operator inserts the recording paper sheet 1401 into a first recording paper sheet feeding port 1123 formed in the front portion of the apparatus. The recording paper sheet 1401 passes through a recording paper feeding passage 1305 formed between a lower case 1302 of the apparatus and a separation plate 1304 which covers a substrate 1303 which constitutes a driver for the controller of the apparatus and drivers for the printer and the display 1104 while being guided by a guide 1309. Then, it is inserted to a position of a feeding roller 1510 of the printer 1106.

The distance from the feeding port 1123 to the feeding roller 1510 of the printer 1106 is made to be shorter than that of an ordinary recording paper sheet of a regular size (A4 or letter size). Therefore, the recording paper sheet 1401 is able to assuredly reach the feeding roller 1510. The operation of the printer 1106 to be performed after the recording paper sheet 1401 has been inserted will be described later with reference to a control flow chart.

The recording paper sheet 1401 to which data has been recorded by the printer 1106 is, along the guide 1306, discharged through a discharge port 1307 formed by the guide 1306 and the cover 1120. Since the discharge port 1307 is located on this side of the upper cover 1105 including the display 1104, the operator is able to confirm the result of recording at the moment corresponding to an arrow A. Since the recording paper sheet 1401 passes from a gap 1308 in the lower portion of the upper cover to the backside of the apparatus, the recording paper sheet 1401 does not cover the display 1104 and thereby the operator is able to operate the apparatus smoothly.

As shown in FIG. 37, a second feeding port 1124 is formed in the vicinity of the printer 1106 and in the lower portion of the apparatus body 1102. That is, it is difficult for a recording paper sheet, an envelope, or a postcard or the like which is shorter than the distance from the first feeding port 1123 to the printer 1106 to be fed from the first feeding port through a bent passage. Accordingly, a second feeding port 1124 is formed in the lower surface of the apparatus body 1102 at a substantially linearly extended position from the recording paper sheet feeding passage of the printer 1106. The second feeding port 1124 is covered by a thin elastic member 1402 so as to prevent an introduction of the recording paper sheet 1401 fed through the first feeding port 1123.

When the second feeding port 1124 is used, the user raises a portion of the apparatus body 1102 adjacent to the operator in a direction designated by an arrow B of FIG. 37 to feed the recording paper sheet 1401 through the second feeding port 1124. Since the feeding port 1124 is located adjacent to the printer 1106, a recording paper sheet of a size other than the regular size can be fed. In addition, the feeding port 1124 is located at a substantially linearly extended position from the recording paper sheet feeding passage of the printer 1106, so that a rigid recording paper sheet such as an envelope or a postcard can be fed.

The structure of the control system of the information processing apparatus according to this embodiment is made similar to that according to the embodiment shown in FIG. 25.

Figure 38:
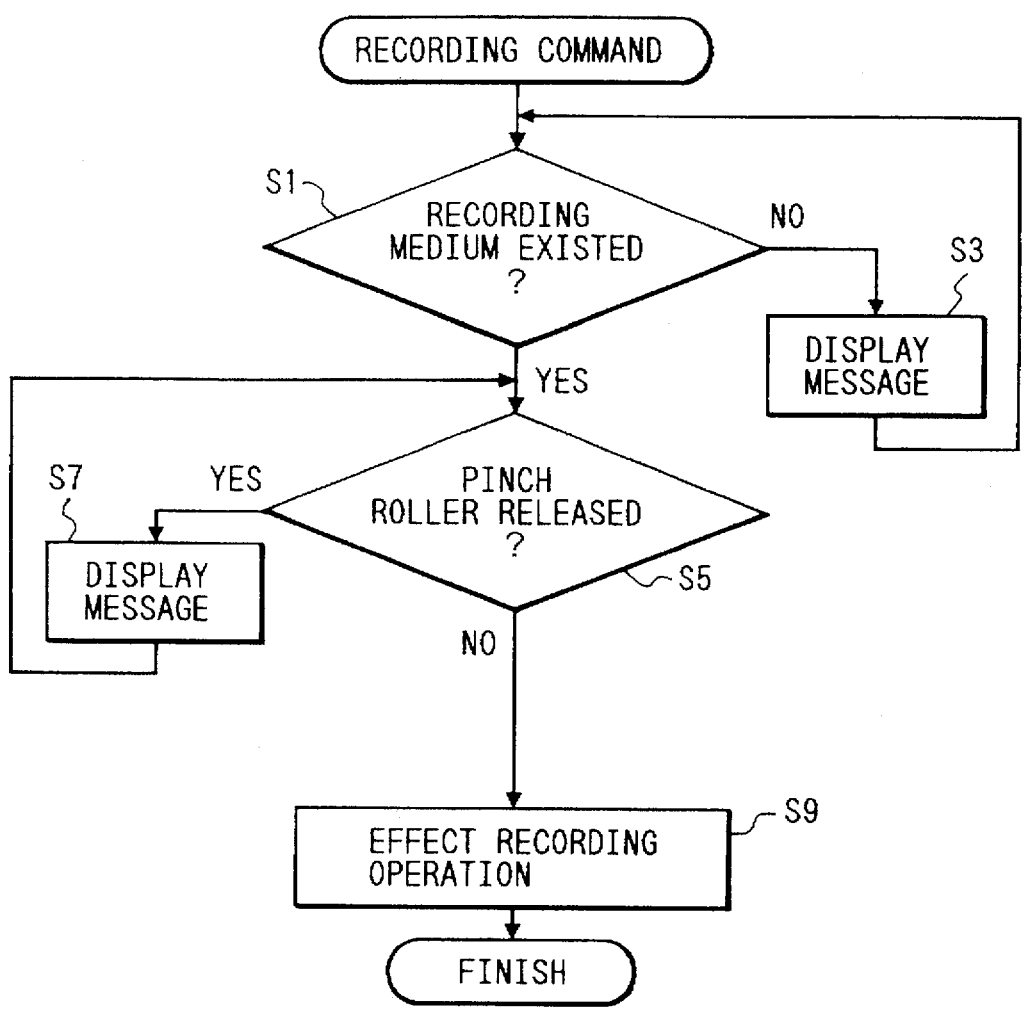
FIG. 38 is a flow chart which illustrates the recording operational sequence.

FIG. 38 is a flow chart which schematically illustrates the recording process according to this embodiment. When a record command is supplied, whether or not the recording paper sheet 1401 is present in the printer 1106 is discriminated in accordance with an output from the upper sensor in step S1. If it is not present, the flow proceeds to step S3 in which a message to set the recording paper sheet 1401 is displayed on the display.

If the recording paper sheet 1401 is present, the flow proceeds to step S5 in which whether or not the pinch roller has been released is discriminated in accordance with the output from the sensor.

If a negative discrimination is made, the release lever 121 is operated and a message is displayed on the display 1104 to request that the pinch roller press the feeding roller 1510. As a result, even if an operator does not return the lever 1121 erroneously after the pinch roller 517 has been released and the recording paper sheet 1401 has been inserted in order to quickly set the recording paper sheet 1401, the undesirable state can be overcome.

For example, a structure may be employed in which an operation of automatically returning the release lever 1121 by using the sub-scanning motor is performed. In this case, the operations in step S7 and step S5 can be omitted.

Thus, the setting of the leading portion of the recording paper sheet 1401 is completed. In step S9, the intermittent feeding of the recording medium 1401 and a recording operation, in which scanning by the head cartridge 1406 is performed, are carried out. If all of data to be recorded have been recorded or the lower end portion (the rear end portion at the time of the recording process) of the recording paper sheet has been detected by the lower sensor, the recording operation is stopped immediately after a predetermined number of lines have been recorded. Then, the recording paper sheet 1401 is discharged and the recording process is completed.

With the aforesaid apparatus, a plurality of feeding ports for feeding the recording paper sheet to the recording portion are provided so as to select the most suitable feeding passage. The first feeding port 1123 is used for feeding an ordinary plain recording paper sheet and disposed in the front portion of the information processing apparatus adjacent to the operator. Therefore, the recording paper sheet 1401 can be supplied to the recording portion during the sequential operation and an operation of folding the display unit can be eliminated.

The second feeding port 1124 is used for the purpose of feeding a small size recording paper sheet except for a regular size or a thick recording paper sheet such as an envelope and a postcard. With this, the recording paper sheet 1401 can be fed by a simple operation such that the lower portion (the installation side of the apparatus) of the apparatus body adjacent to the recording unit is held and the front portion of the apparatus body is raised by the hand when a postcard or the like is fed. Since the second feeding port 1124 is formed adjacent to the recording unit, a recording paper sheet 1401 having a small size can be fed. In addition, since the feeding passage from the feeding port 1124 to the recording unit is formed into a substantially linear shape, a thick recording sheet 1401 can be smoothly fed.

Since the recording paper sheet 1401 is discharged in front of the display unit 1104, the result of recording and the displayed contents can be contrasted easily. Then, the recording paper sheet 1401 passes to the backside of the display unit 1104 via the lower portion of the display unit 1104. Therefore, the display unit 1104 is not covered and the operator's operation cannot thereby be disturbed.

Figure 39:
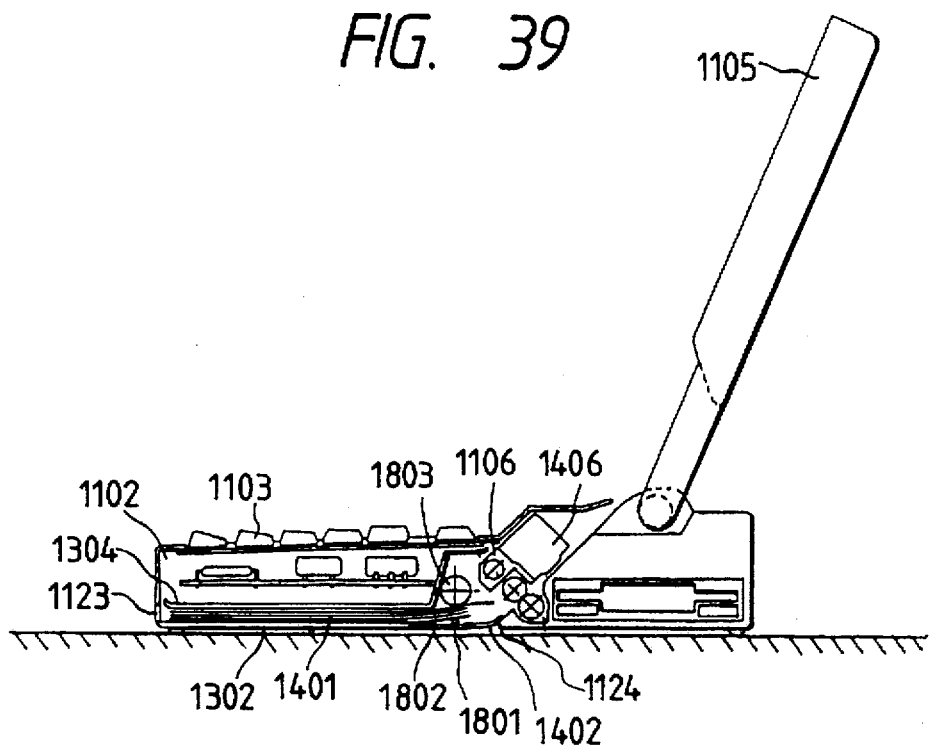
FIG. 39 is a perspective view which illustrates another embodiment of the present invention in which means for automatically feeding the recording paper sheet is provided.

Referring to FIG. 39, another embodiment of the present invention in which the apparatus body has a continuous feeding mechanism will now be described.

In this embodiment, a space formed between the lower case 1302 of the apparatus and a separation plate 1304 is used to accommodate a recording paper sheet 1401. The recording paper sheet 1401 is inserted through the first recording paper sheet feeding port 1123. The recording paper sheet 1401 is pressed to a feeding roller 1803 by a guide plate 1802 urged by a spring 1801. The feeding roller 1803 is driven by a motor (omitted from illustration) via a gear. The recording paper sheet 1401 is fed to the printer 1106 by the feeding roller 1803.

Since the thus arranged continuous feeding mechanism is provided for the apparatus body 1102, a complicated operation of, one by one, feeding the recording paper sheets 1401 can be eliminated. Furthermore, the recording paper sheet 1401 is always stored in the apparatus body 1102, so that a excellent portability can be realized.

Figure 40:
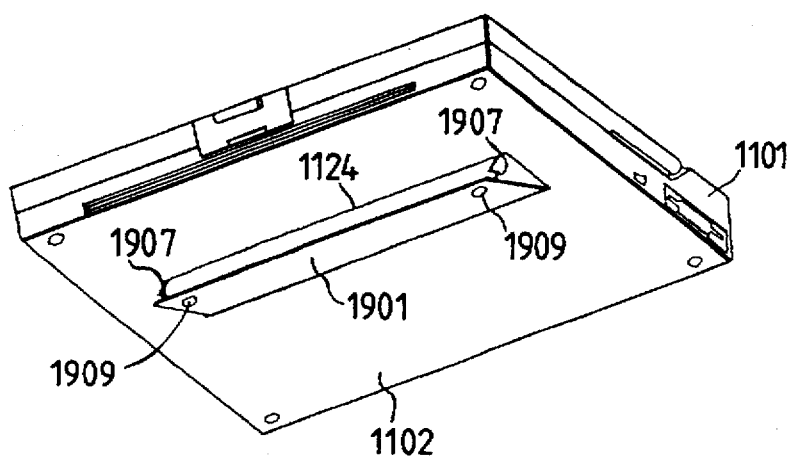
FIG. 40 is a perspective view which illustrates another embodiment of the present invention in which a cover is provided for the second supply port.
Figure 41:
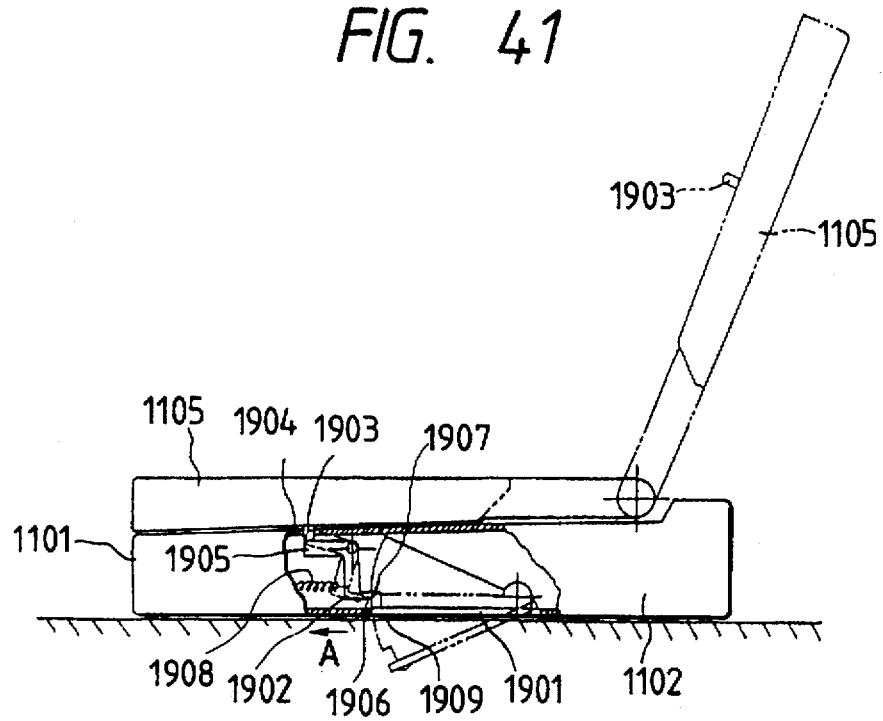
FIG. 41 is a cross sectional view which illustrates the embodiment of the present invention in which the cover is provided for the second supply port.

Referring to FIGS. 40 and 41, another embodiment of the present invention will now be described in which a cover, which can be opened/closed, is provided for the second feeding port.

This embodiment is arranged in such a manner that a rotary feeding cover 1901 is fastened to the lower portion of the apparatus body 1102. Reference numeral 1902 represents a lock plate which is rotatively fastened to the inside portion of the apparatus body 1102. The upper cover 1105 has a projection 1903 which is inserted into the apparatus body 1102 through an opening 1904 in a case where the upper cover 1105 is closed, so that a leading portion 1905 of the lock plate 1902 is held. Furthermore, a lock claw 1906 is engaged to a fastening portion 1907 of the feeding cover 1901, so that the feeding cover 1901 is closed.

When the upper cover 1105 is opened and the projection 1903 is removed from the lock plate 1902, the lock plate 1902 urged by the spring 1908 is turned in direction A, so that the engagement of the lock claw 1906 is released. In a state where the upper cover 1105 of the personal computer 1101 is opened to use the personal computer 1101, it is placed on a flat plane such as a disk and its legs 1909 are positioned in contact with the disk or the like. Therefore, the feeding cover 1901 cannot be opened. When the front portion of the apparatus body 1102 is raised from the aforesaid state, the feeding cover 1901 is opened downwards and thereby the recording paper sheet can be inserted.

Since the thus-formed feeding cover 1901 is provided, the feeding port 1124 and the printer 1106 disposed in the apparatus can be protected. Since the feeding cover 1901 is not opened in a case where the upper cover 1105 is not opened, the apparatus can be safely carried. Since the feeding cover 1901 also serves as a recording paper sheet insertion guide, an excellent handling facility can be obtained.

Figure 42:
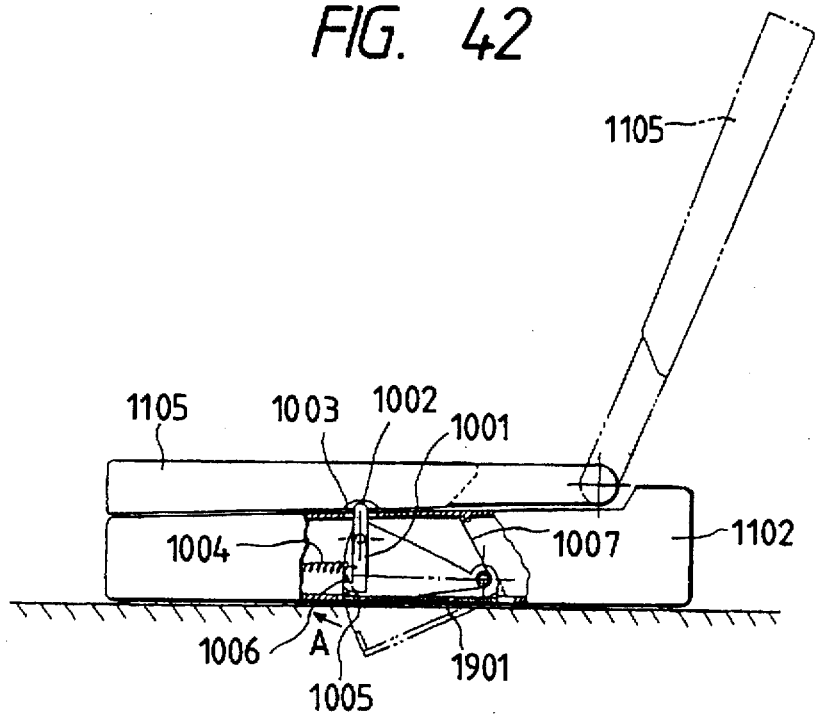
FIG. 42 illustrates another embodiment of the present invention.

Another embodiment in which the feeding cover is manually opened/closed will now be described with reference to FIG. 42.

In this embodiment, a leading portion 1002 of a lock plate 1001 is caused to appear outside the apparatus body 102 via an opening 1003. The lock plate 1001 is urged by a spring 1004 in a direction A, a lock claw 1005 is engaged to a fastening portion 1006 of the feeding cover 1901 and the feeding cover 1901 is closed. When the leading portion 1002 of the lock plate 1001 is pulled toward the operator, the engagement to the lock claw 1005 is released and the feeding cover 1901 urged by a torsion coil spring 1007 is opened downwards. When the feeding cover 1901 is closed, the fastening portion 1006 moves over the lock claw 1005 so as to be held there.

Since the aforesaid feeding cover 1901 is provided, the feeding port and the printer can be protected. Furthermore, the leading portion 1002 of the lock plate 1001 can be covered when the upper cover 1105 is closed, so that the apparatus can be carried safely.

Figure 43:
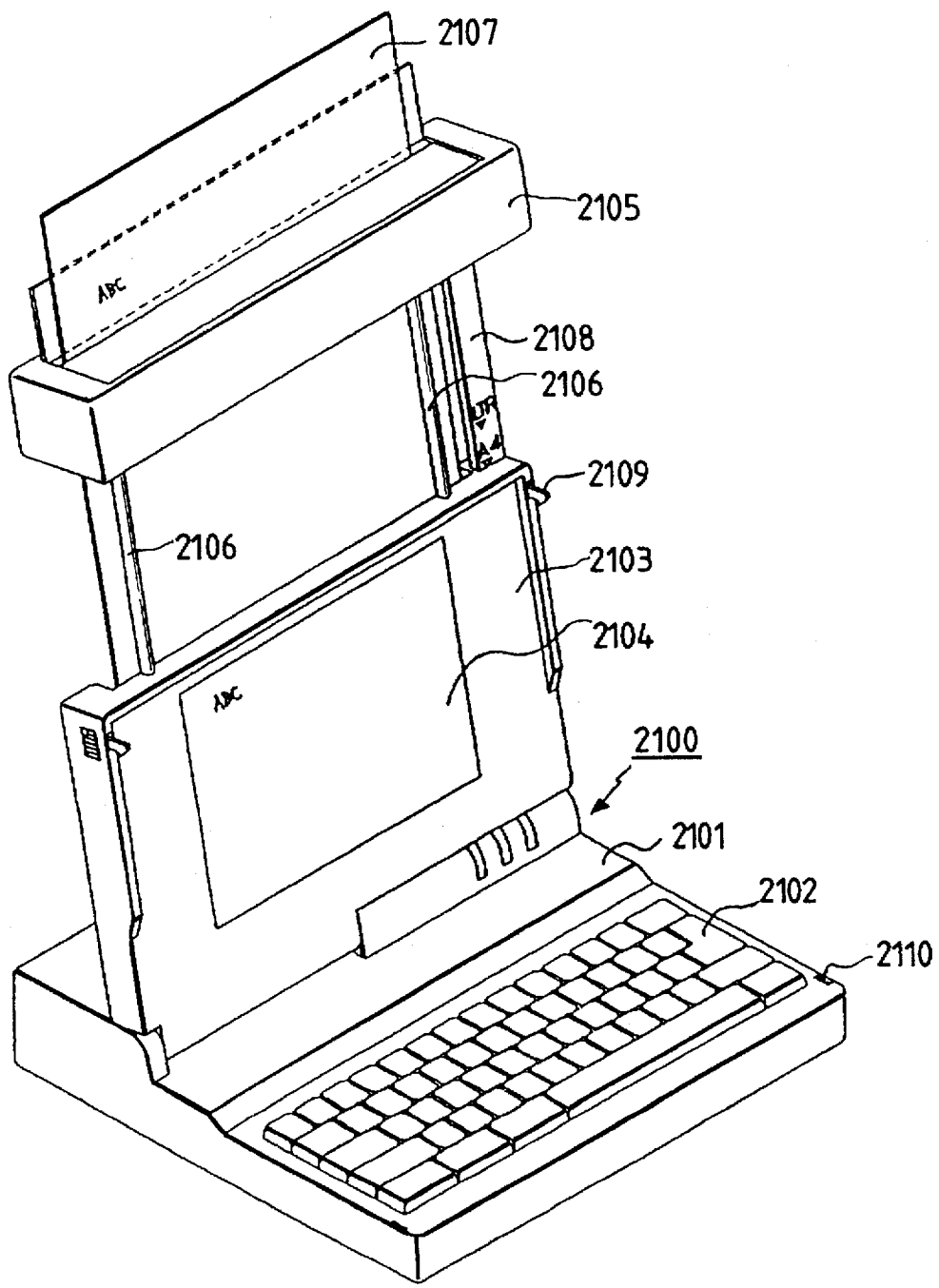
FIG. 43 is a schematic perspective view which illustrates another embodiment of the information processing apparatus according to the present invention.
Figure 44:
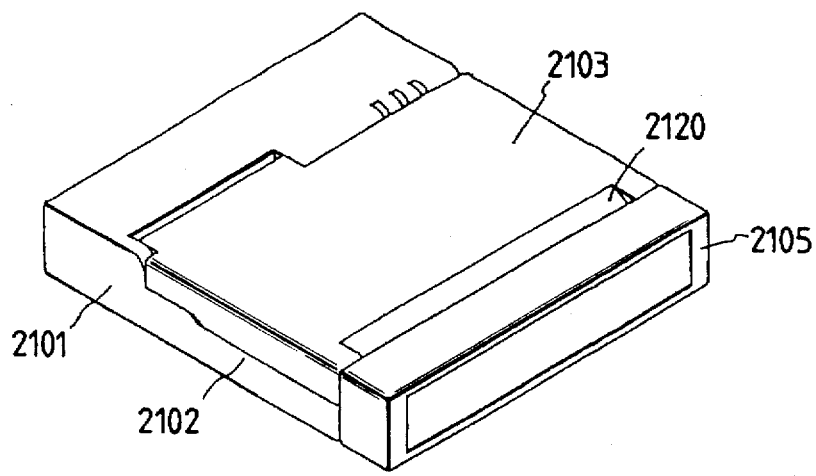
FIG. 44 is a schematic perspective view which illustrates a state where the information processing apparatus is closed.

FIG. 43 is a perspective view which illustrates another embodiment of the information processing apparatus according to the present invention. FIG. 44 is a perspective view which illustrates a state where the apparatus according to this embodiment is folded.

Referring to FIG. 43, reference numeral 2100 represents an overall body of the information processing apparatus according to the present invention. Reference numeral 2101 represents the apparatus body having a keyboard 2102 comprising keys for inputting letters, figures and other characters and keys for issuing various commands and the like. Reference numeral 2103 represents display unit serving as the display means and having a display 2104 for displaying information supplied with the keyboard 2102 and information processed in the apparatus. The display 2104 may be a liquid crystal display or a plasma display or the like with which the thickness of the display unit 2103 can be reduced and the rear portion of the same can be utilized. If a light source can be provided for the purpose of making the display to be seen clearly, a backlight structure may be employed.

Reference numeral 2105 represents a printer unit which is supported by two guide shafts 2106 serving as a position changing means in such a manner that the printer unit 2105 is vertically moved with respect to the display unit 2103. The printer unit 2105 is arranged to be positioned above the display unit 2103 in a state shown in FIG. 43 (in a state where the printer is operated). Thus, information supplied with the keyboard 2102 or information processed in the apparatus is recorded to the recording medium 2107. Reference numeral 2108 represents a member for covering a line for transmitting an electric signal from the display unit 2103 to the printer unit 2105, the member 2108 having, on the surface thereof, a mark corresponding to the position of the printer unit in order to adjust the vertical position of the printer unit 2105 to suit the length of the recording medium 2107. The structure of the printer unit 2105 will be described later.

The display unit 2103 having the printer unit 2105 formed integrally on the upper portion thereof can be turned relative to a hinge shaft (omitted from illustration) provided for the body 2101. When the apparatus is operated, the display unit 2103 is opened as shown in FIG. 43, while the same is closed to be superposed on the keyboard 2102 when the same is folded. Therefore, the overall body can be made compact in the folded state. Reference numeral 2120 represents a guide portion for guiding the recording medium and disposed on the reverse side (the side on which the display 2104 is not present) of the display unit 2103.

Referring to FIG. 43, reference numeral 2109 represents a latch hook provided for the display unit 2105 and 2110 represents a latch hole provided for the body 2101 so as to receive the latch hook 2109 when the display unit 2103 is folded, the latch hole having, on the inside portion thereof, a fastening portion to which a hook 2109 is fastened so as to prevent an undesirable opening of the display unit 2103.

Figure 45:
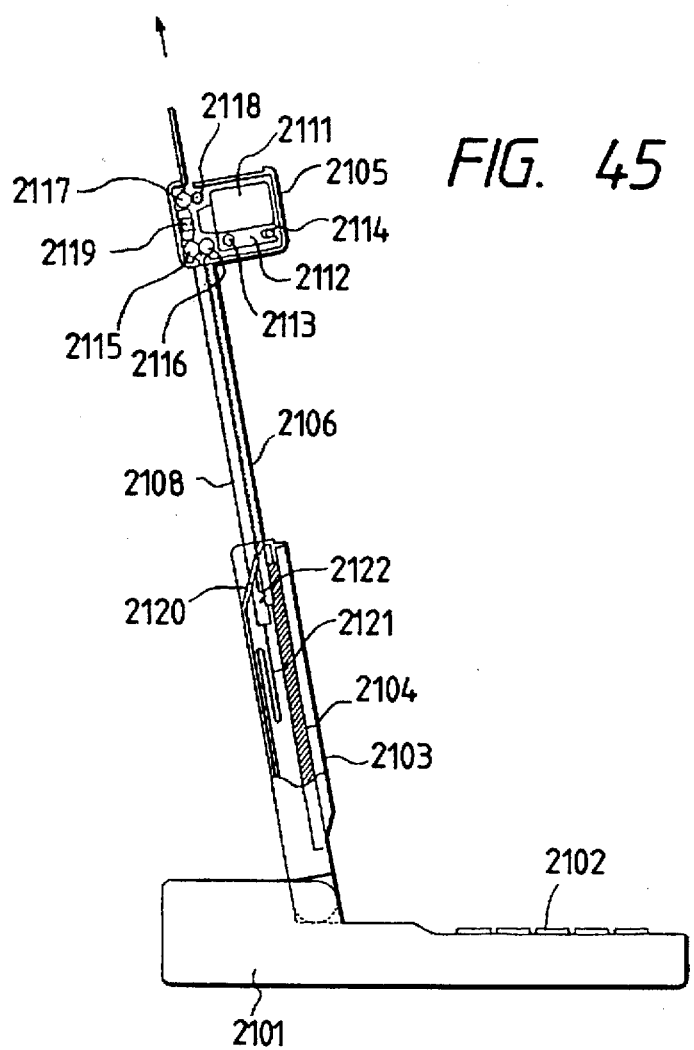
FIG. 45 is a schematic side elevational view which illustrates the information processing apparatus when viewed from a side portion.

The, structure of the printer unit 2105 will now be described. FIG. 45 is a schematic side elevational cross sectional view which illustrates the structure of the display unit 2103 and an ink jet printer unit as an example of the printer unit 2105. Reference numeral 2111 represents a head cartridge which comprises an ink jet recording head and an ink tank. The head cartridge 2111 is detachably fastened to the ink jet recording apparatus shown in FIG. 45. The head cartridge 2111 can be replaced by a novel head cartridge when the ink in the ink tank has been exhausted.

The structure of the recording head is arranged similarly to that according to the aforesaid embodiment.

The ink tank has a volume which is the major portion of that of the head cartridge 2111 and includes an ink reserving chamber for reserving ink. A carriage 2112, on which the head cartridge 2111 is mounted, has a pin (omitted from illustration) which is engaged to a spiral groove of a lead screw 2113 which is rotated via a transmitting mechanism (omitted from illustration) in synchronization with the forward/reverse rotation of the drive motor (omitted from illustration). When the lead screw 2113 is rotated, the carriage 2112 is reciprocated along the lead screw 2113. Reference numeral 2114 represents a carrier guide shaft which guides the turn of the carrier.

Reference numeral 2115 represents a feeding roller for feeding the recording medium 2107 in the direction designated by an arrow of the drawing and 2116 represents a pinch roller for pressing the recording medium 2107 to the feeding roller 2115. Reference numeral 2117 represents a discharge roller for discharging the recording medium 2107 and also feeding the recording medium 2107 according to this embodiment. Reference numeral 2118 represents a spur for pressing the recording medium 2107 to the discharge roller 2117.

At the time of the recording process, the recording medium 2107 is intermittently fed in the direction designated by an arrow of the drawing while being held by the aforesaid two pairs of rollers. The feeding roller 2115 has a shaft which is engaged to a motor (omitted from illustration) via an employed transmitting mechanism so as to receive the rotational force. Reference numeral 2119 represents a sensor disposed between the two pairs of rollers for the purpose of detecting the recording medium 2107. Reference numeral 2120 represents the guide portion 2120 for guiding the recording medium 2107 discharged from the printer unit 2105 to the backside of the display unit. Reference numeral 2121 represents a flexible cable for transmitting an electric signal or the like from the apparatus body 2101 to the printer unit 2105. Reference numeral 2122 represents a leaf spring for realizing a click and a sliding load to the guide shaft 2106.

When the recording operation is commenced, the printer unit 2105 is drawn out by a distance to suit the length of the recording medium 2107. If the recording medium 2107 is a regular sheet, it is fit to a scale formed on the surface of the cover 2108 having the click.

Although the recording medium 2107 may be set to the printer unit 2105 from a position below the printer unit 2107, it is set from an upper position when viewed in FIGS. 43 and 45 according to this embodiment because the recording medium can be set easily. The recording medium 2107 is set in such a manner that the recording medium 2107 is brought into contact with a portion between the discharge roller 2117 and the spur 2118, the discharge roller 2117 is reversely rotated to feed (reverse-feed) the recording medium 2107 in a direction opposing the feeding direction at the time of the recording process, the lower end portion of the recording medium 2107 is detected when the lower end portion of the recording medium 2107 has passed a position in front of the detection sensor 2119, the recording medium 2107 is further introduced until the top end portion of the recording medium 2107 has been detected, and the discharge roller 2117 is rotated forwards, so that the recording medium 2107 is set to a predetermined recording commencement position (setting of the leading portion). Since the length of the recording medium 2107 can be detected by, at this time, counting the lower end portion of the recording medium 2107 to the top end portion of the same, the detection sensor 2119 is positioned higher than the feeding roller 2115. The recording operation is stopped before the lower end portion of the recording medium is removed from the feeding roller 2115. Thus, recording mediums of various lengths such as envelopes and postcards can be printed while eliminating a necessity of instructing the length.

Figure 46:
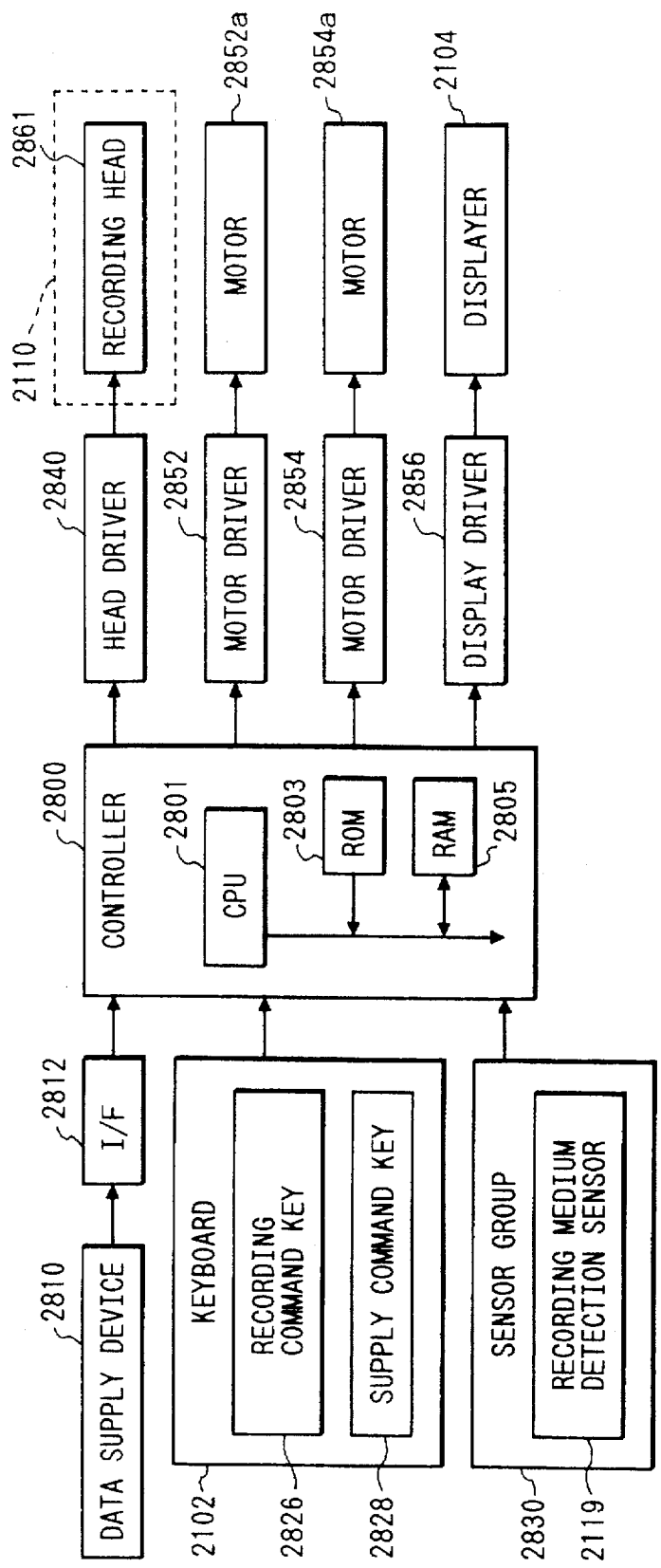
FIG. 46 is a block diagram which illustrates a control system according to the embodiment of the present invention.

FIG. 46 illustrates an example of the structure of a control system for the information processing apparatus according to this embodiment.

Figure 47:
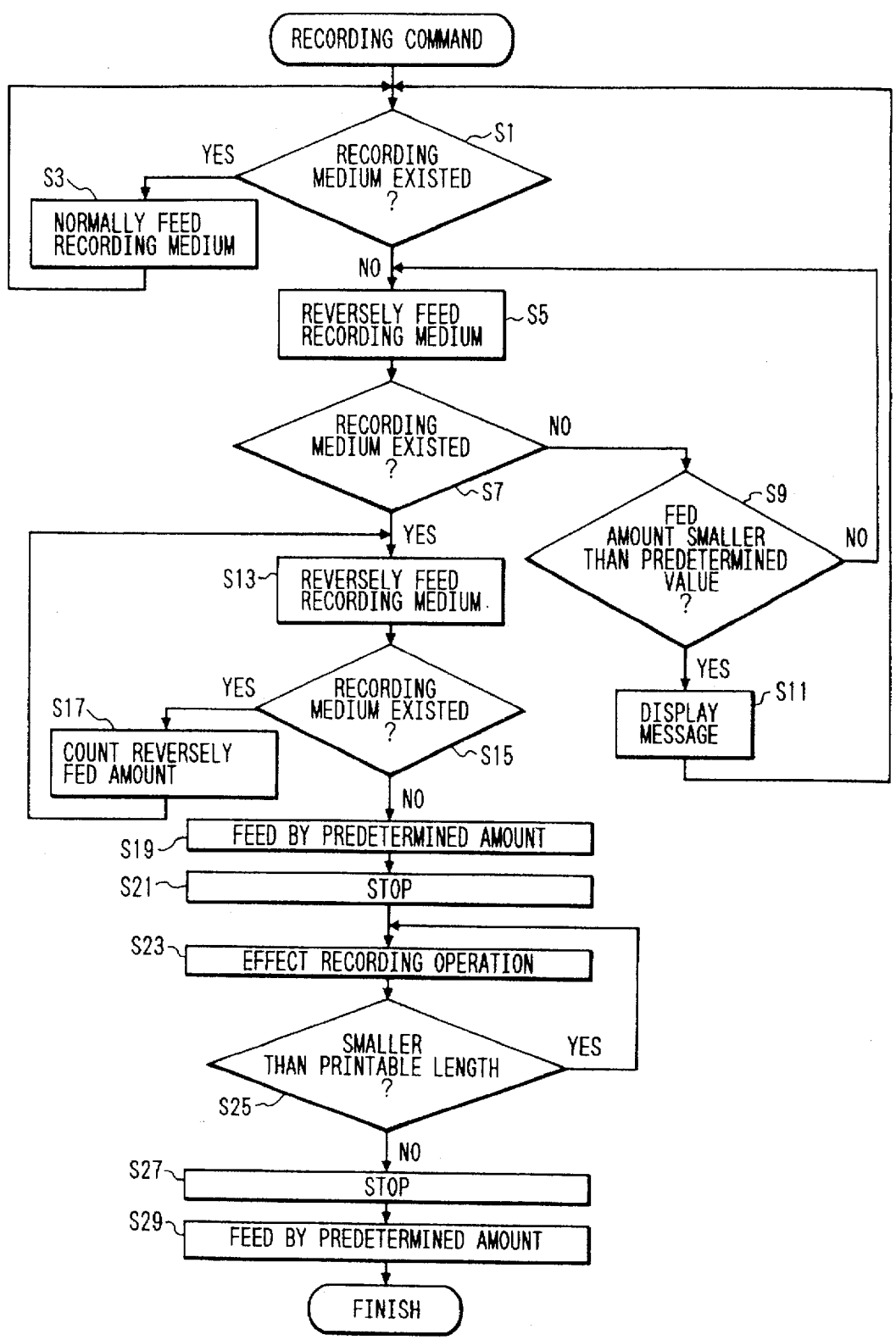
FIG. 47 is a flow chart which illustrates an example of recording means according the embodiment of the present invention.

Referring to FIG. 46, reference numeral 2800 represents a controller which is the main control portion comprising a CPU 2801 formed by, for example, a microcomputer for executing the sequence shown in FIG. 47, a ROM 2803 which stores a program corresponding to the sequence and other fixed data and a RAM 2805 having a region in which image data is developed and a working region. Reference numeral 2810 represents an image data supply apparatus (which may be a disk apparatus integrally formed with the body of the apparatus or an external host apparatus or the like). Image data or other commands or status signals are supplied/received to and from the controller 2800 via an interface (I/F) 2812.

Reference numeral 2826 represents a record command key disposed on the keyboard 2102 and 2828 represents a feeding command key for instructing feeding of the recording medium 2107. Reference numeral 2830 represents a sensor group including a variety of sensors such as the recording medium detection sensor 2119 shown in FIG. 45.

Reference numeral 2840 represents a head driver for driving a device (an electrothermal conversion device according to this embodiment) for generating energy to be utilized to discharge ink from a recording head 2861 provided for the head cartridge 2110. Reference numeral 2852 represents a driver for a main scanning motor 2852a for moving the carriage 2112 in the main scanning direction. Reference numeral 2854 represents a driver for a sub-scanning motor 2854a for conveying(sub-scanning) the recording medium 2107. Reference numeral 2856 represents a display driver for driving the display 2104.

FIG. 47 is a schematic flow chart which illustrates the operation of the recording processing means according to this embodiment. This embodiment is arranged in such a manner that, when a recording command is supplied, whether or not there is a recording medium 2107 in the printer unit 2105 is discriminated in accordance with the output from the sensor 2119 in step S1. If there is the recording medium 2107, the flow proceeds to step S3 in which the recording medium 2107 is fed in the feeding direction determined for the recording process (fed forwards) before the flow returns to step S1.

If there is not the recording medium 2107, the flow proceeds to step S5 in which an operation of reversely feeding the recording medium 2107 held between the discharge roller 2117 and the spur 2118 or brought into contact with the portion between them is commenced. This process is continued until the sensor 2119 detects the lower end portion of the recording medium 2107 (step S7). The quantity of rotation of the discharge roller 2117 is counted during the aforesaid process. If the lower end portion of the recording medium 2107 is not detected in a predetermined quantity of the rotation, a message to set the recording medium 2117 is displayed on the display 2104 (steps S9 and S11). If the lower end portion of the recording medium 2107 is detected, counting of the quantity of rotation of the discharge roller 2117 is commenced while continuing the reverse feeding operation (steps S15 and S17). That is, measuring of the length of the recording medium is commenced. When the top edge (the leading portion at the time of the recording process) of the recording medium 2107 has been detected, the recording medium is fed by a proper quantity which suits the distance from the sensor 2119 to the recording position before the feeding operation is stopped (Steps S19 and S21). At this time, the apparatus according to this embodiment has known the length of the recording medium. If the aforesaid distance is a proper quantity, the process in step S19 can be omitted.

Thus, setting of the leading portion of the recording medium 2107 is completed, and in step S23 the recording medium 2107 is intermittently fed and a known recording operation by the scanning operation performed by the head cartridge 2101 is executed. If data to be recorded has been exhausted or the length, which can be printed and which can be obtained from the known length of the recording medium 2107, has been established (step S25), the recording operation is stopped immediately after this or after a predetermined number of lines have been recorded (step S27). Then, the recording medium 2107 is fed by a predetermined quantity and the process according to this embodiment is completed.

Figure 48A:
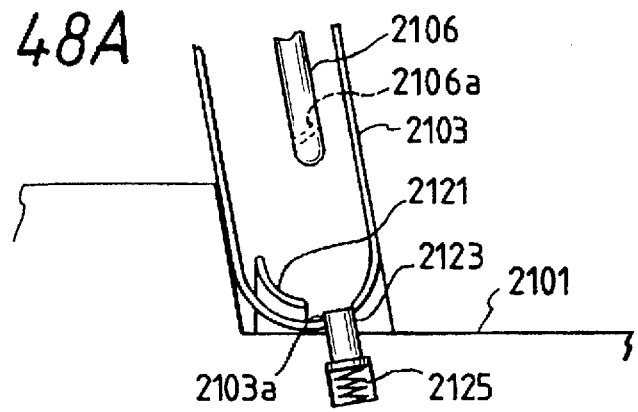
FIGS. 48A to 48C are schematic cross sectional views which illustrate a structural example and the operation of a display unit of the apparatus according the embodiment of the present invention.
Figure 48B:
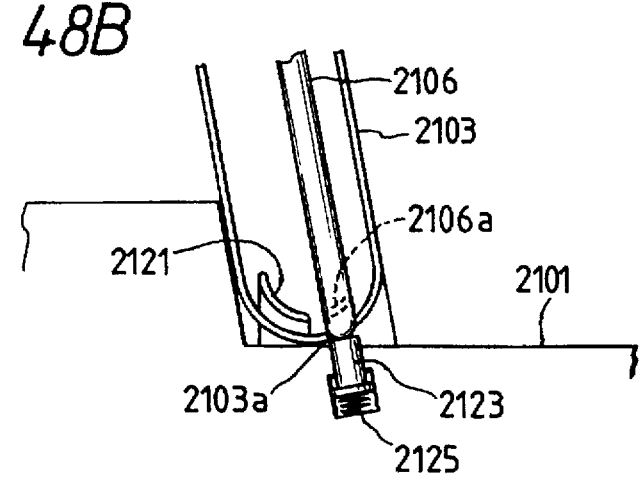
Figure 48C:
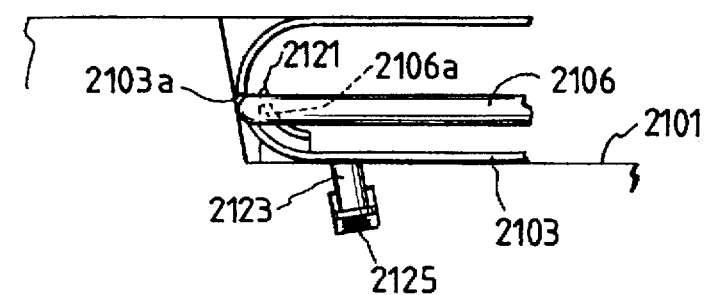

FIGS. 48A to 48C illustrate the hinge portion which establishes a connection between the display unit 2103 and the apparatus body 2101. Referring to FIGS. 48A to 48C, reference numeral 2121 represents a rib secured to the body 2101 and fastened to a groove portion 2106a formed in the guide shaft 2106. Reference numeral 2123 represents a lock pin for securing the display unit 2103 and 2125 represents a spring for urging the lock pin 2123. FIG. 48A illustrates a state where the printer unit 2105 is extended to be separated from the display unit 2103. In this state, the lock pin 2123 is received by a hole 2103a formed in the display unit 2103 and thereby the display unit 2103 cannot be closed. FIG. 48B illustrates a state in which the printer unit 2105 is contracted so as to be fastened to the display unit 2103. In this state, the guide shaft 2106 downwards pushes the lock pin 2123 and thereby the display unit 2103 can be turned. FIG. 48C illustrates a state in which the display unit 2103 is superposed and folded on the apparatus body 2101. Since the display unit 2103 has been turned and thereby the groove portion 2106a of the guide shaft 2106 receives the rib 2121, the printer unit 2105 cannot be drawn out.

As a result, the printer unit 2105 cannot be extended in a case where the display unit 2103 is not opened. On the contrary the display unit 2103 cannot be closed in a case where the printer unit 2105 is not contracted. Therefore, undesirable extension/contraction of the printer unit 2105 can be prevented in a case where the display unit 2103 is closed.

According to this embodiment, the various effects can be obtained and the aforesaid technical problems can be overcome. That is, the recording medium 2107 can be linearly fed along the guide shaft 2106 and the backside of the display unit 2103, so that the thick or thin recording medium 2107 can be fed smoothly and an excellent result can be obtained in the recording operation. Furthermore, the result of the recording operation and the displayed image can be easily contrasted. In addition, the vertical position of the printer unit 2105 is changed to suit the length of the recording medium 2107, so that the size of the information processing apparatus can be reduced.

Although the aforesaid embodiment is arranged in such a manner that the display unit is made foldable, it may be a non-foldable type. This fact is commonly applied to embodiments to be described hereinafter.

Then, another embodiment will now be described in which the printer unit according to the aforesaid embodiments is vertically moved by a motor disposed in the display unit.

Figure 50:
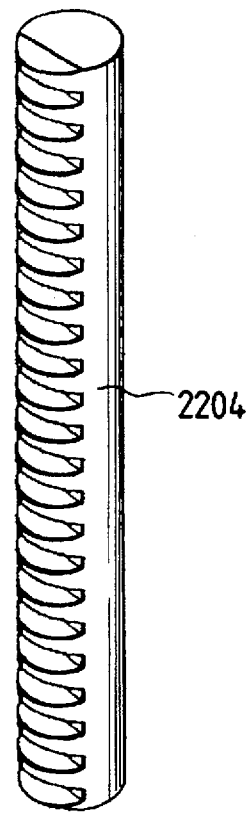
FIG. 50 is a schematic perspective view which illustrates a guide shaft of the information processing apparatus according to the embodiment of the present invention.

FIG. 49 is a schematic perspective view which illustrates a state where the apparatus according to this embodiment is used. FIG. 50 is a perspective view which illustrates a guide shaft for use in the apparatus according to this embodiment. Referring to FIGS. 49 and 50, the elements having the same functions as those according to the aforesaid embodiments are given the same reference numerals.

Referring to FIG. 49, reference numeral 2201 represents a drive motor for vertically moving the printer unit and 2202 represents transmission gears for decelerating the speed of the rotational force of the drive motor 2201 and transmitting the decelerated force to right and left guide shafts 2204. Reference numeral 2203 represents a shaft for connecting the right and left transmission gears 2202. The guide shaft 2204 is constituted by forming a rack in the guide shaft 2106 according to the aforesaid embodiment, the rack being engaged to the transmission gear 2202.

As a result, the operation of drawing out the printer unit 2105 is performed by rotating the motor 2201 as desired at the printing operation. Therefore, the operation facility at the time of using the printer can be improved.

By instructing the size of the recording medium for use in the printing operation before the recording medium is set, the printer unit 2105 is shifted to a required position and the same is returned to the original position after the printing operation has been completed. In addition, a structure may be employed in which the mechanism for vertically moving the printer unit 2105 is included in the recording processing means according to this embodiment and the printer unit 2105 is automatically moved by a required quantity to suit the length of the recording medium to perform the recording operation while eliminating a necessity of instructing the length of the recording medium. That is, when the recording medium is reversely fed for the purpose of supplying the recording medium, the printer unit is moved upwards by a quantity of the reverse feeding if the quantity of the reverse feeding exceeds the length of the display unit 2103. When the printing is performed, the printer unit 2105 is lowered by a quantity of the forward feeding of the recording medium. Thus, the printer unit 2105 is moved upwards by the minimum quantity required.

Another embodiment will now be described in which the guide shaft is diagonally disposed with respect to the display unit in order to secure a paper passage.

Figure 51:
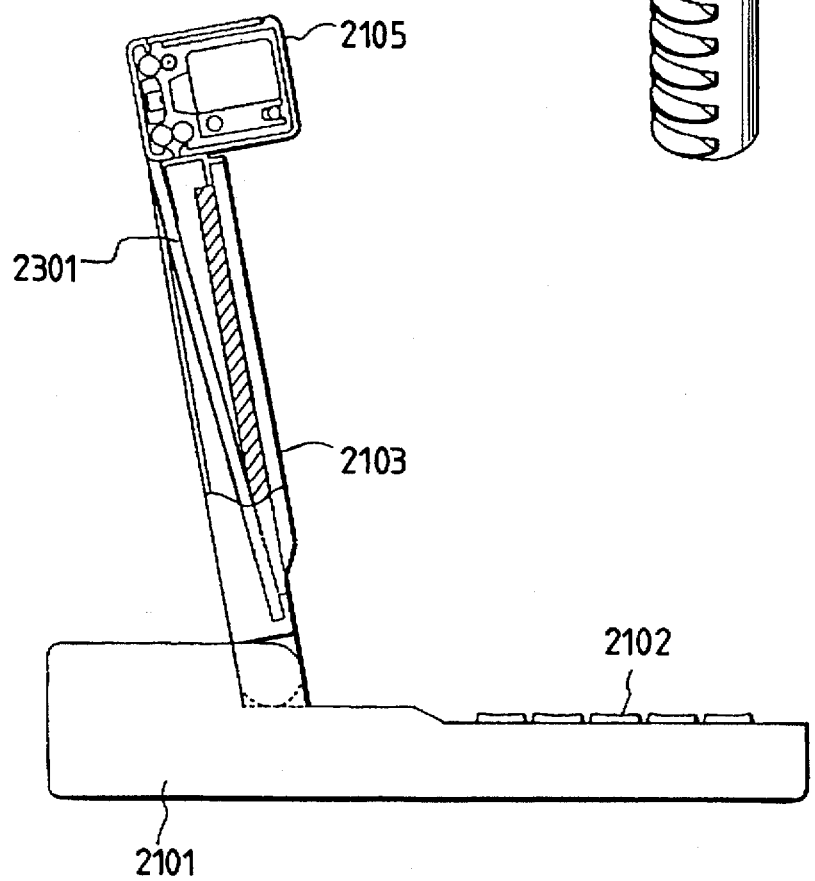
FIG. 51 is a schematic cross sectional view which illustrates another embodiment of the information processing apparatus according to the present invention.
Figure 52:
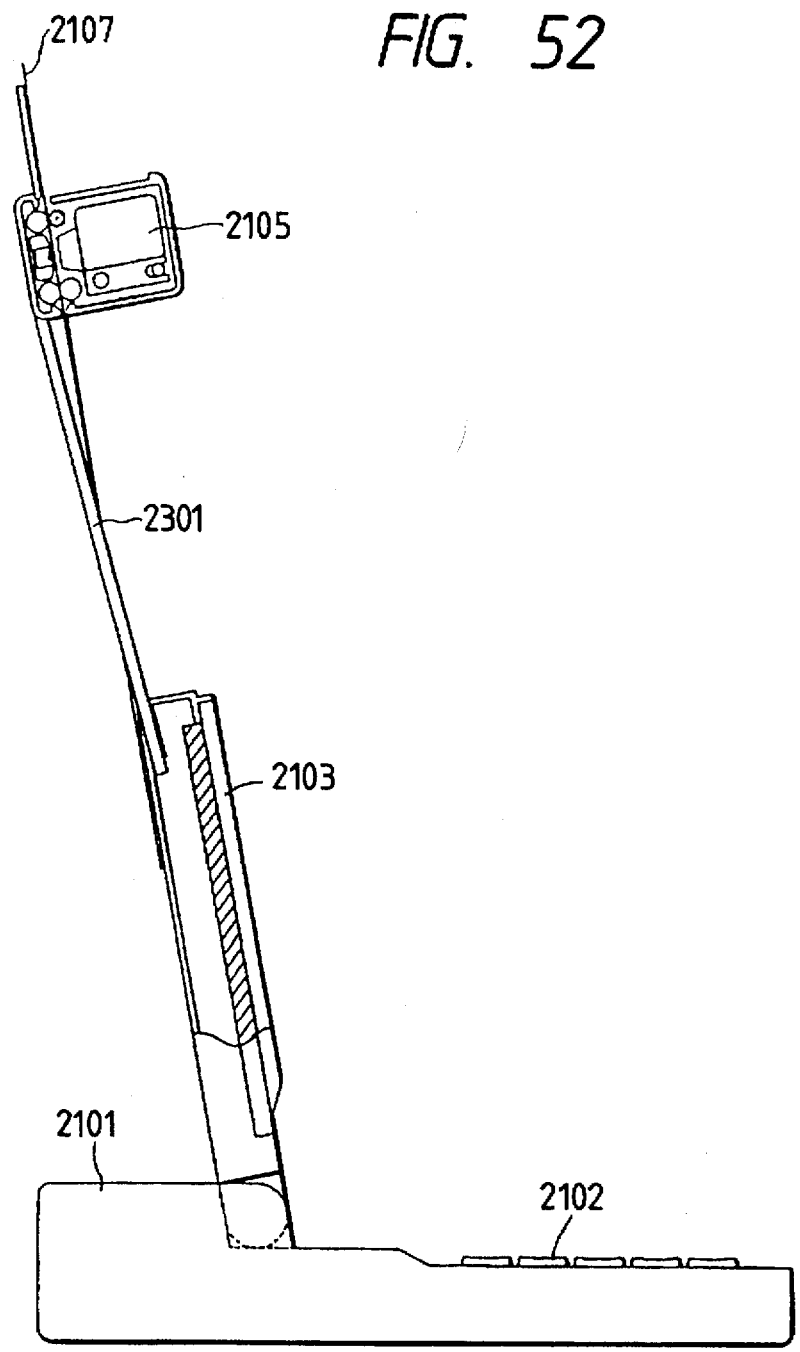
FIG. 52 is a schematic perspective view which illustrates a state where the printer unit of the apparatus has been drawn out.

FIG. 51 is a schematic side elevational view which illustrates a state in which the printer is not used. FIG. 52 is a schematic cross sectional view which illustrates a state where the printer is used. Referring to FIGS. 51 and 52, the same elements as those according to the aforesaid embodiments are given the same reference numerals.

Referring to FIG. 51, reference numeral 2301 represents a guide shaft of the printer unit 2105 which is diagonally disposed with respect to the display unit 2103. When the printer unit 2105 is drawn out in order to use the printer as shown in FIG. 52, the guide shaft 2301 is shifted to the left when viewed in FIG. 52, so that the paper passage is secured. As a result, a necessity of forming a guide portion by diagonally cutting the reverse side of the display unit in the aforesaid embodiments can be eliminated.

Another embodiment will now be described in which the printer unit 2105 disposed on the display unit 2103 can be moved between a position at which the same opens the feeding passage for the recording medium and a position at which the same closes the feeding passage.

FIGS. 53A to 53C are schematic views which illustrate the movement of the printer unit. In this embodiment, the printer unit 2105 can be slidably held on the top surface of the display unit 2103 in the direction toward the operator (see FIG. 53A) and in the direction toward the backside of the display unit (see FIG. 53B). When the printer unit 2105 is positioned at the position nearest the operator, the printer unit 2105 is positioned at the accommodation position (non-operational position) at which the printer unit 2105 does not project over the backside of the display unit 2103. When the same is positioned at the most backside position, the printer unit 2105 is positioned at the recording position (operation position) at which at least a portion of the lower surface of the printer unit 2105 is slid and allowed to project over the top surface of the display unit 2103. When the printer unit 2105 is at the recording position, the feeding passage for the recording medium 2107 can be secured. If the length of the display unit 2103 is longer than that of the recording medium, the printer unit can be moved higher than the display unit similarly to the aforesaid embodiment (see FIG. 53C).

Referring to FIG. 53, reference numeral 2401 represents a printer unit locking claw provided for the display unit 2103 and acting to fix the display unit 2103 and the printer unit 2105 in the state where the printer unit 2105 is accommodated. Reference numeral 2402 represents a display unit locking claw provided for the printer unit 2105 and acting to fix the display unit 2103 and the printer unit 2105 in the state where the printer unit 2105 is accommodated. Reference numeral 2403 represents a guide shaft locking member for preventing returning of the printer unit 2105 to the position at which it closes the feeding passage after the printer unit 2105 has been drawn out from the display unit 2105, the guide shaft locking member being supported rotatively around a shaft 2403P provided for the printer unit 2105 and urged downwards when viewed in the drawing by a spring (omitted from illustration). Reference numeral 2404 represents a pin for raising the aforesaid guide shaft locking member 2403 and disposed in the display unit 2103.

Figure 54A:
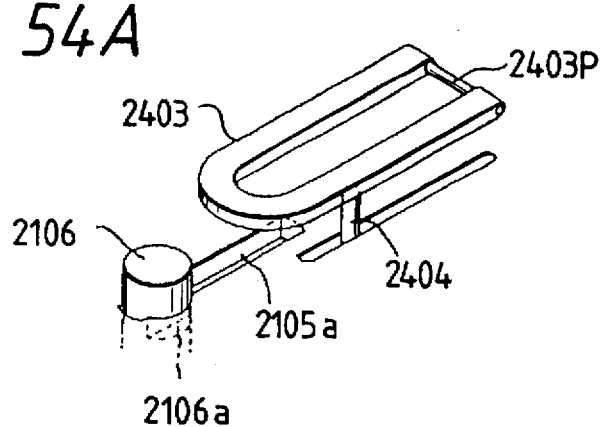
FIGS. 54A to 54C are schematic perspective views which illustrate the junction.
Figure 54B:
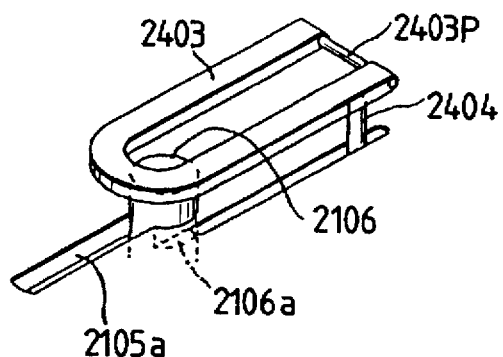
Figure 54C:
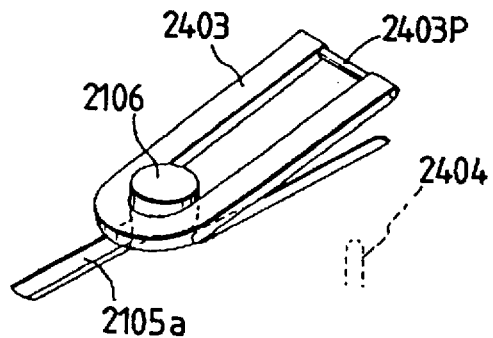

FIGS. 54A to 54C are perspective views which illustrate the portion of the printer unit 2105 moving with respect to the guide shaft 2106. FIGS. 53A, 53B and 53C respectively correspond to FIGS. 54A, 54B and 54C.

Referring to FIG. 54, the guide shaft 2106 has a two-way groove 2106a. The printer unit 2105 has an elongated hole 2105a which is fitted with the groove 2106a to move in parallel. Referring to FIGS. 53A to 53C and 54A to 54C, the printer unit 2105 and the display unit 2103 are secured by the locking claws 2401 and 2402 in FIGS. 53A and 54A. Therefore, the printer unit 2105 cannot be drawn out. At this time, the guide shaft lock member 2403 is urged upwards when viewed in the drawing because it is pushed by the pin 2404. When the printer unit 2105 is then moved in parallel when viewed in the drawing, the lock claws 2401 and 2402 are released and the state shown in FIGS. 53B and 54B is realized in which the feeding passage is secured. In this state, the lock member 2403 does not act on the guide shaft 2106. When the printer unit 2105 is further drawn out, the pin 2404, which has been raising the locking member 2403, is released and thereby the locking member 2403 acts on the guide shaft 2106. As a result, a state shown in FIGS. 53C and 54C is realized.

As a result, the printer unit 2105 cannot be drawn out from the display unit 2103 in a case where the printer unit 2105 is not moved in order to secure the feeding passage. Furthermore, the feeding passage cannot be closed in a case where the printer unit 2105 is not returned to the display unit 2103. Therefore, the undesirable extension/contraction of the printer unit 2105 can be prevented.

Figure 55:
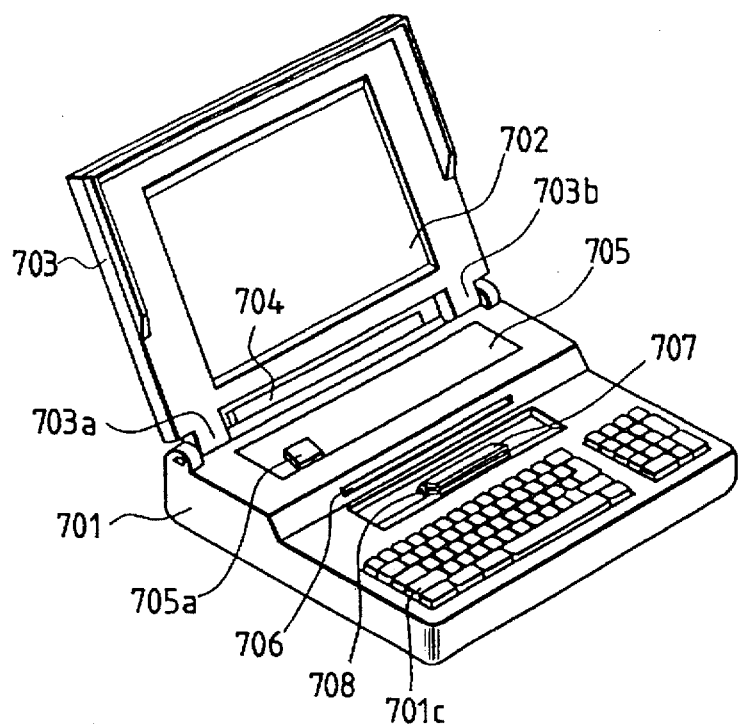
FIG. 55 is an overall perspective view which illustrates another embodiment of the information processing apparatus according to the present invention.
Figure 56:
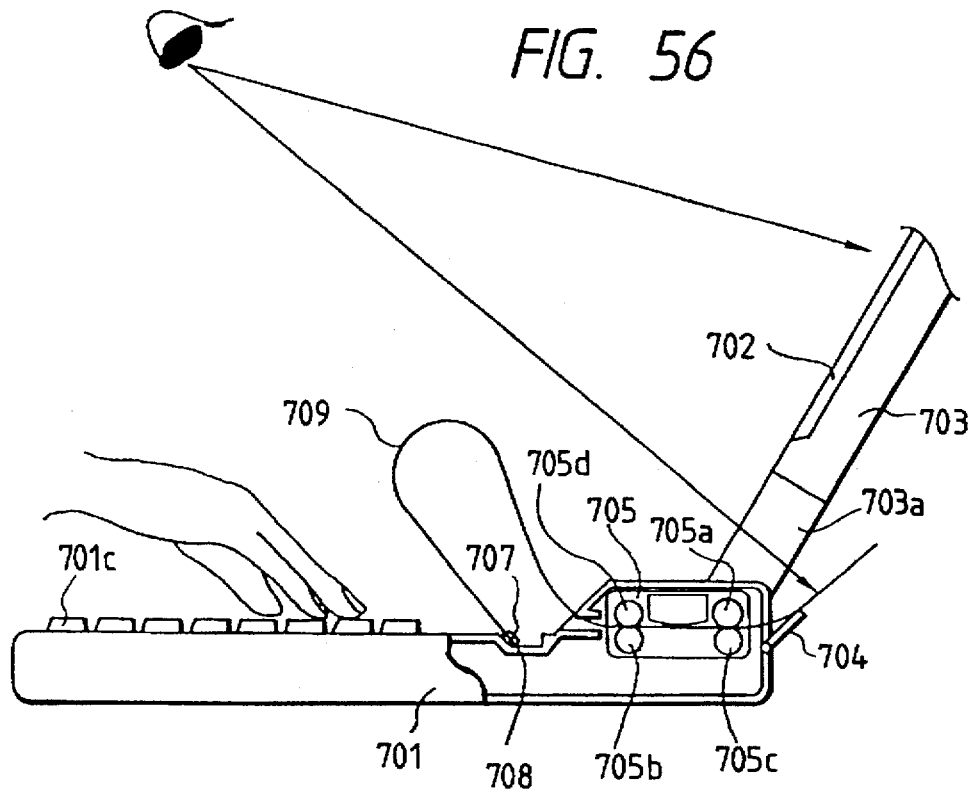
FIG. 56 is a partial side cross sectional view which illustrates the embodiment of the information processing apparatus according to the present invention.

FIGS. 55 and 56 illustrate another embodiment. Referring to FIGS. 55 and 56, reference numeral 701 represents an information processing apparatus and 701c represents a keyboard, 702 represents a display unit of a thin type comprising a liquid crystal display or the like. Reference numeral 703 represents an upper cover for holding the display unit 702 and rotatively fastened to the body of the information processing apparatus 701 via arm portions 703a and 703b. Although the area of the display 702 held by the upper cover 703 may be determined relatively freely, the present invention is not limited to the description. The necessity lies in that the display (unit) covers the key portion and the recording unit. Reference numeral 704 represents a paper sheet discharge guide plate fastened in the rear portion of the apparatus adjacent to the paper sheet discharge port, the paper sheet discharge guide plate 704 upward guiding the discharged paper sheet. Furthermore, the paper sheet discharge guide 704 can be accommodated by rotating it.

Reference numeral 705 represents a printer unit capable of downwards printing the upper surface of the paper sheet. The detailed structure of the printer unit 705 is made to be similar to that according to the aforesaid embodiment. Reference numeral 705a represents an ink jet head, 705b represents a paper feeding roller, 705c represents a paper discharge roller and 705d represents a pinch roller. Reference numeral 706 represents a paper sheet insertion port formed behind the keyboard and enabling the paper sheet to be inserted horizontally. Reference numeral 707 represents a paper end clip rotatively supported by a shaft 708 fastened between the paper sheet insertion port 706 formed on the top surface of the apparatus 701 and the keyboard 701c. It may be urged by a spring (omitted from illustration). Reference numeral 709 represents a paper sheet to be printed.

The operation of the aforesaid structure will now be described.

Figure 57A:
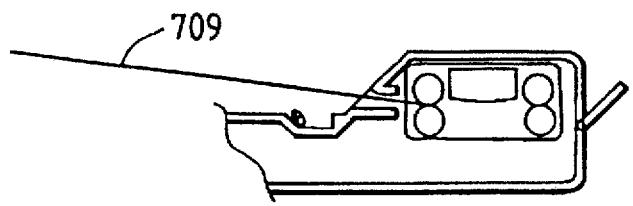
FIGS. 57A to 57D are partial side cross sectional views which illustrate the operation of the information processing apparatus according to the embodiment of the present invention.
Figure 57B:
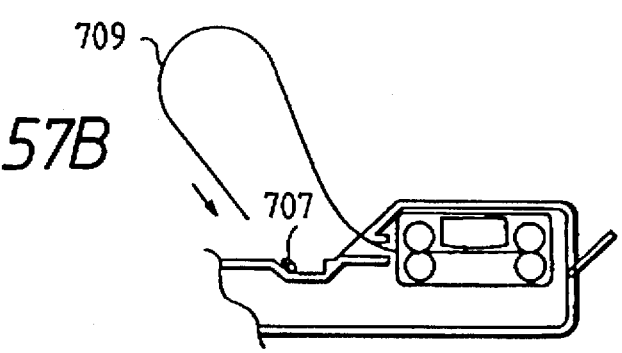
Figure 57C:
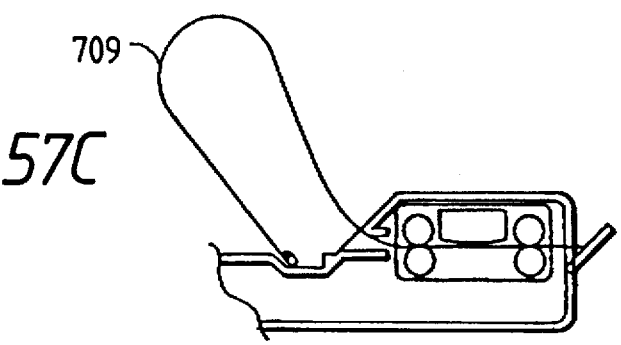

First, the printing paper sheet 709 is horizontally inserted into the paper sheet insertion port 706 before a paper feeding button (omitted from illustration) is depressed or a paper sheet detection switch is provided for the apparatus to detect the leading portion of the paper sheet, so that the leading portion is automatically set (see FIG. 57A). Then, the tail end portion of the paper sheet 709 is inserted into the paper end clip 707 before the hand is released (see FIG. 57B). In response to the print start command, printing is commenced and the paper sheet 709 is fed (see FIG. 57C).

Figure 57D:
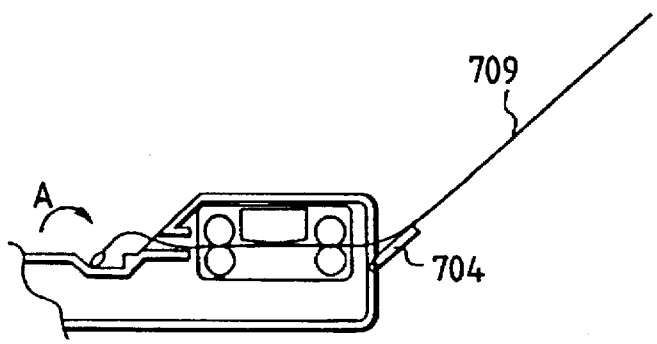

Since the paper sheet 709 is held while being formed into a loop at this time, it does not cover the keyboard 701c and as well does not cover the display 702. Although the size of the loop of the paper sheet 709 is reduced at the time of printing the rear end portion of the paper sheet 709, the paper end clip 707 is turned around the shaft 708 and is gradually folded toward the paper sheet insertion port 706. Therefore, excessive load is not generated in the paper sheet 709 (see FIG. 57D). When the operation of feeding the paper sheet 709 is continued, the rear end portion of the paper sheet 709 is separated from the paper end clip 707 so as to be discharged from the apparatus.

As described above, the paper end clip 707 is turned, so that the paper sheet 709 forms a loop at the initial stage of the printing operation and thereby the load generated at the time of feeding the paper sheet is reduced significantly. When the printing operation becomes the final stage, the paper end clip 707 is turned to decrease the angle of the loop to compensate the reduction in the size of the loop. As a result, the load acting on the paper sheet feeding mechanism of the recording apparatus can be reduced. If the recording apparatus is disposed at the aforesaid position, a small size paper sheet such as a postcard and an envelope can be fed horizontally and thereby it can be set easily. At this time, the paper sheet discharge guide plate 704 must be accommodated.

Figure 58:
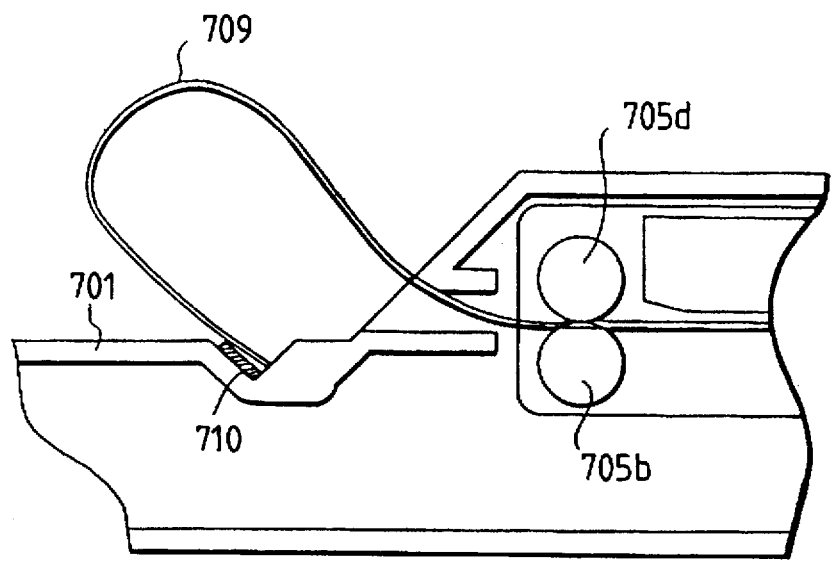
FIG. 58 is a partial side cross sectional view which illustrates another embodiment of the present invention.
Figure 59:
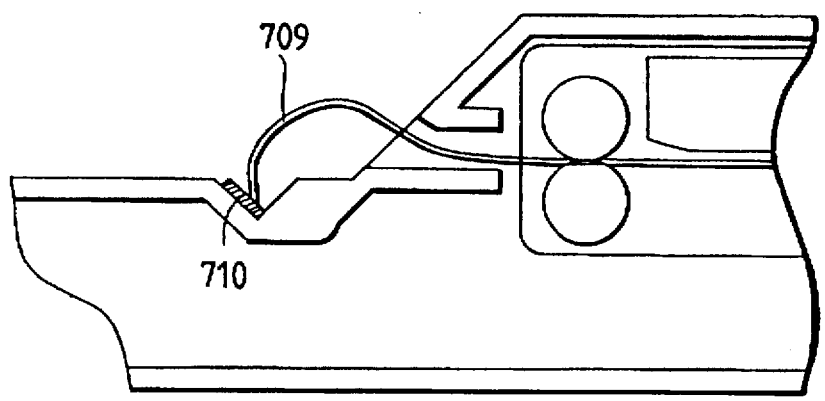
FIG. 59 is a partial side cross sectional view which illustrates the operation of the information processing apparatus according to the embodiment of the present invention.

FIG. 58 is a cross sectional view which illustrates another embodiment of the present invention. Referring to FIG. 58, reference numeral 701 represents an information processing apparatus body, 701c represents a keyboard, 705b represents a paper sheet feeding roller and 705d represents a pinch roller. A portion of the body 701 (a portion between the keyboard 701c and the paper sheet insertion port 706) is formed into a V-shape recess and a holding member 710 made of material having high friction coefficient such as rubber is partially applied. Although the paper sheet 709 is set similarly to the aforesaid embodiment, the rear end portion of the paper sheet 709 is inserted into the bottom portion of the V-shape recess and thereby separation due to the loop of the paper sheet 709 is prevented thanks to the friction coefficient of the holding member 710. Since the paper sheet 709 is positioned in a direction in which it is separated from the holding member 710 at the time of the completion of the printing operation as shown in FIG. 59, it can easily be separated. According to this method, the number of the elements can be reduced and the manufacturing cost can be reduced.

Figure 60:
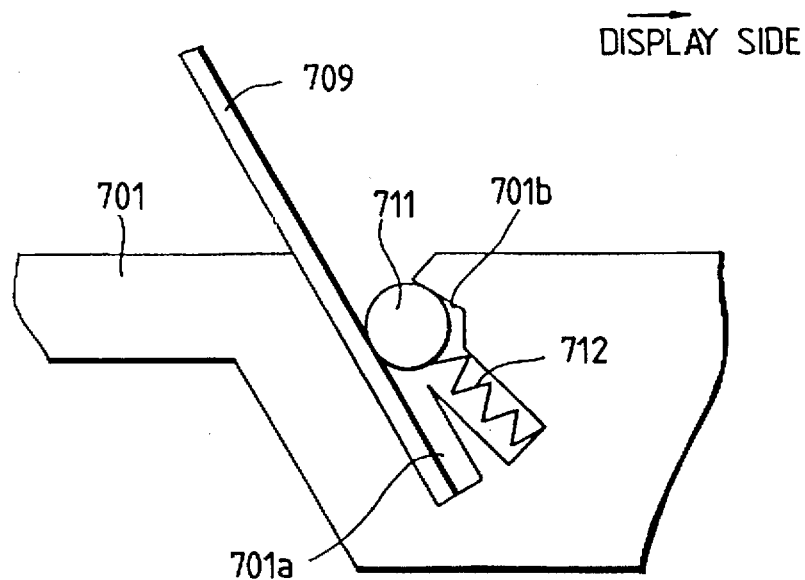
FIG. 60 is a partial side cross sectional view which illustrates another embodiment of the present invention.

FIG. 60 illustrates another embodiment of the present invention in which a groove 701a formed in the body 701 and a tapered ball guide surface 701b which is narrowed toward the opening portion are formed. As a result, a ball-like lock ball 711 is movably fastened while being urged in a direction by a spring 712. Since the lock ball 711 is upwards pushed by a small force, the paper sheet 709 can be inserted easily to be set and the same cannot be undesirably separated because the lock ball 711 acts as an wedge in the drawing-out direction.

Figure 61:
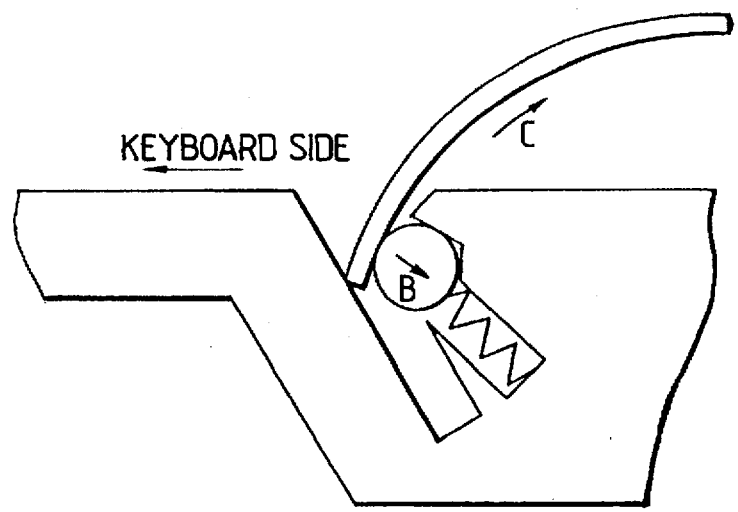
FIG. 61 is a partial side cross sectional view which illustrates the operation of the embodiment of the present invention.

When the paper sheet 709 is fed, the size of the loop is decreased and the lock ball 711 is moved in a direction designated by arrow B by the paper sheet 709 as shown in FIG. 61. Therefore, the holding effect can be lost and the paper sheet 709 can be separated in direction C. According to this embodiment, the rear end portion of the paper sheet 709 can be held assuredly. Therefore, a rigid sheet such as a relatively thick paper sheet or a hard paper sheet can be used.

Figure 62:
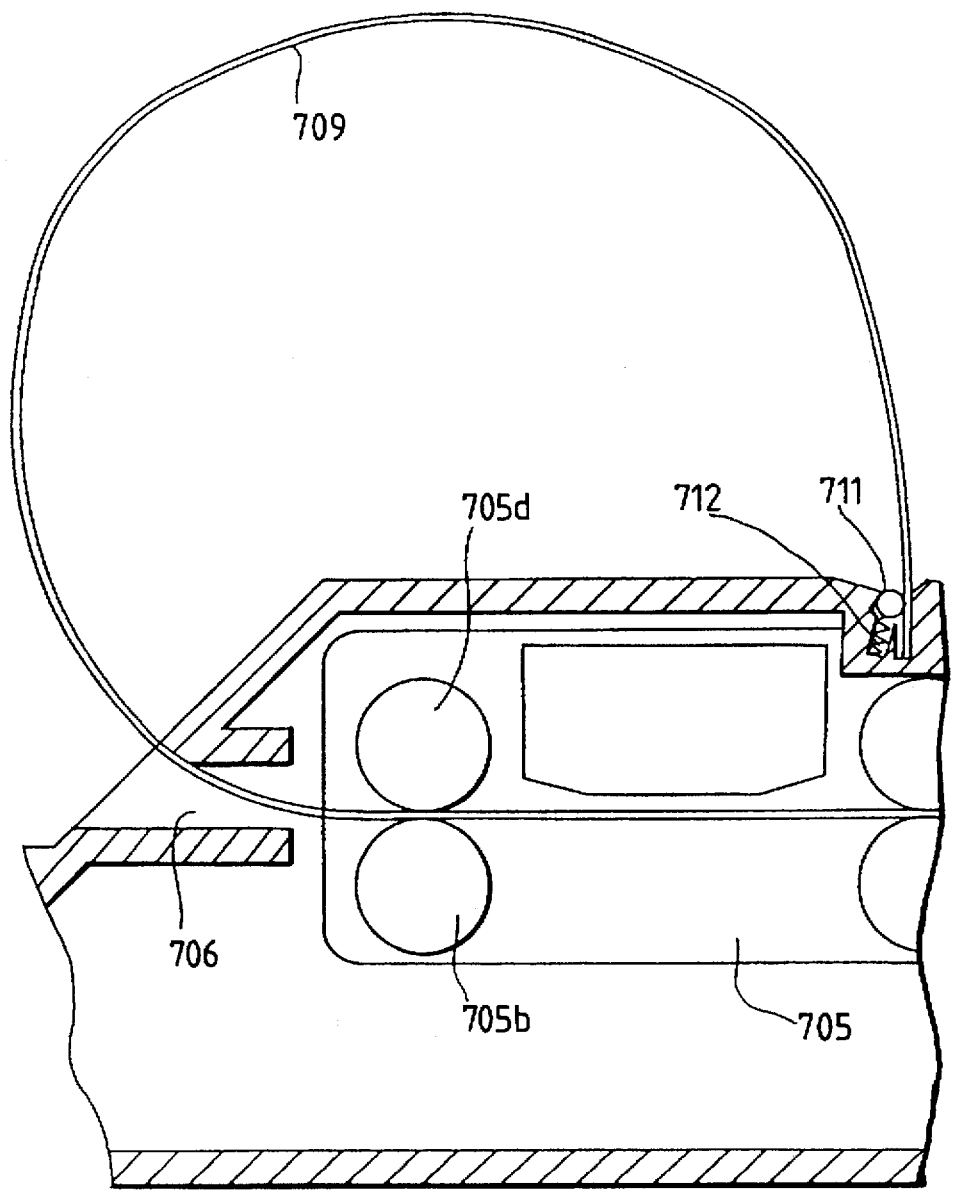
FIG. 62 is a partial side cross sectional view which illustrates another embodiment of the present invention.

FIG. 62 illustrates another embodiment of the present invention in which the paper end clip is disposed in the upper portion of the printer. It is most preferable that the holding effect is obtained from the lock ball method according to the aforesaid embodiment. Referring to FIG. 62, reference numeral 711 represents a lock ball and 712 represents a spring disposed on the printer 705.

The recording paper sheet 709 is held by the lock ball 711 at the paper end portion thereof and is introduced into the paper sheet discharge roller disposed in the lower stream through the paper insertion port 706 of the printer 705 while forming an upward loop in such a manner that the recording paper sheet 709 is held by the paper sheet feeding roller 705b and the pinch roller 705d which form the paper feeding mechanism of the printer. In the aforesaid arrangement, the keyboard is able to have a wide area and an effect can be obtained in that a multiplicity of function keys and special keys are desired to be provided. Furthermore, a relatively large loop can be formed and thereby a thick or a rigid paper sheet can be used. Therefore, a variety of paper sheets can be used.

Figure 63:
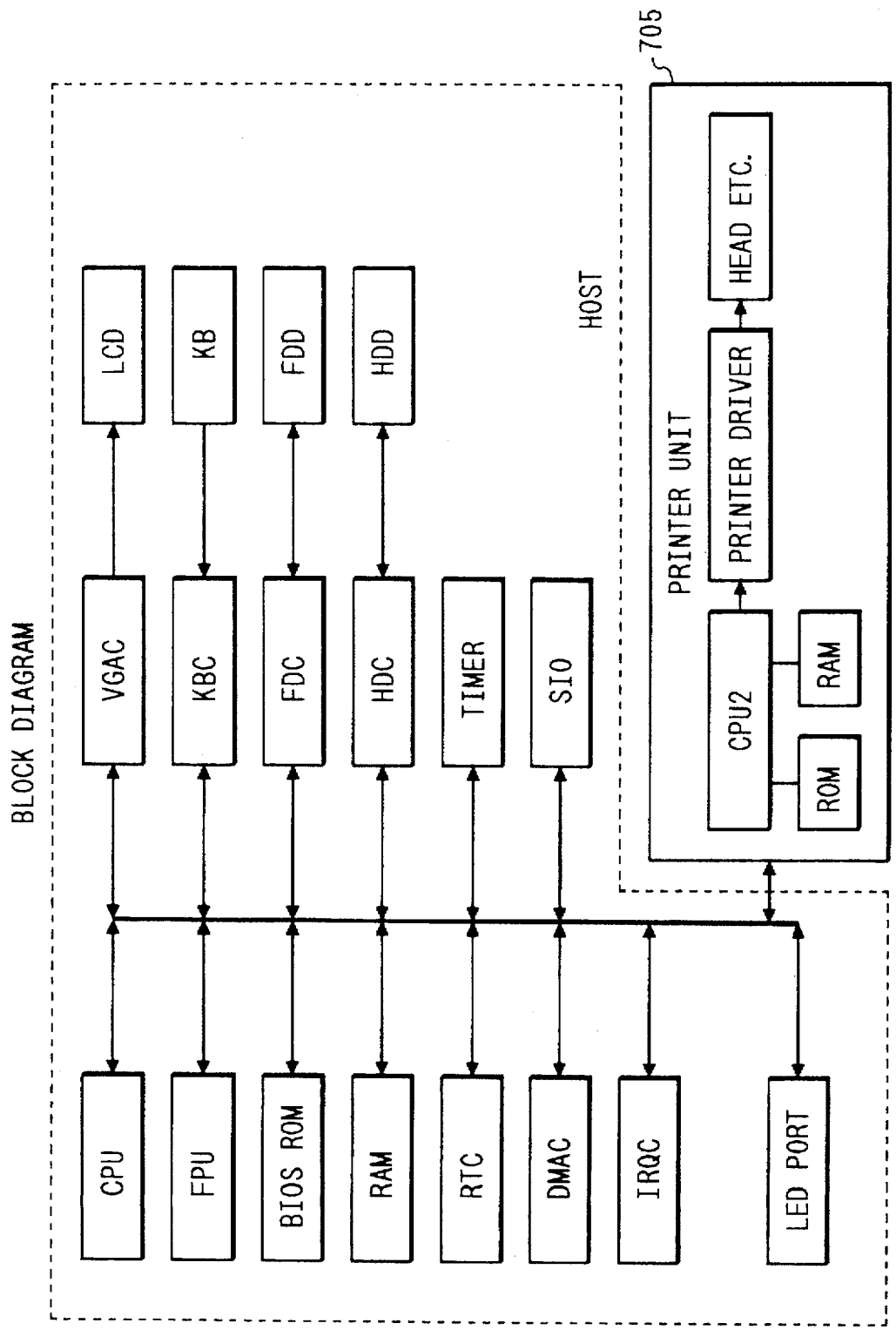
FIG. 63 is a block diagram which illustrates the information processing apparatus.

FIG. 63 is a schematic block diagram which illustrates a host computer and a printer.

The host computer is mainly controlled by a central processing unit (CPU), the basic control of which is instructed by a BIOS ROM (Basic Input Output System ROM). An application program is read out from a floppy disk (FDD) or a hard disk (HDD) via a floppy disk controller (FDC) or a hard disk controller (HDC) and a system memory (RAM) is utilized, so that the program is executed. In this structure, images are displayed in such a manner that characters or the like are displayed on a liquid crystal device (LCD) by a VGA controller (VGAC) utilized. The key input from the keyboard (KB) is made via a keyboard controller (KBC).

A figure processing unit (FPU) supports a calculation operation performed by the CPU. A real time clock (RTC) indicates the present lapse time and continues the operation by an exclusive battery even if the power supply to the overall body of the system is stopped. A DMA controller (DMAC) transmits data at high speed between memories, between the memory and an I/O and between I/Os without an interposition of the CPU. An interruption controller (IRQC) receives an interruption through each I/O and processes data in accordance with the priority order. A timer (TIMER) includes a free running timer having a plurality of channels to variously control the time. Furthermore, the host computer further comprises a serial interface (SIO) and extension ports (PORT) which are connected to an external portion and an LED for indicating the status of the operation of the host computer. A printer is connected to the host computer via a parallel interface so as to transmit/receive data at a register level of the I/O port while forming a connection image which is equivalent to that realized when the data transmission/receipt to and from an external printer is performed.

Figure 64:
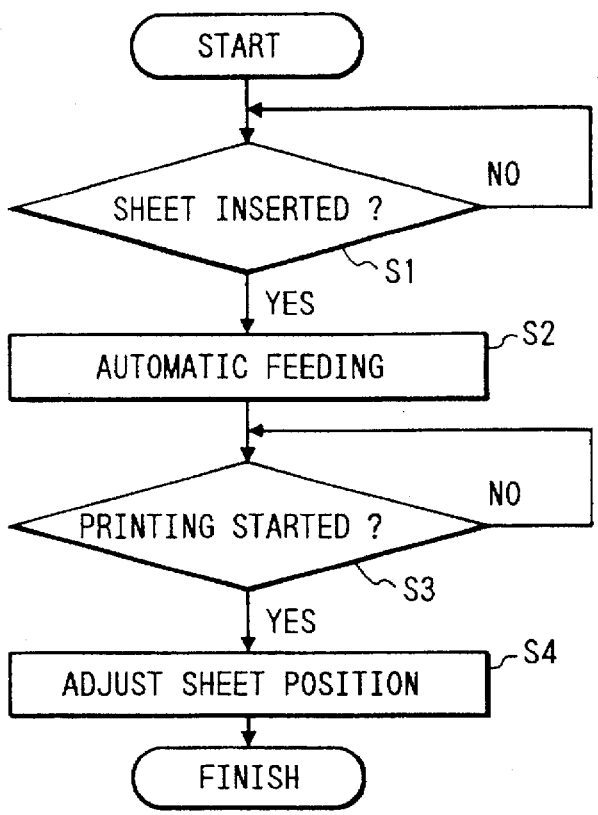
FIG. 64 is a structural view which illustrates the printer unit.

A printer unit 705 includes a control portion which comprises a CPU 2, a printer driver for controlling the head, a RAM and a program expressed by a flow chart shown in FIG. 64.

FIG. 64 is a flow chart which illustrates the process of controlling the paper sheet feeding operation.

If an insertion of the paper sheet is, in step S1, detected in accordance with the operation of a paper sheet feeding button (omitted from illustration) or a paper sheet detection switch (omitted from illustration), the paper sheet is automatically fed to the printing position. It may be performed by a sensor provided or the paper sheet may be fed by a previously programmed quantity. Furthermore, the size of the loop formed as shown in FIGS. 57 to 62 by the paper sheet may be reduced by feeding the paper sheet to the printing position or by previously feeding the leading portion of the paper sheet to a position over the printing position (S2). Thus, the paper sheet, the size of the loop of which has been reduced, is manually inserted into the paper end clip 707. When the printing operation is commenced, the paper sheet positions adjusted in order to return the paper sheet to the print start position. In this case, although the loop is temporarily enlarged, it can be prevented satisfactorily in terms of the time.

Figure 65:
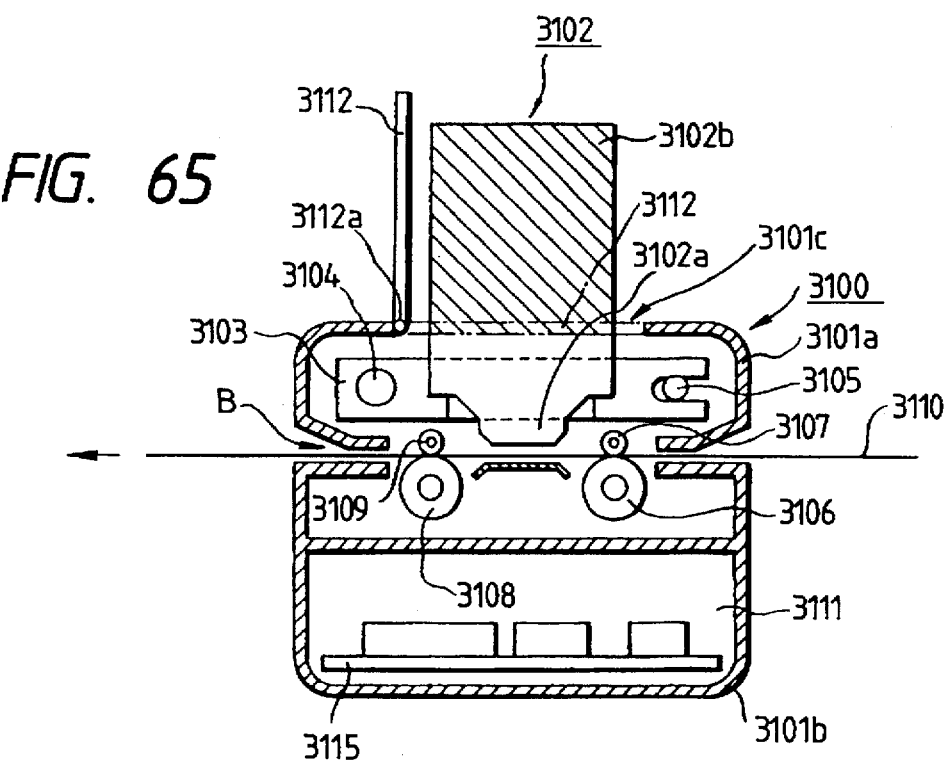
FIG. 65 is a cross sectional view which illustrates the printer according to another embodiment of the present invention.

FIG. 65 is a schematic side elevational cross sectional view which illustrates the printer according to another embodiment of the present invention.

Referring to FIG. 65, an upper case 3101a, a lower case 3101 and a cover 3112 forms a case member of a printer 3100. The cover 3112 is rotatively journalled by the upper case 3101a at the end portion thereof. As a result, the cover 3112 can be opened/closed between an opened state designated by a continuous line of FIG. 65 and a closed state designated by an alternate long and two short dashes line. When the cover 3112 is closed, a member formed into, for example, a projection at an end portion of the cover 3112 opposing its another end portion journalled by the upper case 3101a is fastened to a recessed fastening member formed on the upper case 3101a. Thus, the cover 3112 is secured to the upper case 3101a. The case member such as the aforesaid case 3101a vertically extends when viewed in the drawing so as to cover the overall body of the printer 3100.

Reference numeral 3102 represents the aforesaid recording head cartridge which integrally comprises a chip-type recording head 3102a and an ink tank for reserving ink. The surface of the recording head 3102a has, for example, 64 ink discharge ports (omitted from illustration) disposed in a direction in which the recording paper sheet 3110 is fed (in a direction from right to left when viewed in FIG. 65) so as to downwards discharge ink to the recording paper sheet 3110 which is the recording medium. The ink is discharged by utilizing thermal energy generated by electrothermal conversion members respectively disposed in ink passages (omitted from illustration) allowed to communicate with the corresponding discharge ports when electric pulses are applied in accordance with data to be recorded. The recording head cartridge 3102 is detachably fastened to the carrier 3103 by a fastening means (omitted from illustration) in such a manner that the cover 3112 is opened and the recording head cartridge 3102 is inserted into the carrier 3103 through an opening formed due to opening of the cover 3112.

The carrier 3103 is, in the vicinity of an end portion thereof, fastened to a lead screw 3104 which also serves as a guide shaft of the carrier 3103. Another end portion of the carrier 3103 is fastened to a guide shaft 3105 which is disposed in parallel to the lead screw 3104. The lead screw 3104 and the guide shaft 3105 respectively extend to cover the range in which the carrier 3103 moves. The carrier 3103 and the lead screw 3104 are fastened to each other by coupling a lead groove (omitted from illustration) formed in the lead screw 3104 and a fastening member (omitted from illustration) formed on the carrier 3103. Furthermore, the carrier 3103 and the guide shaft 3105 are fastened to each other in such a manner that the carrier 3103 is able to vertically move with respect to the guide shaft 3105 and as well as the same is able to slide along the guide shaft 3105.

In the structure thus arranged, when the lead screw 3104 is rotated by a carrier motor (omitted from illustration), the carrier 3103 can be moved in the aforesaid movable range. The aforesaid movement can be made to be a reciprocating movement by switching the direction of rotation of the carrier motor. As a result of the forward movement or the forward/backward movement, the recording head 3102a of the recording head cartridge 3102 fastened to the carrier 3103 discharges ink to the recording paper sheet 3110 to record characters, and images and the like. Although omitted from the illustration, a known discharge recovery mechanism is disposed at an end portion of the movable range for the recording head cartridge 3102 in order to cause the recording head 3102a to always satisfactorily discharge ink.

During the movement of the recording head cartridge 3102, a portion of the recording head cartridge 3102 projects outwardly over the cover member 3101a through an opening 3101b formed in the cover member 3101a of the printer 3100 when the cover 3112 is opened (turned around the hinge 3112a). The opening 3101b is formed along the recording paper sheet feeding passage by a length corresponding to its width. In the non-recording case in which the printer according to embodiment is carried or accommodated in a predetermined place, the recording head cartridge 3102 is removed from the carrier 3103 and is accommodated in an accommodating portion formed in a portion of a lower portion 3111 of the printer 3100 and having a cap for capping the recording head. The capping action performed by the cap prevents the rise in the viscosity of the ink even if the recording head cartridge 3102 is accommodated.

The lower portion 3111 accommodates a circuit board 3115 for processing various signals to and from the host apparatus while transmitting/receiving the various signals to control the ink discharging operation performed by the recording head 3102a and various operations relating to the discharging operation, the lower portion 3111 having a relatively small thickness. Therefore, the recording head cartridge 3102 to be accommodated in a portion in the aforesaid portion has a small thickness to suit the structure of the accommodating portion in order to prevent the desire of reducing the thickness of the printer 3100. In this case, the quantity of the ink to be reserved by the ink tank 3102b reduced by a quantity corresponding to the reduced thickness of the ink tank 3102b can be compensated by, for example, elongating the lengthwise directional length, that is enlarging the height of projection of the ink tank 3102b over the case 3101a when the recording head cartridge is fastened as shown in FIG. 65.

As described above, the recording head cartridge 3102 is allowed to outwards project over the cover member 3101a of the printer in the case of the recording process and it can be attached/detached in the non-recording case. As a result, the size, the shape and the like of the ink tank 3102b can be relatively freely determined regardless of the thickness of the printer 3100 or the like. As a result, the capacity of the ink tank for the recording head cartridge can be properly determined in accordance with the life of the recording head while meeting the desire of reducing the size and the thickness of an information processing apparatus or the like such as a so called lap-top type or notebook-type printer or a word processor including a printer. For example, in a case where the size of the printer is the same as that of the printer 3100 shown in FIG. 65 and the present invention is not embodied, the recording head cartridge must be accommodated within a spacer lower than the case member formed by the upper case 3101a and the cover 3112. In this case, the quantity of ink in the ink tank is too small and thereby a problem arises in that the recording head is undesirably interchanged together with the ink tank despite the life of the recording head having not expired yet. As a result, the cost arises excessively. In a case where the present invention is embodied, the quantity of ink increased as designated by oblique lines shown in FIG. 65 can be utilized while reducing the size and the thickness of the printer. Therefore, the size of the ink tank can be matched with the life of the recording head.

Figure 67A:
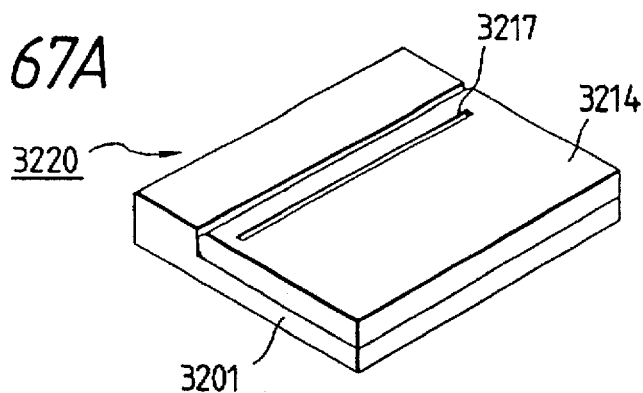
FIGS. 67A and 67B are perspective views which respectively illustrate a state of the personal computer according to the embodiment of the present invention where the cover is opened; and a state where the cover is closed.
Figure 67B:
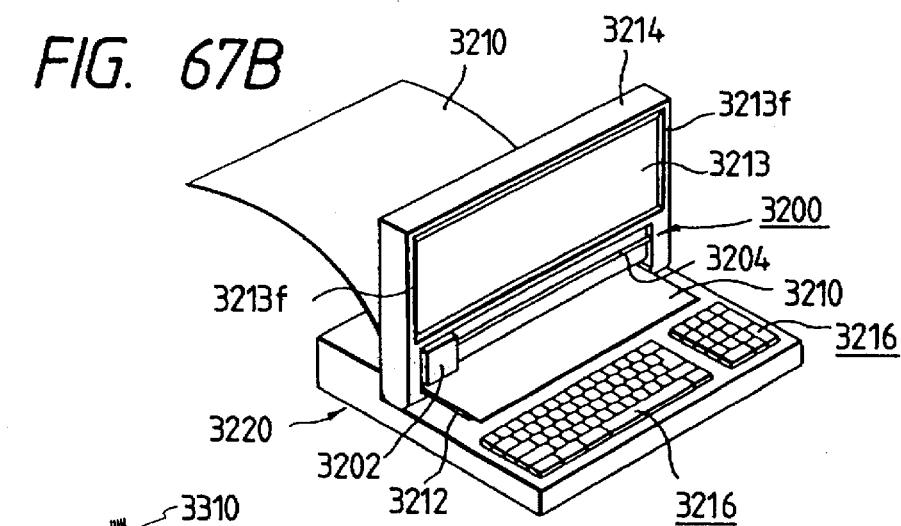

FIGS. 66A and 66B are side elevational and partial cross sectional views which illustrates a personal computer according to another embodiment of the present invention. FIG. 67A is a perspective view which illustrates a state in which the cover of the personal computer is folded. FIG. 67B is a perspective view which illustrates a state where the printer unit is used. Referring to these drawings, hereinafter the same elements as those shown in FIG. 65 are given reference numerals the hundreds digit of each of which is changed from 1 to 2 and their detailed descriptions are omitted here.

As shown in FIGS. 67A and 67B, a personal computer 3220 according to this embodiment comprises a keyboard 3216 with which various data items and control commands are supplied, a disk unit 3215 serving as an external storage device, a display unit 3213 and a printer unit 3200 for respectively display and recording information processed in the apparatus according to this embodiment and an apparatus body including a control unit for processing data for controlling the operations of the aforesaid elements.

The display unit 3213 is included in a cover 3214 which forms a portion of a case of the personal computer 3220. Also the printer unit 3200 forms a portion of the cover 3214 and is disposed below the display unit 3213 while being aligned to the lower edge of the display unit 3213. When the personal computer 3220 is carried or accommodated or the recording operation is not performed despite the personal computer 3220 being operated, a recording head cartridge 3202 of the printer unit 3200 is detached from the carrier 3203 and the range in which they move is covered by a cover 3212. The detached recording head cartridge 3202 is accommodated in a predetermined position in the apparatus body 3201. In this accommodation process, capping with a predetermined cap is performed similarly to the embodiment shown in FIG. 65.

In a case where the printer unit 3200 is used to record information processed in the personal computer 3220, the cover 3212 also serving as paper feeding guide is opened in front of the apparatus and the recording head cartridge 3202 is ejected from the accommodating portion to be fastened to the carrier 3203. At this time, a portion of the recording head cartridge 3202 projects over a line extending from a frame 3213f of the display unit 3213 provided for the cover 3214. In this state, the recording head cartridge 3202 reciprocates along the lower end portion of the display unit 3213 and ink is discharged from the recording head to the recording paper sheet 3210 to record characters, or images or the like. In synchronization with this recording operation, the recording paper sheet 3210 passes from a paper sheet guide 3212 to a recording portion formed by the recording head before it is fed on the upper surface of the apparatus body 3201 in the rear of the display unit 3213.

As a result, a recording head cartridge having an ink tank capable of reserving ink of a quantity which is not limited by the reduced size can be obtained while reducing the size of the personal computer 3220 by folding the cover 3214 as shown in FIG. 67A.

Figure 68:
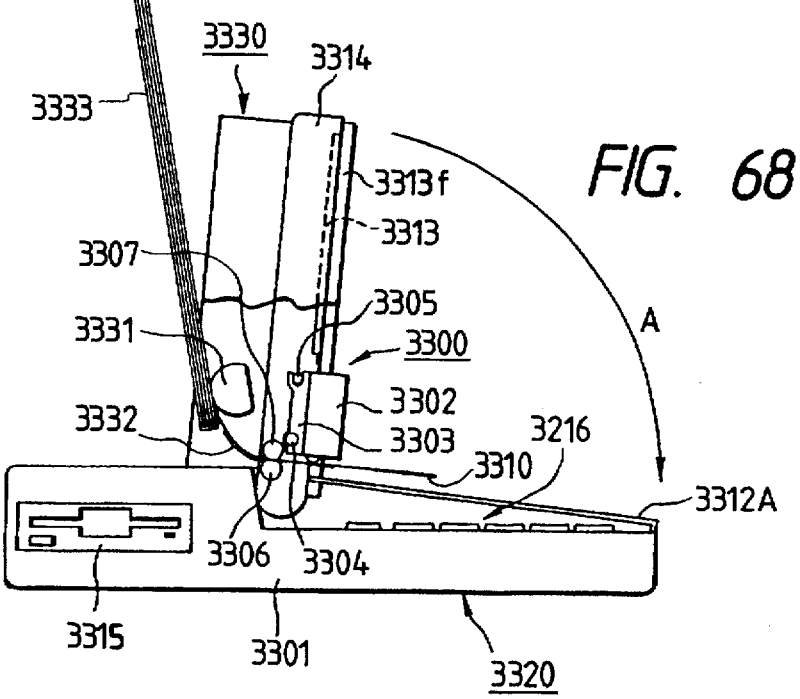
FIG. 68 is a side elevational view which illustrates the personal computer according to another embodiment of the present invention.

FIG. 68 is a side elevational partial cross sectional view which illustrates a modification to the embodiments shown in FIGS. 66A, 66B, 67A and 67B in which an automatic paper feeding apparatus is mounted on the reverse side of the display unit.

Referring to FIG. 68, a paper feeding device 3330 is fastened to a side of the cover 3314 opposing the side on which the display unit 3313 is disposed. A recording paper sheet 3310 stacked on a tray 3333 is, one by one, separated/fed by a paper sheet roller 3331. The recording paper sheet fed is guided by a guide 3332 so as to be introduced into a paper sheet feeding roller of a printer unit 3300. In a case where an automatic paper sheet feeding device 3330 is fastened to the cover 3314, the cover 3314 is held at a position while being inclined by a predetermined angle toward the operator as shown in FIG. 68. As a result, the paper sheet discharge passage for the recording paper sheet passing from the printer unit 3300 toward a paper sheet discharge tray 3312A is inclined downwards and thereby the recording paper sheet can be discharged smoothly.

The paper sheet discharge tray 3312A has a function which is the same as that of the cover 3212 shown in FIGS. 66A, 66B, 67A and 67B. That is, in a case where the printer unit 3300 is not used, the recording head cartridge 3302 is removed from the carrier 3303 and the printer unit 3300 and the entire surface of the display unit 3313 is covered with the paper sheet discharge tray 3312A. Since the paper sheet discharge tray 3312A is made of transparent material, it can be superposed on the display unit 3313 in the aforesaid structure in such a manner that the operator is not obstructed to see the display of the display unit 3313. When the printer unit 3300 is used, the paper sheet tray 3312A is opened as designated by an arrow A of the drawing to cause the entire surface of the keyboard 3216 to be covered with it. As a result, a problem which arises in that the discharged recording paper sheet 3310 is caught by the operation key and the discharge of the recording paper sheet cannot smoothly be performed can be prevented.

Figure 69A:
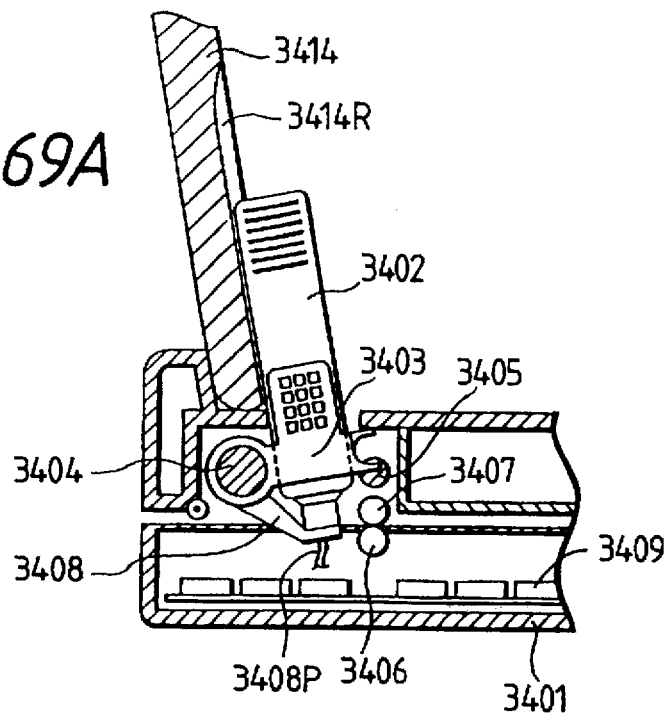
FIGS. 69A and 69B are partial cross sectional views which illustrate the printer unit of the personal computer according to another embodiment of the present invention.
Figure 69B:
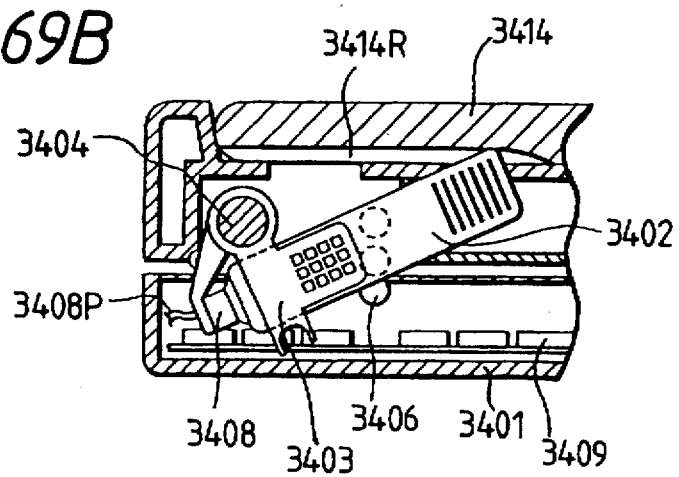
Figure 70:
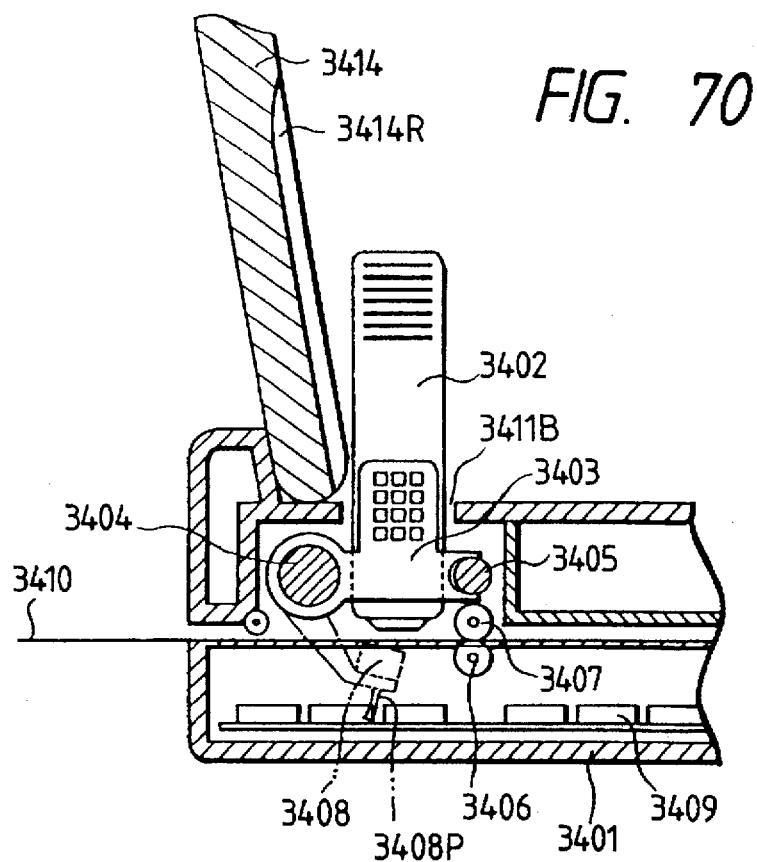
FIG. 70 is a cross sectional view which illustrates the same state of the printer unit according to the aforesaid embodiment as that shown in FIG. 64.
Figure 71:
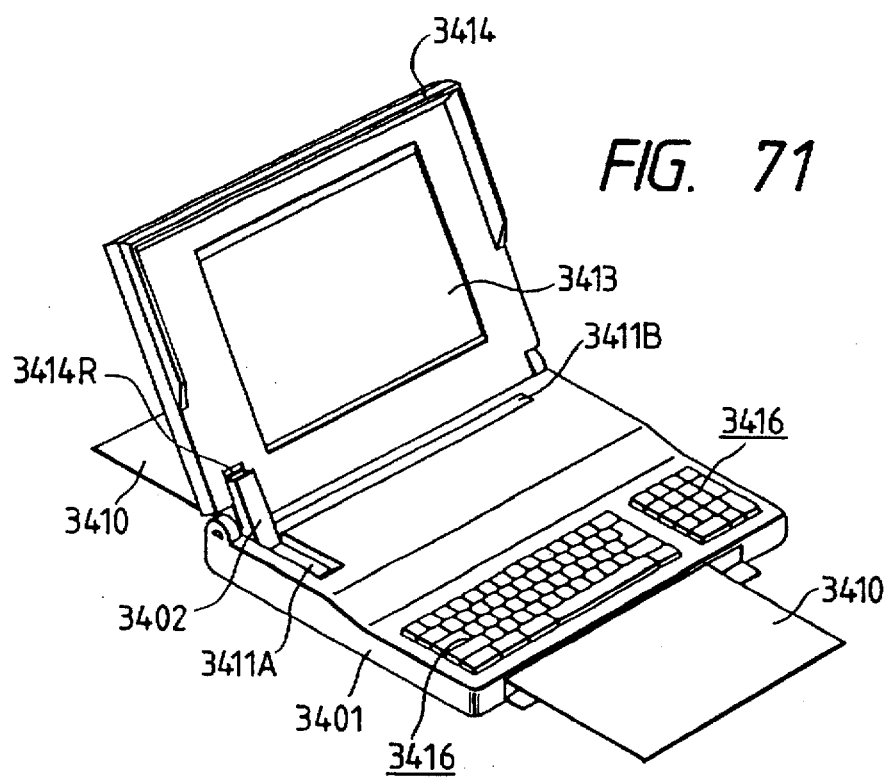
FIG. 71 is a perspective view which illustrates the personal computer according to the aforesaid embodiment of the present invention.

FIGS. 69 to 72 respectively illustrate states of the personal computer according to another embodiment of the present invention. FIGS. 69A and 69B respectively are cross sectional views which illustrates a state in which a cover serving as the case member is opened and a state in which the same is closed. FIG. 70 is a cross sectional view which illustrates a state in which the cover is opened and recording is being performed. FIG. 71 is a perspective view which illustrates the personal computer according to this embodiment. FIG. 72 illustrates the structure when the recording head cartridge is at the home position. This, embodiment will now be described with reference to FIGS. 69 to 72.

A recording head cartridge 3402 according to this embodiment is accommodated in an apparatus body 3401 as an alternative to the structure according to the aforesaid embodiments in which the same can be removed from the carrier 3403. The state in which the recording head cartridge 3402 has been accommodated is shown in FIG. 69B. FIG. 69B is a side elevational cross sectional view which illustrates the personal computer. In this state, the recording head cartridge 3402 is accommodated in the lower portion of an accommodating hole 3411A formed in the apparatus body 3401 at an end portion of the movable range, the accommodating hole 3411 being formed to align to the home position. This accommodating operation is performed in synchronization with the operation of closing the cover 3414. That is, when the recording head cartridge 3402 is moved to the home position which aligns to the accommodating hole 3411A as shown in FIG. 71, a cap holder 3408 is turned to be described later with reference to FIGS. 72A to 72C and a cap 3408 caps the surface of the recording head cartridge 3402 in which ink discharge ports are formed. In synchronization with the capping operation performed by the cap 3408C, a carrier 3403 and the recording head cartridge 3402 to be fastened to it are turned counterclockwise to be brought into contact with a recessed portion 3414R formed in the cover 3414. FIG. 69A illustrates this state. Simultaneously with this, a guide shaft 3405 is moved in a direction of its axis by a mechanism (omitted from illustration), so that the engagement with the carrier 3403 is released.

When the cover 3414 is folded in a state shown in FIG. 69A, the recording head cartridge 3402 is operated together with the cover 3414 to be accommodated in the apparatus body 3401 via the accommodating hole 3411A. Furthermore, the lead screw 3403 is turned by a predetermined quantity in synchronization with the aforesaid accommodating operation, the state shown in FIG. 69B is realized.

FIG. 69A illustrates the state where the recording head cartridge 3402 is at the home position and the printer unit is not used, that is, the recording operation is not performed by but another operation is performed. Since the recording head cartridge 3402 is placed in the recessed portion 3414R at this time, the operator is able to smoothly operate the keyboard or the like. Furthermore, an ink sucking operation by means of a sucking mechanism (omitted from illustration) can be performed by using a sucking tube 3408R provided for the cap holder 3408 at the home position.

FIG. 70 is a side elevational cross sectional view which illustrates a state where the apparatus performs the recording operation. When the recording operation is performed, the carrier 3403 and the recording head cartridge 3402 to be fastened to it reciprocate through a scanning hole 3411B shown in FIG. 71 so that characters or images or the like can be sequentially recorded to the recording paper sheet 3410.

Since the recording head cartridge is projected over the case member which serves as the outer shell of the apparatus body, a recording head cartridge which is not restricted by the size of the case member can be obtained similarly to the aforesaid embodiments and the quantity of ink to be reserved in the ink tank can be made proper which matches the life of the recording head or the like. In other words, the overall size and the thickness of the apparatus can be reduced regardless of the size of the recording head cartridge which has a relatively large portion in the apparatus.

In order to bring the state shown in FIG. 69A into the recording operation state shown in FIG. 70, a lead screw 3404 is rotated in a direction opposing its rotational direction in which it urges the aforesaid cap holder toward the recording head, so that urging of the cap holder 3408 is released and the carrier 3403 is turned clockwise. In synchronization with the turn of the carrier 3403, the guide shaft 3405 is moved in the axial direction by the aforesaid cam mechanism or the like which is operated by the rotation of the lead screw 3404 so as to be engaged to the carrier 3403.

Figure 72A:
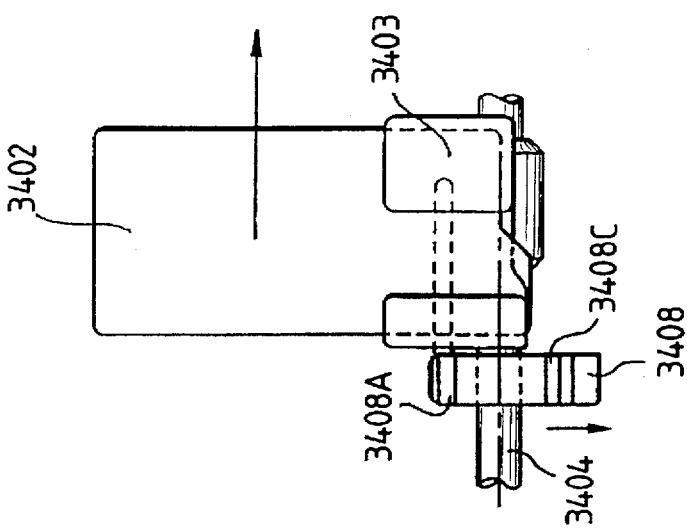
FIGS. 72A, 72B and 72C respectively illustrate states of a carrier and a recording head cartridge of the printer portion according to the aforesaid embodiment when viewed from three directions.
Figure 72B:
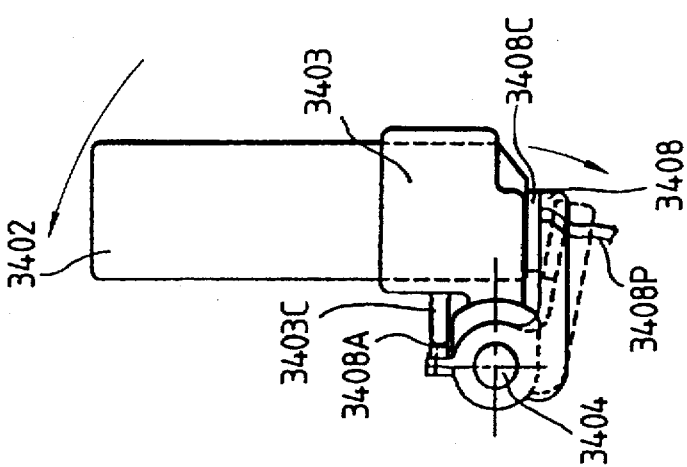
Figure 72C:
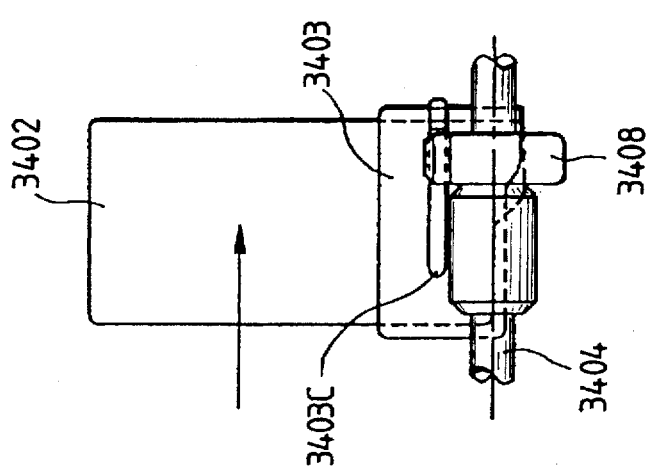

FIGS. 72A, 72B and 72C illustrate the capping operation and the turning operation of the recording head cartridge to be performed at the aforesaid home position. FIGS. 72A and 72B respectively are a rear view and a left side elevational view which illustrates the recording head cartridge at the home position. FIG. 72C illustrates the recording head cartridge which is moved from the home position to the recording position when viewed from the forward position of the apparatus.

As shown in FIGS. 72A and 72B, in synchronization with the movement of the carrier 3403 and the recording head cartridge to be fastened to the carrier 3403 to the home position, a cam member 3403C formed integrally with the carrier 3403 is engaged to an end portion 3408A of the cap holder 3408. The cap holder 3408 is rotatively journalled by an end portion of the lead screw 3404 and is urged clockwise by an urging mechanism (omitted from illustration) such as a spring when viewed in FIG. 72B. When the cam member 3403C and an end portion 3408A of the cap holder 3408 are engaged to each other, the end portion 3408A is depressed by the cam member 3403C by the movement of the carrier 3403 and the cap holder 3408 is gradually turned counterclockwise against the urging force when viewed in FIG. 72B. As a result, the cap 3408C disposed at another end portion of the cap holder caps the surface of the recording head cartridge 3402 in which the ink discharge ports are formed. The lead groove of the lead screw 3404 is terminated at a position which aligns to the capped position. When the lead screw 3404 is further rotated in this head the carrier 3403 an the recording head cartridge 3402 are turned counterclockwise when viewed in FIG. 72B and the state shown in FIG. 69A is realized.

When the recording head cartridge 3402 is moved from the home position to the recording position, the lead screw 3404 is rotated in a direction opposing the aforesaid direction, so that the carrier 3403 and the recording head cartridge 3402 are turned clockwise when viewed in FIG. 72B. Furthermore, the guide shaft 3405 is moved in a direction opposing the aforesaid direction so as to be engaged to the guide groove of the carrier 3403. When the lead screw 3404 is rotated in the same direction, the movement of the carrier 3403 is commenced and the engagement between the cam member 3403C and the end portion 3408A of the cap holder 3408 are gradually released. In synchronization with this, the cap holder 3408 releases the capping state so that the state shown in FIG. 72C or FIG. 70 is realized.

Figure 73:
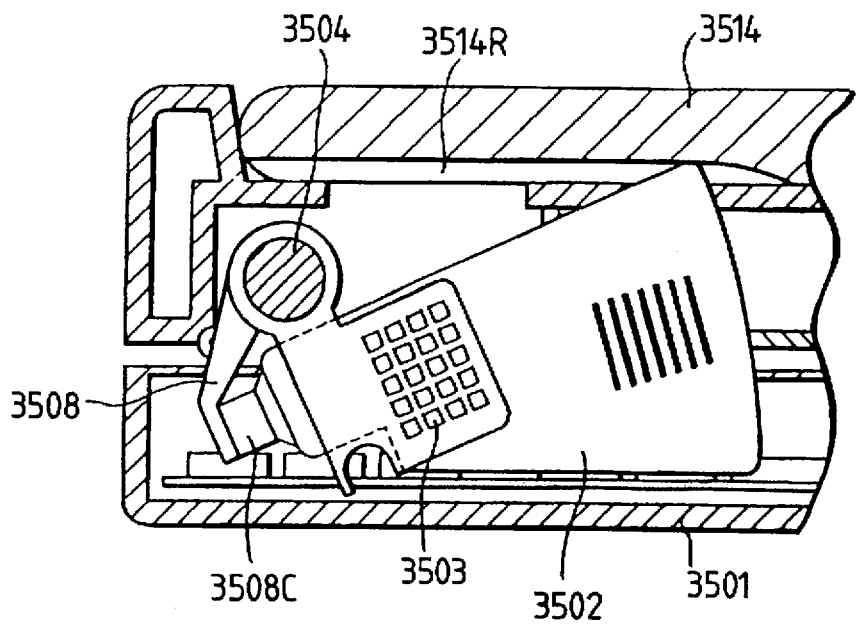
FIG. 73 is a partial cross sectional view which illustrates the printer portion of the personal computer according to other embodiment of the present invention.

FIG. 73 is a cross sectional view which illustrates a printer portion of the personal computer according to another embodiment of the present invention.

This embodiment is a modification of the aforesaid embodiment in which the recording head cartridge 3502 is formed into a wedge shape to suit the shape of the accommodating portion formed in the apparatus body 3501. As a result, the dead space in the body of the apparatus can be effectively utilized and the capacity of the ink tank of the recording head cartridge can be utilized satisfactorily.

Also the recording head cartridge according to the embodiment shown in FIG. 73 can, of course, be detachably fastened to the carrier and can be replaced by a novel one together with the recording head when the ink is exhausted.

Figure 74:
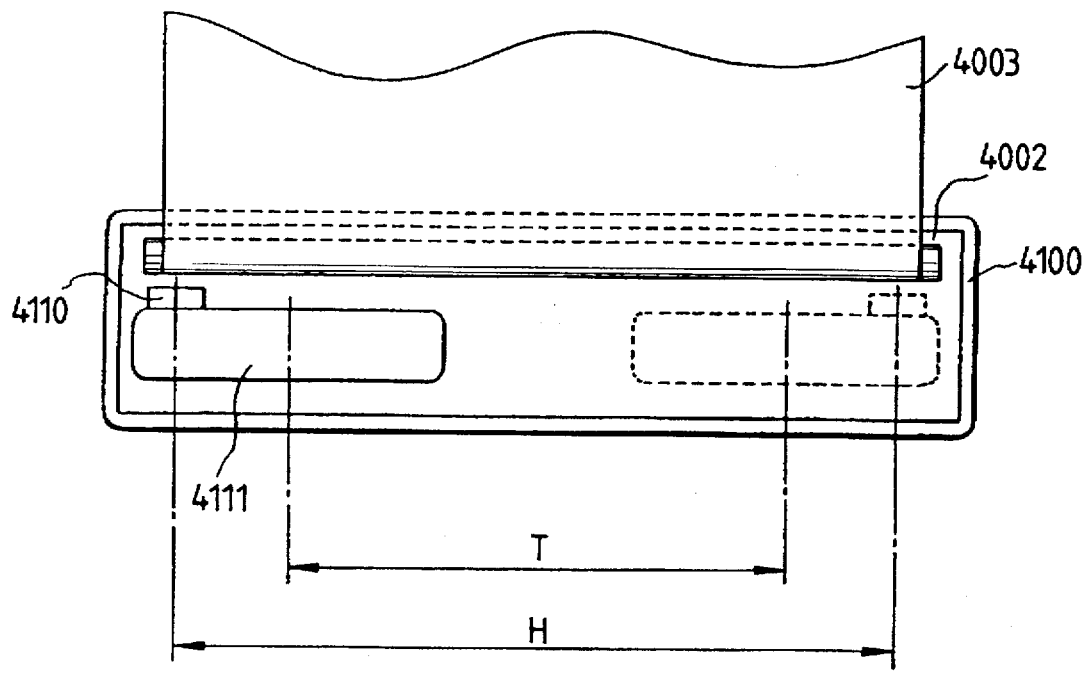
FIG. 74 is a schematic plan view which illustrates an ink jet recording apparatus according to another embodiment of the present invention.

Another embodiment of the present invention is, as shown in FIG. 74, arranged in such a manner that the ink tank is disposed by utilizing the space in which the carriage or the like performs scanning. Furthermore, the speed of the scanning operation performed by the recording head 4110 and the speed of the scanning operation performed by the ink tank are made to be different in such a manner that an ink tank 4111 scans range T (<H) during the operation of scanning range H performed by the recording head 4110. As a result, the size of the outer case 4100 is reduced and the ink tank 4111 is inhibited to project over the outer case 4100 while enlarging the ink tank. Specifically, the aforesaid structure can be realized by relatively movably fastening the two elements in a case where the recording head 4110 and the ink tank 4111 are integrally formed.

Figure 75:
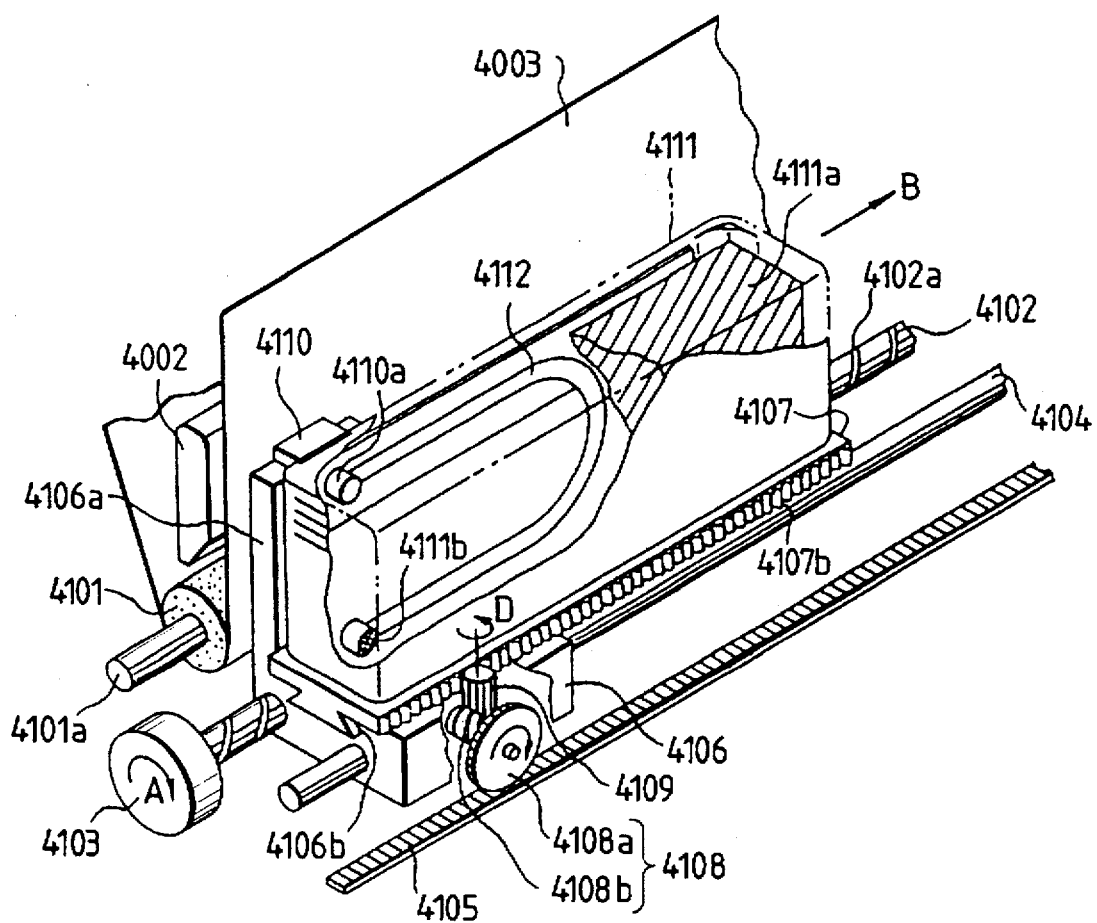
FIG. 75 is a schematic perspective view which illustrates an essential portion of the ink jet recording apparatus according to the aforesaid embodiment of the present invention.

FIG. 75 is a partial perspective view which illustrates the specific structure of an essential portion of an ink jet recording apparatus according to another embodiment of the present invention. Reference numeral 4101 represents a roller (hereinafter called a "paper sheet feeding roller") for feeding a recording medium (hereinafter called a "recording paper sheet" or a "paper sheet") such as paper or an OHP film or the like. Reference numeral 4101a represents a shaft of the paper sheet feeding roller 4101 which is rotated by a paper sheet feeding motor (omitted from illustration) and which holds the recording paper sheet 4003 in cooperation with a pinch roller (omitted from illustration) to feed the recording paper sheet 4003 in a sub-scanning direction perpendicular to the direction (main scanning direction) in which the scanning operation is performed by the recording head 4100. In this embodiment, the paper sheet feeding passage is formed into a substantially U-shape while making the paper sheet feeding roller 4101 to be the bent portion. It may be a flat or a flat-like paper sheet feeding passage in order to smoothly feed a thick paper sheet such as a post card and an envelope. That is, the present invention can be embodied regardless of the type of the paper sheet feeding passage.

Reference numeral 4102 represents a lead screw having a spiral groove 4102a formed on the outer surface thereof and can be rotated by a carriage motor 4103. Reference numeral 4104 represents a carriage guide shaft disposed in parallel to the lead screw 4102 and supported on a side plate of the outer case 4100 (see FIG. 74) together with the paper feeding roller shaft 4101a and the lead screw 4102. Reference numeral 4105 represents a rack disposed in the main scanning direction and fixed to the base of the outer case 4100.

Reference numeral 4106 represents a carriage slidably supported by the lead screw 4102 and the guide shaft 4104 and having a lead pin (omitted from illustration) which is engaged to a groove 4102a of the lead screw 4102. As a result, the carriage 4106 is reciprocated by the forward/reverse rotation of the lead screw 4102. The carriage 4106 has a length in the main scanning direction shorter than the length of an ink tank 4111 to be described later. The carriage 4106 integrally includes a fastening portion 4106a for securing a recording head 4110 to be described later and holding a contact for establishing an electric connection. The contact may be formed integrally with a flexible cable for transmitting a drive signal or the like, the illustration of it being omitted here.

Reference numeral 4107 represents a tank mount supported by a dovetail groove 4106b formed in the carriage 4106 in the sub-scanning direction and capable of relatively moving with respect to the carriage in the sub-scanning direction. Furthermore, a tank mount rack 4107b is integrally formed on the side surface of the tank mount 4107. Reference numeral 4107 represents a tank mount drive gear formed by a spur gear 4108a and a worm 4108b formed integrally with the shaft of the spur gear 4108a and rotatively supported by the carrier 4106. Reference numeral 4109 represents a rack gear engaged to a tank mount rack 4107b and the worm 4108b of the tank drive gear 4108 and drives the tank mount rack 4107b by the rotation of the worm 4108b to move the tank mount 4107.

Reference numeral 4110 represents a recording head of an ink jet head type comprising, in the main scanning direction, ink discharge ports, a liquid passage allowed to communicate with the discharge ports and electrothermal conversion member disposed in the liquid passage and generating thermal energy to be utilized to discharge ink. The recording head 4110 has a joint 4110a in the rear portion thereof. The recording head 4110 is detachably fastened to a fastening portion 4106a of the carriage 4106 and is electrically connected to a contact (omitted from illustration) when it has been fastened as described above.

The ink tank 4111 is detachably fastened to the tank mount 4107. The ink tank 4111 and the recording head 4110 are integrally formed and they are simultaneously attached/detached to and from the carriage 4106. The ink tank 4111 accommodates an ink absorber 411a which is made of porous absorbing material such as sponge impregnated with ink for use in the recording operation. The ink tank 4111 has, in the lower portion thereof, an absorber joint 4111b having a filter which is positioned in contact with the ink absorber 411a. Reference numeral 4112 represents a flexible ink tube which establishes a connection between the joint 4111a and the absorber joint 4111b, so that the ink communication is established between the ink tank 4111 and the recording head 4110.

As shown in FIG. 77, the ink tank 4111 includes a slide cover 4113 fastened to a joint portion 4110a of the recording head 4110. As a result, when the recording head 4110 and the ink tank 4110 are moved relatively to each other, the slide cover 4113 slides in the ink tank 4111 to cover an opening 4111c for moving the joint 4110a in order to improve the airtightness in the ink tank. The tube junction between the tube 4112 and the joint 4111b may be disposed, for example, along the outer wall of the ink tank. In this case, the slide cover 4113 and the opening 4111c may be omitted from the structure. However, it is preferable that it be passed in the ink tank as is employed in this embodiment in the viewpoint of preventing the evaporation of the ink solvent and invasion of air through the tube wall.

The operation of the structure thus constituted will now be described. When the lead screw 4102 is rotated in a direction designated by an arrow A by the carriage motor 4103, the carriage 4106 is moved in a direction designated by an arrow B. At this time, the head 4110 is moved together with the carriage 4106. On the other hand, the spur gear 4108a of the tank mount drive gear 4108 fastened to the carriage 4106 is engaged to the rack 4105 and thereby it is turned in a direction designated by an arrow C when the carriage 4106 is moved. As a result, also the worm 4108b integrally formed is rotated and the rack gear 4109 is rotated in a direction designated by an arrow D, so that the tank mount rack 4107b is moved in a direction opposing the direction of the movement of the carriage 4106 when viewed from the carriage 4106. The distance of the movement of the rack 4105 may be determined by setting the reduction ratio in such a manner that the ink tank 4111 is positioned at the left portion of FIG. 76 when the carriage 4106 is, as shown in FIG. 76, positioned at the right end portion of FIG. 76. For example, movement quantity H of the head 4110 and the movement quantity of the ink tank 4111 is set to 3:2 in this embodiment. In this case, the reduction ratio may be set to two-third.

Figure 76A:
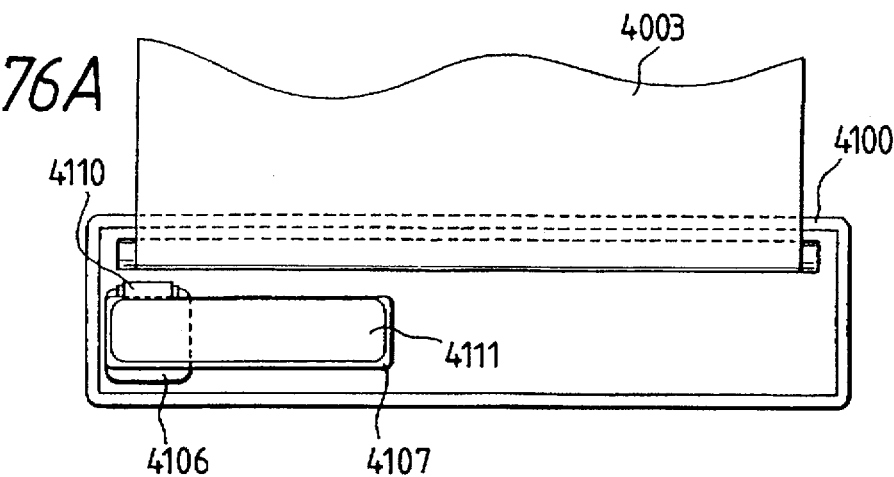
FIGS. 76A, 76B and 76C illustrate the operation of the ink jet recording apparatus according to the present invention.
Figure 76B:
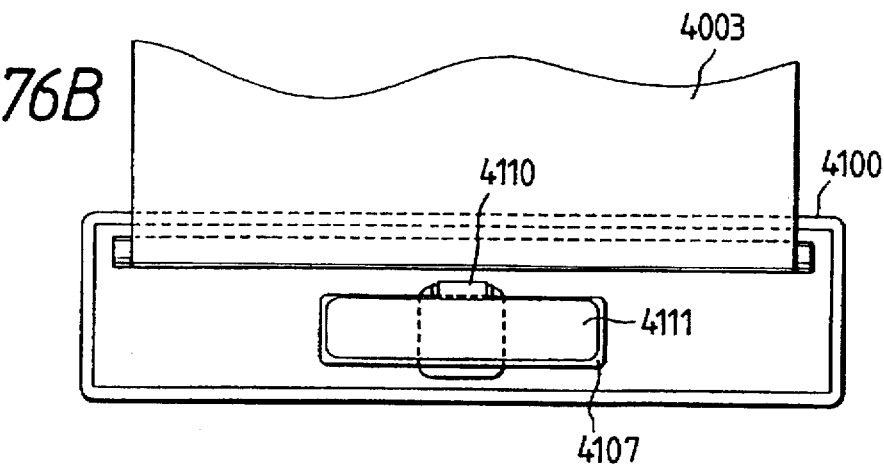
Figure 76C:
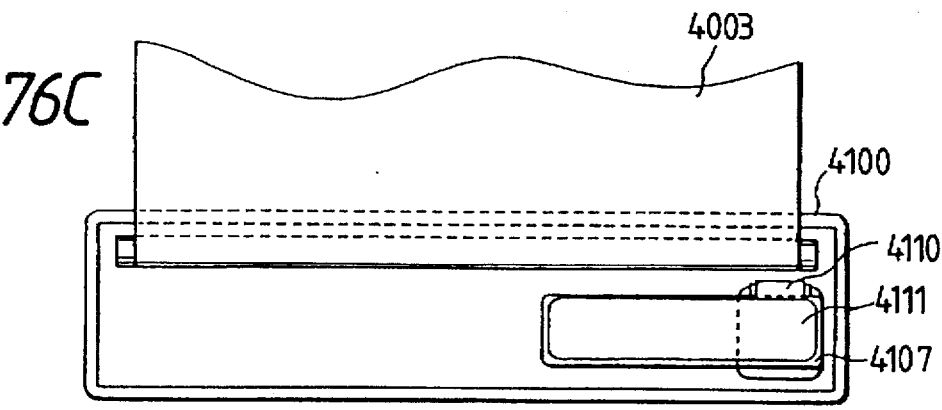

FIGS. 76A, 76B and 76C respectively illustrate states where the carriage is positioned at the left end position of the carriage scanning range, at an intermediate position of the same and at the right end position of the same.

Figure 77A:
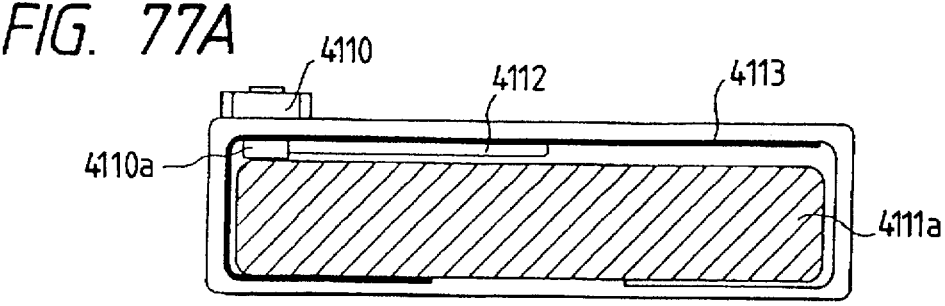
FIGS. 77A and 77B respectively are a schematic plan view and a schematic front elevational cross sectional view which respectively illustrate states of the recording head and the ink tank when the carriage is positioned at the left end portion of the scanning region.
Figure 77B:
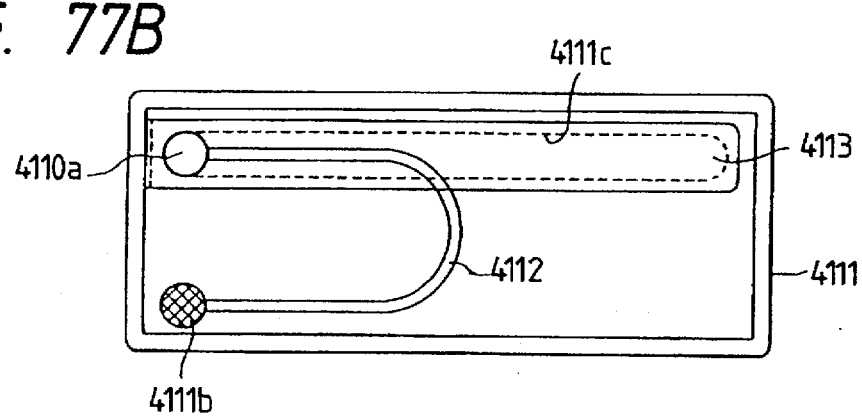
Figure 78A:
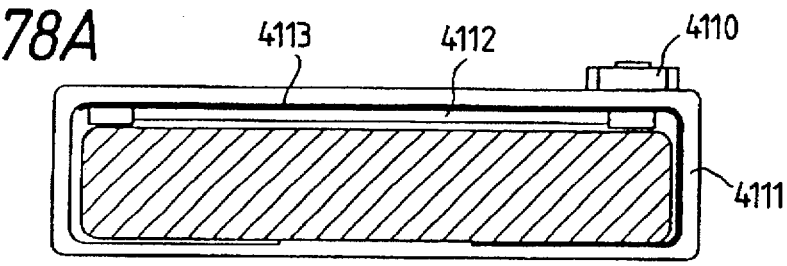
FIGS. 78A and 78B respectively are a schematic plan view and a schematic front elevational cross sectional view which respectively illustrate states of the recording head and the ink tank when the carriage is positioned at the right end portion of the scanning region.
Figure 78B:
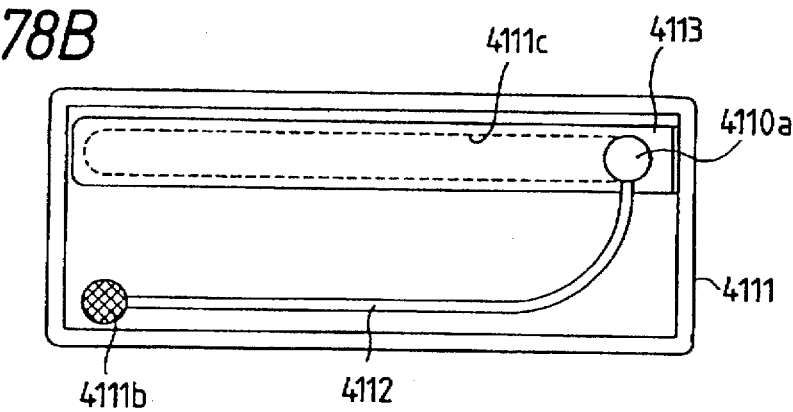

The head 4110 is moving in the ink tank 4111, so that the ink supply is continued by the tube 4112. Furthermore, the slide cover 4113 is slid in synchronization with the movement of the head 4110, so that the opening 4111c of the ink tank 4111 is always covered with the slide cover 4113. FIGS. 77A and 77B illustrate a state in which the carriage is positioned at the left end position of the scanning range and also the head 4110 is positioned at the left end position. On the other hand, FIGS. 78A and 78B illustrate a state in which the carriage 4106 is positioned at the right end position of the scanning range and also the head 4110 is positioned at the right end position. If the slide cover 4113 is a thin plate made of flexible material such as polyester, it can be smoothly moved in the ink tank as illustrated.

As described above, the embodiment is arranged in such a manner that the distance of movement or the scanning speed of the head and the distance of movement or the scanning speed of the ink tank are made different to shorten the distance of the movement of the ink tank or to lower the scanning speed. The necessity of enlarging the width of the recording apparatus can be eliminated and deterioration in the handling facility can be prevented although a cover or the like is provided on the outer case. Therefore, a recording apparatus having a large tank and capable of saving space and exhibiting excellent portability can be provided. In particular, the tube is included in the ink tank in this embodiment, so that evaporation of the ink via the tube can be effectively prevented. As a result, the exhaust of ink due to the evaporation of ink, mixture of bubbles and the undesirable increase of the viscosity of the ink can be prevented.

Furthermore, the distance of the movement of the ink tank is shortened, that is, the scanning speed of the ink tank can be lowered, so that the scanning speed of the ink tank having a weight which is the major portion of the total weight can be, for example, halved at the time of the sub-scanning operation and the load of the carriage motor can therefore be reduced. As a result, a small, light and low-priced motor can be used with small electric power consumption and advantages can be obtained in that the size of the recording apparatus can be reduced and excellent portability can be achieved. The absorber disposed in the ink tank effectively prevents undesirable mixture of bubbles into ink due to a fact that the ink tank is swung in the scanning operation. However, the ink tank is not swung excessively because the distance of the movement of the ink tank is shortened and the scanning speed is lowered in this embodiment. Therefore, the space required to place the absorber can be reduced and the quantity of ink which can be reserved can be improved and/or the cost of the ink tank can be reduced.

Although the recording head 4110 and the ink tank 4111 can be integrally attached/detached in the aforesaid embodiment, they may be individually attached/detached or either of them may be secured to the apparatus. In addition, the ink tank 4111 is made movable on the carriage 4106 so as to enable the recording head 4110 and the ink tank 4111 to move relatively. Another structure may be employed in which the scanning range realized by the carriage 4106 is set to T shown in FIG. 74, the ink tank 4111 is secured to the carriage 4106 and the recording head 4110 is able to move with respect to the carriage 4106 so as to obtain the aforesaid scanning range H. Another structure may be employed in which the recording head 4110 and the ink tank 4111 are respectively mounted on individual carriages so as to be moved in the aforesaid ranges H and T.

In this embodiment, the ink tank is gradually displaced during the scanning process. However, if there is no problem of shock or the like, a structure may be employed in which the ink tank is urged one way by means of, for example, a spring to usually obtain a state shown in FIG. 76A and it comes in contact with the inner wall of the outer case or a projecting member formed on the same when it has been moved to another end portion of the scanning range to obtain the state shown in FIG. 76C. This may be similarly embodied in the following embodiment as a modification.

Figure 79:
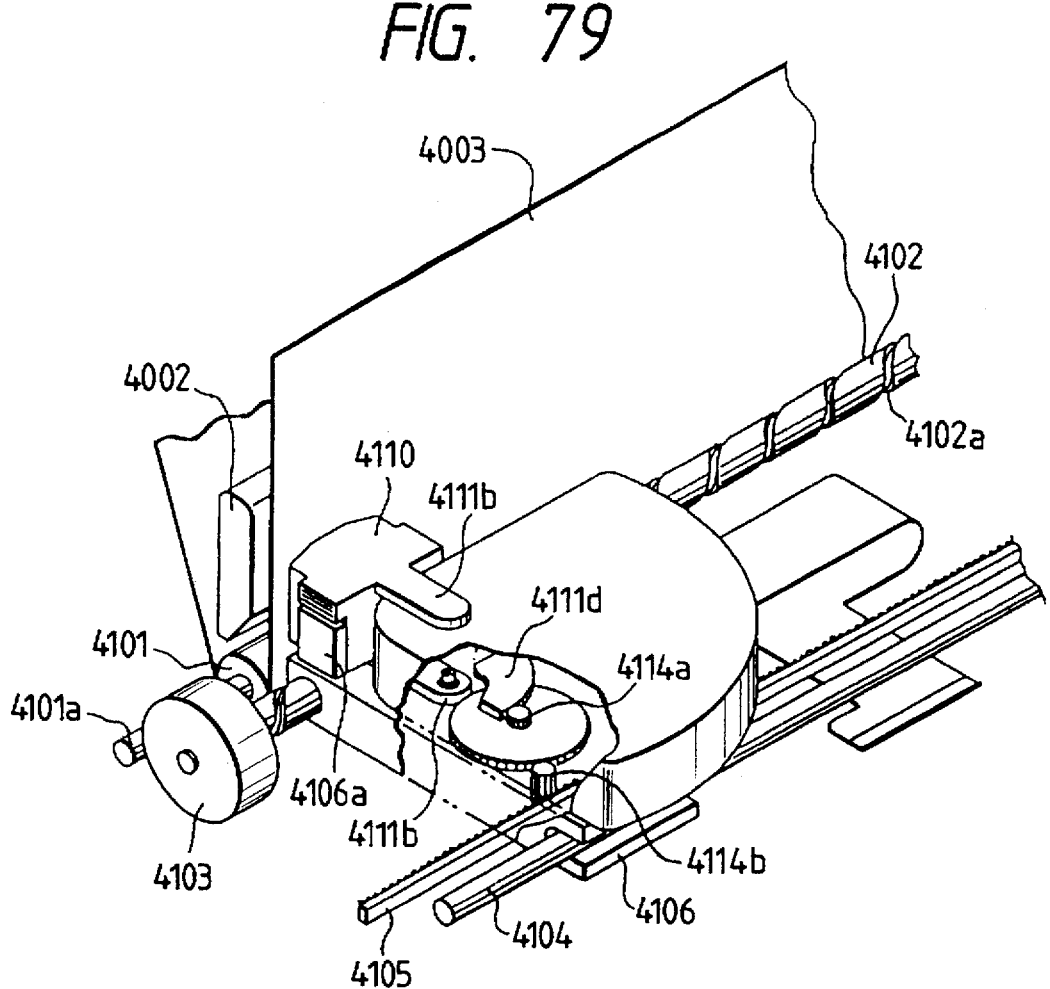
FIG. 79 is a schematic perspective view which illustrates a structural example of an essential portion of the ink jet recording apparatus according to another embodiment of the present invention.
Figure 80:
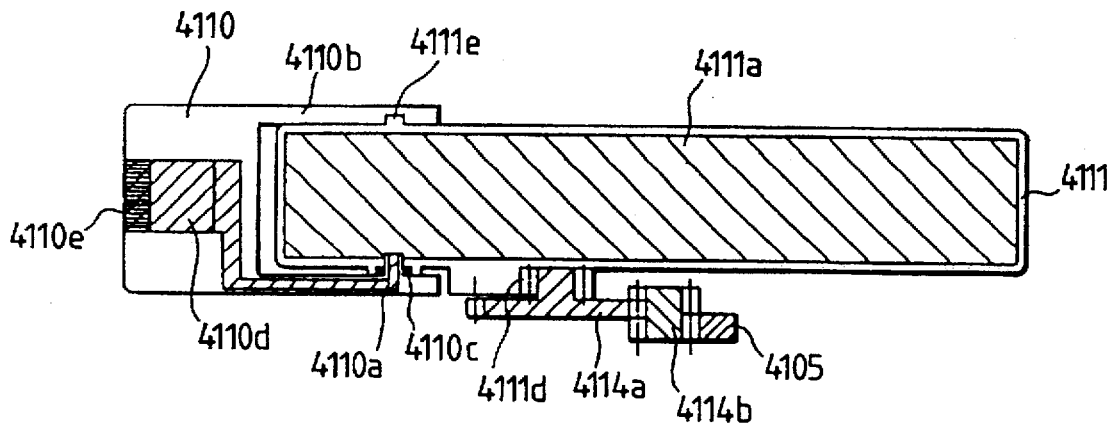
FIG. 80 is a schematic side cross sectional view which illustrates the recording head and the ink tank portion.

FIG. 79 is a partial perspective view which illustrates a recording apparatus according to another embodiment of the present invention. FIG. 80 is a cross sectional view which illustrates a head portion. Referring to FIGS. 79 and 80, elements having the same functions as those according to the aforesaid embodiments are given the same reference numerals.

The head 4110 according to this embodiment includes a pair of arm portions 4110b having, at the rear end portions thereof, portions serving as supporting points of the rotation. The lower arm 4110b has a joint portion 4110a to form an ink liquid passage through which ink is introduced to a nozzle discharge portion 4110e. Furthermore, an "0" ring 4110c is fastened to the joint portion 4110a to prevent leakage of ink from a joint portion 4110a with an ink tank to be described later. The ink tank 4111 has, on the lower surface thereof, a sector gear 4111d formed integrally. The ink tank 4111 according to this embodiment is formed into a substantially sector shape and has a rotational center shaft 4111e also serving as a joint of the ink passage at the pivot of the sector. The carriage 4106 has, on the surface thereof, a gear train including a gear 4114a engaged to the sector gear 4111d and a gear 4114b engaged to a rack 4105 secured to the base. When the carriage 4106 is moved, the gear train 4114 engaged to the rack 4105 is rotated and the ink tank 4111 is therefore turned.

In the aforesaid structure, the gear reduction ratio may be set so as to cause the ink tank 4111 to be positioned on the left to the head 4110 when the carriage 4106 is, as shown in FIG. 81, positioned at the right end of the scanning range. In this embodiment, since the joint portion receives the rotation, the ink passage can easily be formed.

Figure 81A:
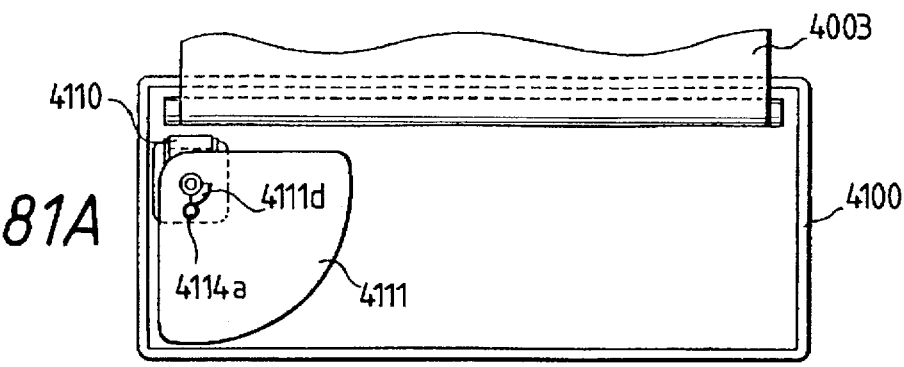
FIGS. 81A, 81B and 81C illustrate the operation of another embodiment of the present invention.
Figure 81B:
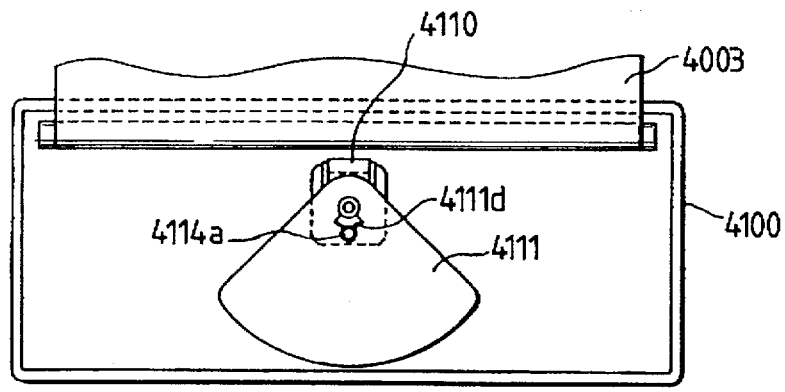
Figure 81C:
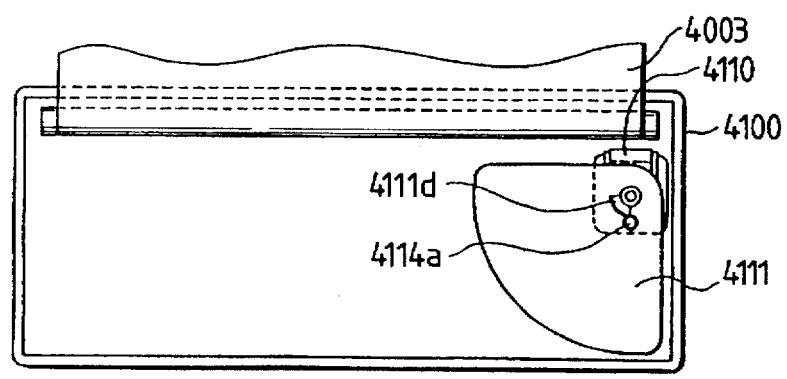

FIGS. 81A, 81B and 81C respectively illustrate a state in which the carriage 4106 is positioned at the left end of the scanning range, a state in which the same is positioned at the center and a state in which the same is positioned at the right end. The distance of the movement of the ink tank can be shortened or the scanning speed of the same can be lowered (it is apparent from paying attention to the center of gravity), so that a similar effect to that obtainable from the aforesaid embodiment can be obtained. Furthermore, the ink tank and the recording head can be allowed to communicate with each other by only a rotary joint, so that the supply system can be simplified.

Figure 82A:
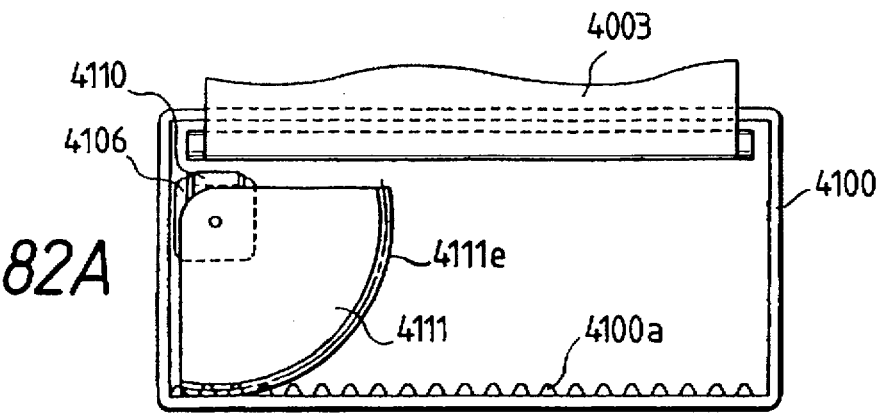
FIGS. 82A, 82B and 82C are schematic plan views which illustrate the structure and the operation of another embodiment of the present invention.
Figure 82B:
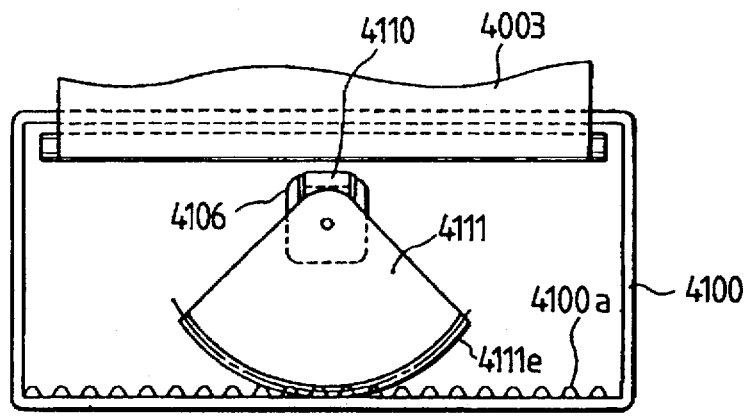
Figure 82C:
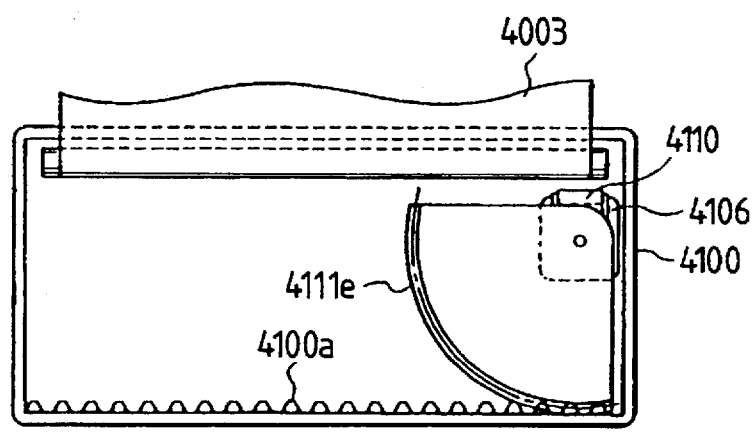

FIGS. 82A to 82C illustrate another embodiment of the present invention.

In this embodiment, a gear 4111e is formed on the outer surface of the ink tank 4111 according to the aforesaid embodiment and a portion of the case 4100 is formed into a latch 4100a. Since a gear train of the type according to the aforesaid embodiment for turning the ink tank 4111 can be eliminated from the structure, the structure can further be simplified. This embodiment may be modified as an alternative to causing the ink tank to be turned by the engagement of the gear in such a manner that the outer surface of the tank is turned while being brought into contact with the inner surface of the case. In this case, a rubber elastic member may be applied to either of the elements while taking the roughness and the slide of the inner surface of the outer surface of the tank into consideration.

Figure 83:
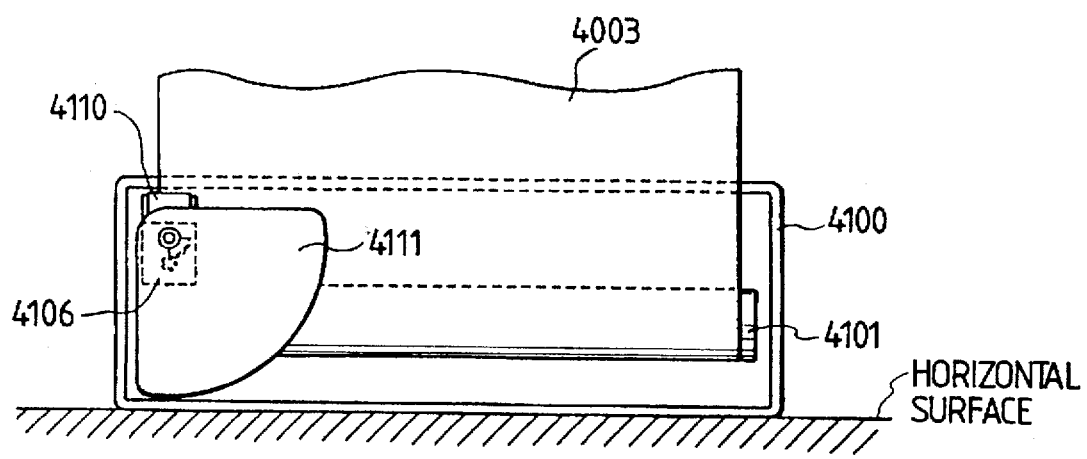
FIG. 83 is a schematic front elevational view which illustrates the structure of another embodiment of the present invention.

FIG. 83 illustrates another embodiment of the present invention.

In this embodiment, the rotational shaft of the ink tank 4111 according to the aforesaid embodiment is made horizontal to reduce the depth and the widthwise length of the apparatus.

As described above, the size of the ink jet recording apparatus according to the aforesaid embodiments can be reduced and it may be disposed at a proper position, for example, as shown in FIGS. 17 and 18. Therefore, an effect can be obtained in that the size of a small size apparatus called a "laptop type apparatus" integrally including a keyboard, a display unit, and a printer unit and the like can further be reduced.

According to the present invention, an excellent effect can be obtained in a recording head and a recording apparatus of a type in which ink is discharged by utilizing thermal energy among the ink jet recording apparatuses.

It is preferable to employ the typical structure and the principle of structures disclosed in, for example, U.S. Pat. No. 4,723,129 and U.S. Pat. No. 4,740,796. This system can be adopted in a so-called "On-Demand" type and "Continuous" type structures. In this system, an electrothermal conversion member disposed to align to a sheet or a liquid passage in which liquid (ink) is held is supplied with at least one drive signal which corresponds to information to be recorded and which enables the temperature of the electrothermal conversion member to be raised higher than a nucleate boiling point, so that thermal energy is generated in the electrothermal conversion member and film boiling is caused to take place on the surface of the recording head which is heated. As a result, bubbles can be respectively formed in liquid (ink) in response to the drive signals. Due to the enlargement and contraction of the bubble, liquid (ink) is discharged through the discharge port, so that at least one droplet is formed. In a case where the aforesaid drive signal is made to be a pulse signal, a further satisfactory effect can be obtained in that the bubble can immediately and properly be enlarged/contracted and liquid (ink) can be discharged while exhibiting excellent responsibility. It is preferable to employ a drive signal of the pulse signal type disclosed in U.S. Pat. No. 4,463,359 and U.S. Pat. No. 4,345,262. Furthermore, in a case where conditions for determining the temperature rise ratio on the aforesaid heated surface disclosed in U.S. Pat. No. 4,313,124 are adopted, a further excellent recording operation can be performed.

In addition to the structure (a linear liquid passage or a perpendicular liquid passage) of the recording head formed by combining the discharge ports, the liquid passage and the electrothermal conversion member as disclosed in the aforesaid specifications, a structure disclosed in U.S. Pat. No. 4,558,333 and U.S. Pat. No. 4,459,600 in which the heated portion is disposed in a bent portion is included in the scope of the present invention. Furthermore, the present invention can effectively be embodied in a structure in which a common slit is made to be the discharge portion of a plurality of electrothermal conversion members and which is disclosed in Japanese Patent Laid-Open No. 59-123670 and a structure in which an opening for absorbing thermal energy pressure waves is formed to align to the discharge port and which is disclosed in Japanese Patent Laid-Open No. 59-138461.

A full line type recording head having a length which corresponds to the width of the maximum recording medium which can be recorded by the recording apparatus may be a structure capable of realizing the aforesaid length and formed by combining a plurality of recording heads as disclosed in the aforesaid specifications or a structure formed by an integrally formed recording head. The present invention will enable the aforesaid effects to be exhibited further effectively.

In addition, the present invention can also be effectively adapted to a structure having an interchangeable chip type recording head which can be electrically connected to the body of the apparatus or to which ink can be supplied from the body of the apparatus when it is mounted on the body of the apparatus or a cartridge type recording head integrally formed to the recording head.

It is preferable to additionally provide the recording head recovery means and an auxiliary means of the recording apparatus according to the present invention because the effect of the present invention can further be stabled. Specifically, an effect can be obtained in that the recording operation can be stably performed by providing a recording head capping means, a cleaning means, a pressurizing or sucking means, an electrothermal conversion member or another heating device or an auxiliary heating means formed by combining the aforesaid elements and by performing a previous discharge mode in which a discharge is performed individually from the recording operation.

Furthermore, the recording mode of the recording apparatus may be a recording mode for recording only main color such as black and a structure may be that formed by integrally forming recording heads or a structure formed by combining a plurality of recording heads. The present invention can significantly effectively be adapted to an apparatus having a recording head of a plurality of colors or at least one full color head arranged to mix colors.

Although the aforesaid embodiments use liquid ink, ink which is solid at room temperature or ink which is softened at room temperature can be used. In the aforesaid ink jet apparatus, the temperature of ink is usually controlled in a range from 30° C. to 70° C. to make the viscosity of ink to be in a stable discharge range and thereby ink which is liquefied in response to a record signal supplied may be used. Furthermore, ink the temperature rise of which is prevented by positively using the temperature rise due to the thermal energy as energy of state change from the solid state to the liquid state of ink or ink which is solidified when it is allowed to stand in order to prevent the evaporation of ink may be used. That is, ink which is liquefied by thermal energy such as ink liquefied by thermal energy supplied in response to the record signal and discharged as ink droplets or ink which is solidified when it reaches the recording medium can be employed in the present invention. In this case, ink may be, in the form of liquid or solid, held by a recess of a porous sheet or a through hole as disclosed in Japanese Patent Laid-Open No. 54-56847 or Japanese Patent Laid-Open No. 60-71260 and disposed to confront the electrothermal conversion member. It is most preferable that ink be discharged by the aforesaid film boiling method.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A recording apparatus for performing recording on a recording medium, said apparatus comprising:

a casing;

a key input portion disposed on an upper surface of said casing for performing key inputting;

a recording portion disposed in said casing located at a rear of said key input portion;

a moving mechanism for moving said recording portion between a first position and a second position located lower than the first position;

a first recording medium convey path for conveying the recording medium from an area between said key input portion and said recording portion into said casing, and discharging via said recording portion at the first position to externally of said casing from a rear of said recording portion; and a second recording medium convey path for conveying the recording medium from a front of said key input portion into said casing, passing through said casing below said key input portion, and discharging to externally of said casing from a rear of said recording portion, said second recording medium convey path being provided below said first recording medium convey path.

2. A recording apparatus according to claim 1, wherein said first recording medium convey path is used when performing recording on a thick, short recording medium, such as an envelope or a post card.

3. A recording apparatus according to claim 1, wherein said second recording medium convey path is used when performing recording on a thin, long recording medium.

4. A recording apparatus according to claim 1, wherein said recording portion is openable to expose the recording medium convey paths therein by separating an upper member forming a part of the recording medium convey paths away from a lower member forming the recording member convey paths.

5. A recording apparatus according to claim 4, wherein the upper member of said recording portion is separable away from the lower member of said recording portion, when said recording member is located in the first position.

6. A recording apparatus according to claim 1, wherein said recording portion performs the recording on the recording medium by utilizing an ink jet recording head discharging an ink from ink discharge openings.

7. A recording apparatus according to claim 1, wherein said recording portion performs recording on the recording medium by utilizing an ink jet recording head discharging an ink from ink discharge openings by thermal energy generated by an electrothermal converting element.

8. A recording apparatus for performing recording on a recording medium, said apparatus comprising:

a casing;

a key input portion disposed on an upper surface of said casing for performing a key inputting;

a recording portion disposed in said casing at a rear of said key input portion;

a first recording medium supply port provided on said casing located between said key input portion and said recording portion;

a first recording medium discharge port provided at a rear of said casing;

a second recording medium supply port provided on said casing located at a front of said key input portion;

a second recording medium discharge port provided at a rear of said casing, and being located below said first recording medium discharge port;

a moving mechanism for moving said recording portion between a first position and a second position located lower than the first position;

a first recording medium convey path for conveying the recording medium from said first recording medium supply port, via said recording portion in the first position, to said first recording medium discharge port; and a second recording medium convey path for conveying the recording medium from said second recording medium supply port, via an internal portion of said casing located below said key input portion and said recording portion in the second position to said recording medium discharge port, said second recording medium convey path being provided below said first recording medium convey path.

9. A recording apparatus according to claim 8, wherein said first recording medium convey path is used when performing recording on a thick, short recording medium, such as an envelope or a post card.

10. A recording apparatus according to claim 8, wherein said second recording medium convey path is used when performing recording on a thin, long recording medium.

11. A recording apparatus according to claim 8, wherein said recording portion is openable to expose the recording medium convey paths therein by separating an upper member forming a part of the recording medium convey paths away from a lower member forming the recording member convey paths.

12. A recording apparatus according to claim 1, wherein the upper member of said recording portion is separable away from the lower member of said recording portion, when said recording portion is located in the first position.

13. A recording apparatus according to claim 8, wherein said recording portion performs recording on the recording medium by utilizing an ink jet recording head discharging an ink from ink discharge openings.

14. A recording apparatus according to claim 8, wherein said recording portion performs recording on the recording medium by utilizing an ink jet recording head discharging an ink from ink discharge openings by thermal energy generated by an electrothermal converting element.

15. A recording apparatus comprising:
a casing;
a key input portion disposed on an upper surface of said casing for performing a key inputting;
a recording portion disposed in said casing at a rear of said key input portion;
a first recording medium supply port provided on said casing located between said key input portion and said recording portion;
a first recording medium discharge port provided at a rear of said casing;
a second recording medium supply port provided on said casing located at a front of said key input portion;
a second recording medium discharge port provided at a rear of said casing, and being located below said first recording medium discharge portion;
a moving mechanism for moving said recording portion between a first position and a second position located lower than the first position;
a first recording medium convey path for conveying the recording medium from said first recording medium supply port, via said recording portion located in the first position, to said first recording medium discharge port, said first recording medium convey path being openable to expose a recording area thereof when said recording portion is located at the first position by separating an upper member of said recording member away from a lower member thereof; and
a second recording medium convey path for conveying the recording medium from said second recording medium supply port, via said recording portion in the second position to said second recording medium discharge port, said second recording medium convey path being provided below said first recording medium convey path.

16. A recording apparatus according to claim 15, wherein said first recording medium convey path is used when performing recording on a thick, short recording medium, such as an envelope or a post card.

17. A recording apparatus according to claim 15, wherein said second recording medium convey path is used when performing recording on a thin, long recording medium.

18. A recording apparatus according to claim 15, wherein said recording portion performs recording on the recording medium by utilizing an ink jet recording head discharging an ink from ink discharge openings.

19. A recording apparatus according to claim 15, wherein said recording portion performs recording on the recording medium by utilizing an ink jet recording head discharging an ink from ink discharge openings by thermal energy generated by an electrothermal converting element.

20. A recording apparatus for performing recording on a recording medium, comprising:
a recording head mounting portion for mounting thereon a recording head for performing the recording on the recording medium;
a first recording area where the recording head performs the recording on the recording medium;
a second recording area remote from said first recording area where the recording head performs the recording on the recording medium;
a shift mechanism for shifting said recording head mounting portion between a first position where the recording is performable at said first recording area and a second position where the recording is performable at said second recording area; and
a recording medium convey mechanism for guiding the recording medium from a supply port to a discharge port via only one of said first and second recording areas, said recording medium convey mechanism including a first conveying path for conveying the recording medium via said first recording area and a second conveying path for conveying the recording medium via said second recording area.

21. A recording apparatus according to claim 20, wherein said first conveying path is used for performing the recording on a thick and short recording medium including an envelope, postcard and the like.

22. A recording apparatus according to claim 20, wherein said second conveying path is used for performing the recording on a thin and long recording medium.

23. A recording apparatus according to claim 20, wherein said convey mechanism comprises an upper member forming a part of said recording medium conveying paths and a lower member forming a part of said recording medium conveying paths, wherein an upper space of said recording medium conveying paths through said first and second recording areas is openable, by separating said upper member relative to said lower member.

24. A recording apparatus according to claim 23, wherein when said recording head mounting portion is positioned in the first position, the upper member is separable relative to the lower member.

25. A recording apparatus according to claim 20, wherein the recording head comprises an ink jet recording head discharging ink from an ink discharge opening.

26. A recording apparatus according to claim 20, wherein said recording head comprises an electro-thermal converting member generating thermal energy for discharging ink from an ink discharge opening.

27. A recording apparatus for recording on a recording medium, comprising:
a casing;
a key input portion disposed on an upper surface of said casing for effecting a key input operation;
a recording portion disposed in said casing rearwardly of said key input portion for performing the recording on the recording medium;
a recording medium inserting portion provided on said casing in front of said key input portion for guiding the recording medium into said casing;
a recording medium discharging portion provided rearwardly of said recording portion for discharging the recording medium out of said casing; and
a recording medium conveying path for conveying the recording medium from said recording medium inserting portion, passing through said casing below said key input portion and through said recording portion, to said recording medium discharging portion.

28. A recording apparatus according to claim 27, wherein said recording portion performs the recording on the recording medium by utilizing an ink jet recording head discharging ink from an ink discharge opening.

29. A recording apparatus according to claim 27, wherein said recording portion comprises an electro-thermal converting member generating thermal energy for discharging ink from an ink discharge opening of an ink jet recording head.

* * * * *

UNITED STATES PATENT AND TRADEMARK OFFICE
CERTIFICATE OF CORRECTION

PATENT NO. : 5,731,829

DATED : March 24, 1998

INVENTOR(S) : Takashi SAITO, et al.

It is certified that error appears in the above-identified patent and that said Letters Patent is hereby corrected as shown below:

ON THE COVER PAGE

AT [30] Foreign Application Priority Data:

Line 5, "Mar. 11, 1991 [JP] Japan ........ 3-123068" should read --Apr. 26, 1991 [JP] Japan ........ 3-123068--.

COLUMN 1:

Line 35, "A many portion" should read --Many--.
Line 39, "a" (both occurrences) should be deleted.

COLUMN 2:

Line 3, "to take place" should read --from taking place--.
Line 57, "capable-of" should read --capable of--.

COLUMN 3:

Line 6, "and" should be deleted.

UNITED STATES PATENT AND TRADEMARK OFFICE
CERTIFICATE OF CORRECTION

PATENT NO. : 5,731,829

DATED : March 24, 1998

INVENTOR(S) : Takashi SAITO, et al.

It is certified that error appears in the above-identified patent and that said Letters Patent is hereby corrected as shown below:

COLUMN 4:

Line 15, "an" should read --in an--.

COLUMN 5:

Line 31, "improved in" should read --improved. In--.
    Line 34, "an" should read --in an--.
    Line 62, "or" should be deleted.
    Line 63, "storing" should be deleted and "ink" should read --or storing ink--.

COLUMN 6:

Line 61, "be" should be deleted.

COLUMN 8:

Line 63, "according the" should read --according to the--.

COLUMN 9:

Line 1, "according the" should read --according to the--.

UNITED STATES PATENT AND TRADEMARK OFFICE
CERTIFICATE OF CORRECTION

PATENT NO.  :  5,731,829

DATED       :  March 24, 1998

INVENTOR(S) :  Takashi SAITO, et al.

It is certified that error appears in the above-identified patent and that said Letters Patent is hereby corrected as shown below:

COLUMN 10:

Line 63, "easily been" should read --easily be--.

COLUMN 11:

Line 26, "reliably" should read --reliably be--.
    Line 60, "As" should begin a new paragraph.

COLUMN 12:

Line 15, "W-shape like" should read --W-shaped-- and "sectional shape" should read --section--.

COLUMN 13:

Line 9, "and" should read --and,--.
    Line 10, "of it" should read --of it,--.
    Line 12, "immediate" should read --immediately--.
    Line 27, "able" should read --able to--.

UNITED STATES PATENT AND TRADEMARK OFFICE
CERTIFICATE OF CORRECTION

PATENT NO.  : 5,731,829

DATED       : March 24, 1998

INVENTOR(S) : Takashi SAITO, et al.

It is certified that error appears in the above-identified patent and that said Letters Patent is hereby corrected as shown below:

COLUMN 15:

Line 20, "fed" should read --performed--.
    Line 41, "the paper discharge port 201b" should be deleted.
    Line 49, "of the printer unit 72" should be deleted.

COLUMN 16:

Line 3, "locked" should read --is locked--.
    Line 18, "vertical" should read --vertically--.
    Line 40, "as well as" should read --also--.

COLUMN 20:

Line 10, "as well as" should read --also--.
    Line 41, "to be" should read --be--.
    Line 65, "411 is" should read --411 and is--

COLUMN 21:

Line 19, "405" (first occurrence) should read --405A--.

UNITED STATES PATENT AND TRADEMARK OFFICE
CERTIFICATE OF CORRECTION

PATENT NO. : 5,731,829

DATED : March 24, 1998

INVENTOR(S) : Takashi SAITO, et al.

It is certified that error appears in the above-identified patent and that said Letters Patent is hereby corrected as shown below:

COLUMN 23:

Line 45, "as well as" should read --also--.
    Line 54, "operation" should read --operation,--.
    Line 55, ",medium" (second occurrence) should be deleted.

COLUMN 24:

Line 38, "as well as" should read --also--.

COLUMN 25:

Line 61, "similarly" should read --similar--.

COLUMN 26:

Line 34, "to be" should read --be--.
    Line 42, "2 to" should read --2--.

COLUMN 28:

Line 41, --and-- should be inserted after "closed".

UNITED STATES PATENT AND TRADEMARK OFFICE
CERTIFICATE OF CORRECTION

PATENT NO. : 5,731,829

DATED : March 24, 1998

INVENTOR(S) : Takashi SAITO, et al.

It is certified that error appears in the above-identified patent and that said Letters Patent is hereby corrected as shown below:

COLUMN 29:

Line 21, "114" should read --1114--.

COLUMN 31:

Line 61, "that a" should --that an--.

COLUMN 33:

Line 41, "The," should --The--.

COLUMN 35:

Line 23, "conveying(sub-scanning)" should read --conveying (sub-scanning)--.

COLUMN 40:

Line 27, "as an" should read --as a--.

UNITED STATES PATENT AND TRADEMARK OFFICE
CERTIFICATE OF CORRECTION

PATENT NO.   :   5,731,829
DATED        :   March 24, 1998
INVENTOR(S)  :   Takashi SAITO, et al.

It is certified that error appears in the above-identified patent and that said Letters Patent is hereby corrected as shown below:

COLUMN 41:

Line 48, "positions" should read --position is--.
    Line 56, "forms" should read --form--.
    Line 64, "its" should be deleted.

COLUMN 42:

Line 38, "as" should be deleted.
    Line 39, "well as" should read --also--.

COLUMN 43:

Line 49, "illustrates" should read --illustrate--.

COLUMN 44:

Line 18, "as paper" should read --as a paper--.

UNITED STATES PATENT AND TRADEMARK OFFICE
CERTIFICATE OF CORRECTION

PATENT NO. : 5,731,829

DATED : March 24, 1998

INVENTOR(S) : Takashi SAITO, et al.

It is certified that error appears in the above-identified patent and that said Letters Patent is hereby corrected as shown below:

COLUMN 45:

Line 13, "illustrates" should read --illustrate--.
    Line 20, "This," should read --This--.
    Line 40, "3408" should read --3408C--.
    Line 60, "by" should be deleted.

COLUMN 46:

Line 32, "illustrates" should read --illustrate--.
    Line 56, "head" should read --state,--.
    Line 57, "an" should read --and--.

COLUMN 48:

Line 48, "411a" should read --4111a--.
    Line 53, "411a" should read --4111a--.
    Line 54, "4111a" should read --4110a--.
    Line 62, "ink tank 4110" should read --ink tank 4111--.

UNITED STATES PATENT AND TRADEMARK OFFICE
CERTIFICATE OF CORRECTION

PATENT NO. : 5,731,829
DATED : March 24, 1998
INVENTOR(S) : Takashi SAITO, et al.

It is certified that error appears in the above-identified patent and that said Letters Patent is hereby corrected as shown below:

COLUMN 51:

Line 57, "in a so-called" should read --in so-called--.

COLUMN 52:

Line 50, "stabled." should read --stabilized.--.

COLUMN 54:

Line 62, "claim 1," should read --claim 11,--.

Signed and Sealed this

Thirtieth Day of March, 1999

Attest:

Q. TODD DICKINSON

*Attesting Officer*  *Acting Commissioner of Patents and Trademarks*